US009185171B2

(12) United States Patent
Pahlavan et al.

(10) Patent No.: US 9,185,171 B2
(45) Date of Patent: Nov. 10, 2015

(54) METHOD AND SYSTEM OF SPECIFYING APPLICATION USER INTERFACE OF A REMOTE CLIENT DEVICE

(75) Inventors: Babak Pahlavan, Palo Alto, CA (US); Nandakumar Sarun Madarakal, Kerala (IN); Ronald H Nicholson, Jr., Santa Clara, CA (US); Daniel Ernesto Barreto, San Francisco, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 909 days.

(21) Appl. No.: 12/546,671

(22) Filed: Aug. 24, 2009

(65) Prior Publication Data

US 2010/0269048 A1    Oct. 21, 2010

Related U.S. Application Data

(60) Provisional application No. 61/169,664, filed on Apr. 15, 2009, provisional application No. 61/169,667, filed on Apr. 15, 2009.

(51) Int. Cl.
*H04L 12/58* (2006.01)
*H04L 29/08* (2006.01)
(Continued)

(52) U.S. Cl.
CPC ............ *H04L 67/148* (2013.01); *G06F 3/0481* (2013.01); *G06F 3/0484* (2013.01);
(Continued)

(58) Field of Classification Search
CPC .......... H04L 67/42; H04L 67/34; H04L 67/02
USPC .......... 715/740, 761, 804; 709/202, 203, 217, 709/220, 225; 719/311
See application file for complete search history.

(56) References Cited

U.S. PATENT DOCUMENTS 4,777,880 A    10/1988 Beattie et al.
5,831,609 A *  11/1998 London et al. ................ 715/746
(Continued)

FOREIGN PATENT DOCUMENTS

EP          878759         11/1998
WO         99/63430        12/1999
WO    WO 2008/087409 A1    7/2008

OTHER PUBLICATIONS

Sanz et al., XML Based Integration of Web, Mobile and Desktop Components in a Service Oriented Architecture, Aug. 29, 2008, International Symposium on Distributed Computing and Artificial Intelligence 2008, vol. 50/2009, pp. 565-573.*

(Continued)

*Primary Examiner* — Jordany Nunez
(74) *Attorney, Agent, or Firm* — Baker Botts L.L.P.

(57) ABSTRACT

Examples of systems and methods are provided for designing a remote view of a local application. A system may receive a request from a remote client device to launch a local application at a local server. The system may select a configuration file associated with the local application and with the remote client device. The configuration file may comprise a control code for at least one user action to control the local application. The system may provide the configuration file directed to the remote client. The system may receive from the remote client device, a control code from a configuration file previously provided to the remote client device. The system may control the local application based on the received control code. The system may provide display output data of the local application directed to the remote client device.

20 Claims, 37 Drawing Sheets

(51) Int. Cl.

| | | |
|---|---|---|
| H04L 29/06 | (2006.01) | |
| G06F 15/16 | (2006.01) | |
| G06F 3/0481 | (2013.01) | |
| G06F 3/0484 | (2013.01) | |
| G06F 9/44 | (2006.01) | |
| H04L 12/26 | (2006.01) | |

(52) U.S. Cl.
CPC .......... *G06F9/4445* (2013.01); *H04L 43/0864* (2013.01); *H04L 63/08* (2013.01); *H04L 63/0853* (2013.01); *H04L 63/126* (2013.01); *H04L 67/42* (2013.01)

(56) References Cited

U.S. PATENT DOCUMENTS

| | | | | |
|---|---|---|---|---|
| 5,918,039 | A | 6/1999 | Buswell et al. | |
| 5,961,582 | A | 10/1999 | Gaines | |
| 6,020,881 | A | 2/2000 | Naughton et al. | |
| 6,085,247 | A | 7/2000 | Parsons, Jr. et al. | |
| 6,128,010 | A | 10/2000 | Baxter et al. | |
| 6,286,003 | B1 | 9/2001 | Muta | |
| 6,341,097 | B1 | 1/2002 | Hsu et al. | |
| 6,430,609 | B1 | 8/2002 | Dewhurst et al. | |
| 6,483,813 | B1 | 11/2002 | Blencowe | |
| 6,510,229 | B1 | 1/2003 | Geile | |
| 6,518,965 | B2 | 2/2003 | Dye et al. | |
| 6,654,784 | B1 | 11/2003 | Wei | |
| 6,710,790 | B1 | 3/2004 | Fagioli | |
| 6,725,424 | B1 | 4/2004 | Schwerdtfeger | 715/239 |
| 6,784,855 | B2 | 8/2004 | Matthews et al. | |
| 6,836,885 | B1 | 12/2004 | Buswell et al. | |
| 6,920,502 | B2 | 7/2005 | Araujo et al. | |
| 6,938,221 | B2 | 8/2005 | Nguyen | |
| 6,950,991 | B2 | 9/2005 | Bloomfield et al. | |
| 6,990,477 | B2 | 1/2006 | Cotner et al. | |
| 7,093,003 | B2 | 8/2006 | Yuh et al. | |
| 7,107,322 | B1* | 9/2006 | Freeny, Jr. | 709/217 |
| 7,177,902 | B2 | 2/2007 | Hubbard | |
| 7,213,228 | B2 | 5/2007 | Putterman | |
| 7,242,406 | B2* | 7/2007 | Robotham et al. | 345/581 |
| 7,274,368 | B1 | 9/2007 | Keslin | |
| 7,293,243 | B1 | 11/2007 | Ben-Shachar et al. | |
| 7,430,681 | B1 | 9/2008 | Hobbs | |
| 7,475,421 | B2 | 1/2009 | Abdo et al. | |
| 7,489,306 | B2 | 2/2009 | Kolmykov-Zotov et al. | |
| 7,502,754 | B2 | 3/2009 | Campbell et al. | |
| 7,512,906 | B1* | 3/2009 | Baier et al. | 715/866 |
| 7,577,924 | B2 | 8/2009 | Nguyen | |
| 7,607,128 | B2 | 10/2009 | Arthurs et al. | |
| 7,685,539 | B2 | 3/2010 | Nguyen | |
| 7,703,047 | B2 | 4/2010 | Keely, Jr. et al. | |
| 7,705,829 | B1 | 4/2010 | Plotnikov | |
| 7,711,366 | B1 | 5/2010 | O'Neil et al. | |
| 7,747,086 | B1 | 6/2010 | Hobbs et al. | |
| 7,870,496 | B1* | 1/2011 | Sherwani | 715/761 |
| 7,895,521 | B2 | 2/2011 | Bhogal et al. | |
| 7,996,461 | B1 | 8/2011 | Kobres et al. | |
| 8,024,407 | B2 | 9/2011 | Harwood et al. | |
| 8,078,164 | B2 | 12/2011 | Ganesan | |
| 8,554,865 | B2* | 10/2013 | Dziadosz | 709/211 |
| 8,732,588 | B2* | 5/2014 | Klawitter et al. | 715/748 |
| 2001/0020255 | A1* | 9/2001 | Hofmann et al. | 709/318 |
| 2002/0057295 | A1 | 5/2002 | Panasyuk et al. | |
| 2002/0118175 | A1 | 8/2002 | Liebenow et al. | |
| 2002/0126099 | A1 | 9/2002 | Engholm | |
| 2002/0165993 | A1* | 11/2002 | Kramer | 709/315 |
| 2003/0087601 | A1 | 5/2003 | Agam et al. | |
| 2003/0122856 | A1 | 7/2003 | Hubbard | |
| 2003/0160813 | A1 | 8/2003 | Raju | |
| 2003/0177322 | A1 | 9/2003 | Crockett et al. | |
| 2004/0049530 | A1* | 3/2004 | Lok et al. | 709/201 |
| 2004/0141010 | A1 | 7/2004 | Fitzmaurice et al. | |
| 2004/0205117 | A1 | 10/2004 | Hertling et al. | |
| 2004/0205260 | A1 | 10/2004 | Oki et al. | |
| 2005/0012723 | A1 | 1/2005 | Pallakoff | |
| 2005/0091359 | A1 | 4/2005 | Soin et al. | |
| 2005/0101300 | A1 | 5/2005 | Hon et al. | |
| 2005/0114797 | A1 | 5/2005 | Nguyen | |
| 2005/0120312 | A1 | 6/2005 | Nguyen | |
| 2005/0184145 | A1 | 8/2005 | Law et al. | |
| 2005/0267935 | A1 | 12/2005 | Gandhi et al. | |
| 2005/0278708 | A1 | 12/2005 | Zhao et al. | |
| 2006/0026535 | A1 | 2/2006 | Hotelling et al. | |
| 2006/0068769 | A1 | 3/2006 | Adya et al. | |
| 2006/0179118 | A1* | 8/2006 | Stirbu | 709/217 |
| 2006/0206827 | A1 | 9/2006 | DeWitt | |
| 2007/0008922 | A1 | 1/2007 | Abhishek et al. | |
| 2007/0050470 | A1 | 3/2007 | Suzuki et al. | |
| 2007/0056009 | A1 | 3/2007 | Spilo et al. | |
| 2007/0061460 | A1 | 3/2007 | Khan et al. | |
| 2007/0067328 | A1 | 3/2007 | Mingot et al. | |
| 2007/0140189 | A1 | 6/2007 | Muhamed et al. | 370/338 |
| 2007/0156677 | A1 | 7/2007 | Szabo | |
| 2007/0192329 | A1 | 8/2007 | Croft et al. | |
| 2007/0234048 | A1 | 10/2007 | Ziv | |
| 2007/0236470 | A1 | 10/2007 | Abanami et al. | |
| 2007/0262964 | A1 | 11/2007 | Zotov et al. | |
| 2008/0016467 | A1 | 1/2008 | Chambers et al. | |
| 2008/0088602 | A1 | 4/2008 | Hotelling | |
| 2008/0155012 | A1 | 6/2008 | Chiang | |
| 2008/0222416 | A1 | 9/2008 | Kiwimagi et al. | |
| 2008/0222618 | A1 | 9/2008 | Valtchev | |
| 2008/0291210 | A1 | 11/2008 | Partani et al. | |
| 2008/0316218 | A1 | 12/2008 | Kilani et al. | |
| 2009/0016529 | A1 | 1/2009 | Gopinath et al. | |
| 2009/0058822 | A1 | 3/2009 | Chaudhri | |
| 2009/0083628 | A1 | 3/2009 | Fitzmaurice et al. | |
| 2009/0193340 | A1 | 7/2009 | Mahajan et al. | |
| 2009/0248802 | A1* | 10/2009 | Mahajan et al. | 709/204 |
| 2009/0322687 | A1 | 12/2009 | Duncan et al. | |
| 2010/0005395 | A1 | 1/2010 | Shirakawa | |
| 2010/0011299 | A1 | 1/2010 | Brodersen et al. | |
| 2010/0138780 | A1 | 6/2010 | Marano et al. | |
| 2010/0174713 | A1 | 7/2010 | Baessler et al. | |
| 2010/0177645 | A1 | 7/2010 | Kang et al. | |
| 2010/0250903 | A1* | 9/2010 | Jensen | 712/220 |
| 2010/0323762 | A1 | 12/2010 | Sindhu | |
| 2011/0029896 | A1 | 2/2011 | Cheng | |
| 2011/0093822 | A1 | 4/2011 | Sherwani | |
| 2011/0099497 | A1 | 4/2011 | Fok et al. | |
| 2011/0239127 | A1 | 9/2011 | Meng et al. | |
| 2011/0246904 | A1 | 10/2011 | Pinto et al. | |

OTHER PUBLICATIONS

"Jaadu," http://www.creativeapplications.net/iphone/iaadu-vnc-iphone/, Dec. 26, 2008, pp. 1-5.

"TiPb at Work: Jaadu VNC vs Mocha VNC," http://www.tipb.com/2008/10/22/tipb-at-work-iaadu-vnc-vs-mocha-vnc/, Oct. 22, 2008, pp. 1-6.

Fred Swartz, 2006, Copyleft, http://www.leepoint.net/notes-java/GUI/containers/10windows/12frameclose.html, Jun. 28, 1905.

Extended European Search Report; Application No. 10764909.7; pp. 7, Apr. 11, 2014.

Oracle, Introduction to Event Listeners (The Java Tutorials>Creating a GUI with JFC/Swing, 1995, http://docs.oracle.com/javase/tutorial/uiswing/events/intro.html, Jan. 1, 1995.

Vaadin Ltd., Event, 2001, https://vaadin.com/api/elemental/events/Event.html, Jan. 1, 2001.

International Preliminary Report on Patentability, Application No. PCT/US10/29997; pp. 8, Oct. 26, 2012.

* cited by examiner

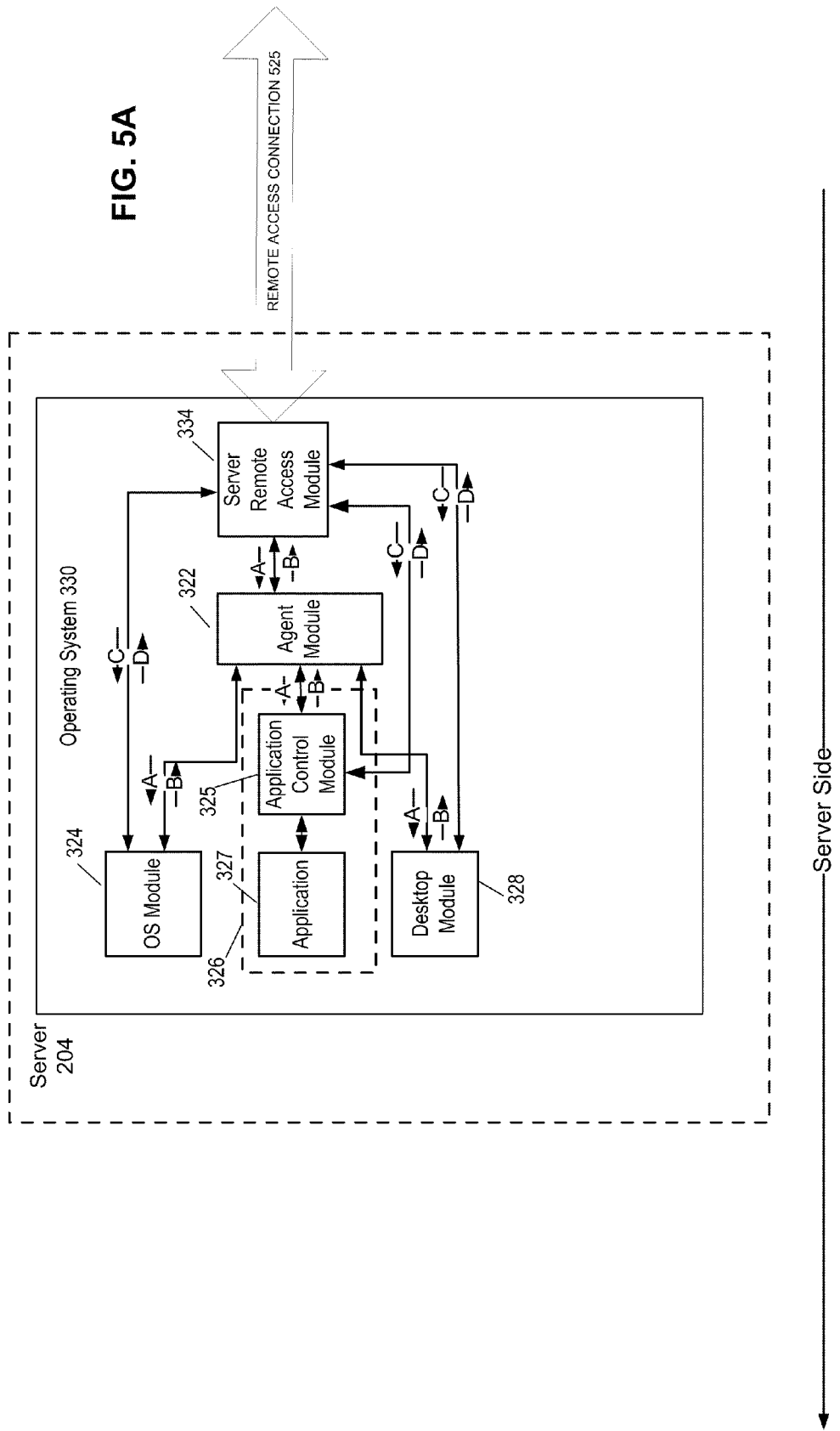

METHOD AND SYSTEM OF SPECIFYING APPLICATION USER INTERFACE OF A REMOTE CLIENT DEVICE

CROSS-REFERENCES TO RELATED APPLICATIONS

The present application claims the benefit of priority under 35 U.S.C. §119 from U.S. Provisional Patent Application Ser. No. 61/169,664, entitled "ENABLING SERVER SIDE COMPUTING ON A REMOTE CLIENT WHILE FACILITATING AN IMPROVED USER EXPERIENCE FOR THE REMOTE CLIENT USER," filed on Apr. 15, 2009, and U.S. Provisional Application Ser. No. 61/169,667, entitled "ENABLING SERVER SIDE COMPUTING FROM A REMOTE CLIENT AND FACILITATING THE REMOTE CLIENT TO CUSTOMIZE AND CONTROL A SERVER APPLICATION," filed on Apr. 15, 2009, both of which are hereby incorporated by reference in their entirety for all purposes.

BACKGROUND

One approach to the design and implementation of computer networks, particularly with regard to the development of client/server applications, includes designing client applications and client devices so that the majority of the heavily used resources are at a remote computing device, such as a centralized server, connected via a network. These client devices generally have minimal memory, disk storage, and processor power, but are designed under the premise that most users connected to a powerful server do not need the additional processing power. With these client devices, the total cost of ownership is minimized, because of the reduced resources and because the clients can be centrally administered and updated from the server.

One operational issue faced when deploying a new application in such a client/server configuration is that a significant amount of efforts may be involved to customize the new application for execution on a client device. An application developer may have to re-write the server portion and/or the client portion of the application to ensure satisfactory user experience on client devices having varying graphics and processor capabilities.

In a server-centric system, an application is typically designed to run on the server platform and minimal effort is put into customizing user experience for the application on a client device. In general, a graphical view of the output of the application, as would be seen at a display connected to the server, is provided to the client device. In such a server-centric system, a user of a remote client device can control the application running on the server by using the graphical control objects, such as scroll bar, radio buttons and drop-down lists that would be displayed on the display at the server. However, when the client device has a relatively small display, such a system may not provide satisfactory user experience. For client devices with relatively small displays, such as a mobile phone or a personal digital assistant, these graphical objects as seen on the small display are typically much smaller than the size of a human finger used to manipulate the graphical objects. Even if the client device allows zooming in, the user experience suffers because a user needs to constantly manipulate the display by adjusting zooming and scrolling the display.

In a client-centric system, an application may be written for a client device and ported to the operating system of the client device. Thus, in a client-centric system, a large part of the application may be run on the client device, with some support from the remote server. In practice, a client-centric system also has certain shortcomings. Every time a new device is introduced in the market, the application may have to be ported to the new device. Depending on the details of the software and hardware environment of a new device, this task of porting the application may require significant resources, making such portability impractical. In a typical client-centric system, the client device user interface and features are compiled and built before shipping the client device to a customer. The client graphical user interface (GUI) is static and can be changed by a tedious and user intensive procedure. It is difficult to create a personalized GUI for users. Furthermore, introducing new features, changing application functionality or GUI needs a tedious user-initiated process or new code development.

A better technique for deploying applications in a client/server environment is needed.

SUMMARY

In an aspect, a machine-implemented method may be provided for designing a remote view of a local application, to be displayed at a remote client device. The method may comprise one or more of the following: receiving a message from a remote client device to launch a local application at a local server, selecting a configuration file associated with the local application and associated with the remote client device, the configuration file comprising a control code for at least one user action to control the local application, providing the configuration file directed to the remote client device to control the local application at the remote client device, receiving, from the remote client device, a control code from a configuration file previously provided to the remote client device, controlling the local application based on the received control code, and providing display output data of the local application directed to the remote client device.

In another aspect, a machine-readable medium may be encoded with instructions executable by a processing system to perform a method for designing a remote view of a local application, to be displayed at a remote client device. The instructions may comprise code for one or more of the following: receiving a message from a remote client device to launch a local application at a local server, selecting a configuration file associated with the local application and associated with the remote client device, the configuration file comprising a control code for at least one user action to control the local application, providing the configuration file directed to the remote client device to control the local application at the remote client device, receiving, from the remote client device, a control code from a configuration file previously provided to the remote client device, controlling the local application based on the received control code, and providing display output data of the local application directed to the remote client device.

In yet another aspect, an apparatus may be provided for designing a remote view of a local application, to be displayed at a remote client device. The apparatus may comprise one or more of the following: means for receiving a message from a remote client device to launch a local application at a local server means for selecting a configuration file associated with the local application and associated with the remote client device, the configuration file comprising a control code for at least one user action to control the local application, means for providing the configuration file directed to the remote client device to control the local application at the remote client device, means for receiving, from the remote client device, a control code from a configuration file previously provided to the remote client device, means for controlling the local application based on the received control code, and means for providing display output data of the local application directed to the remote client device.

In yet another aspect, a system may be provided for designing a remote view of a local application for viewing at a remote client device. The system may comprise one or more of the following: a remote access module configured to receive a message from a remote client device to launch a local application at a local server side, a configuration file selection module configured to select a configuration file associated with the local application and associated with the remote client device, the configuration file comprising a control code for at least one user action to control the local application, a configuration file communication module configured to provide the configuration file directed to the remote client device to control the local application at the remote client device, a control code receiver module configured to receive, from the remote client device, a control code from a configuration file previously provided to the remote client device, a remote view controller module configured to control the local application based on the received control code and a display data communication module configured to provide display output data of the local application directed to the remote client device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 5A is a conceptual block diagram of a server according to certain aspects of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1A:
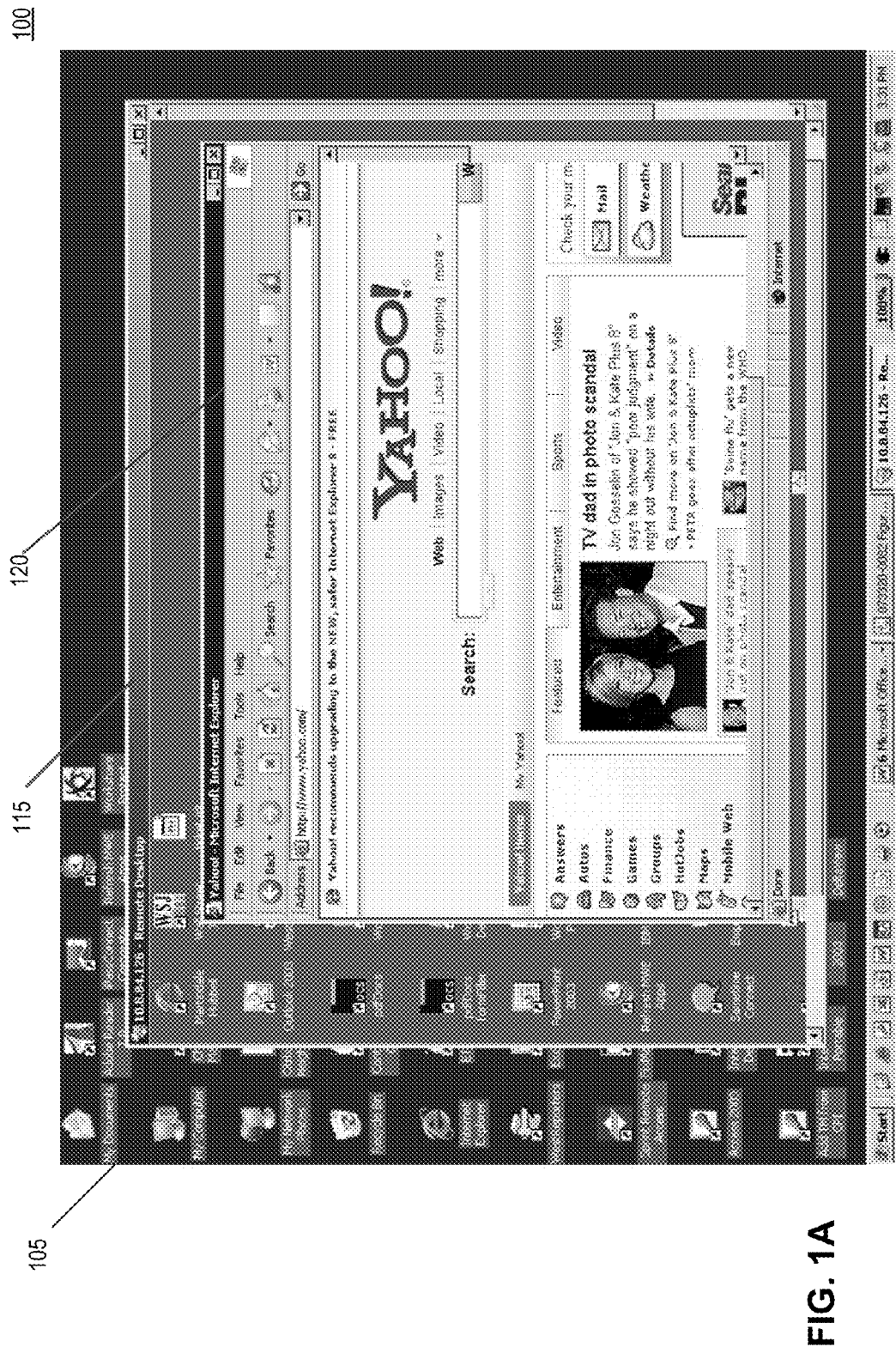
FIG. 1A illustrates an example of a display on a client device during a remote access session with a remote server.

FIG. 1A shows an example of a display 100 at a client device with a large screen during a remote access session with a server. The display 100 includes the local desktop 105 of the client device, a remote view window 115 showing an image of a remote desktop 115 and a remote web browser application 120 running on the server. The image of the remote desktop 115 and remote application 120 are based on display output data of the remote desktop 115 and remote application 120 from the server.

Figure 1B:
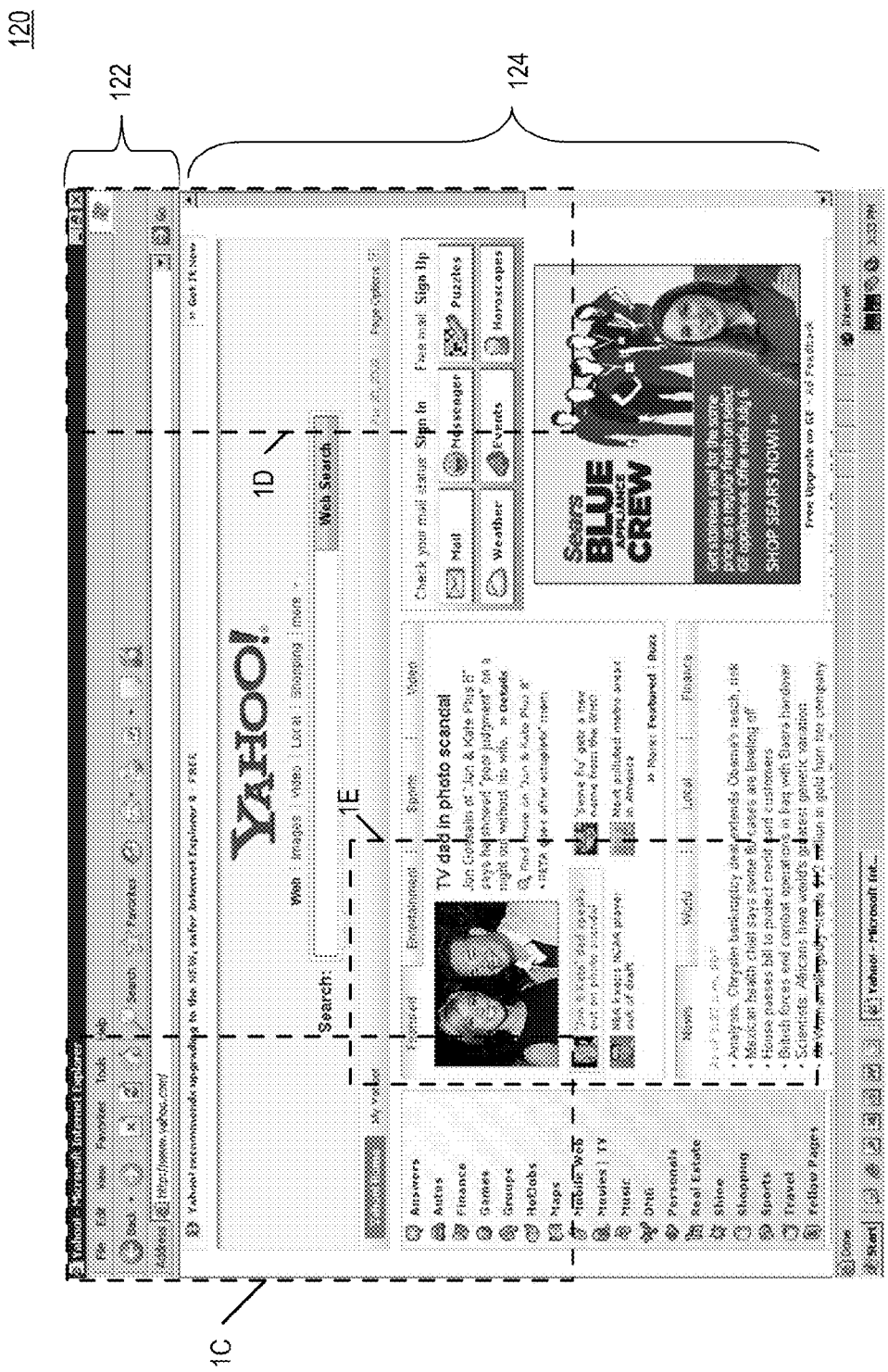
FIG. 1B illustrates an example of a web browser running on a server.

FIG. 1B shows an enlarged view of the remote web browser application 120. The remote web browser application 120 includes a GUI 122 (e.g., toolbars) and a window 124 for displaying web content. The GUI 122 is designed to be viewed on a large display. As a result, it can be very different for a user at a client device with a small display to remotely interact with the remote web browser 120. For example, if the image of the entire remote web browser application 120 is displayed on a client device with a small display, then the GUI 122 is greatly reduced in size making it difficult for the user to view the GUI 122 and select graphical control objects in the GUI 122.

Figure 1E:
FIGS. 1C to 1E illustrate examples of different portions of the web browser displayed on a client device.
Figure 1D:
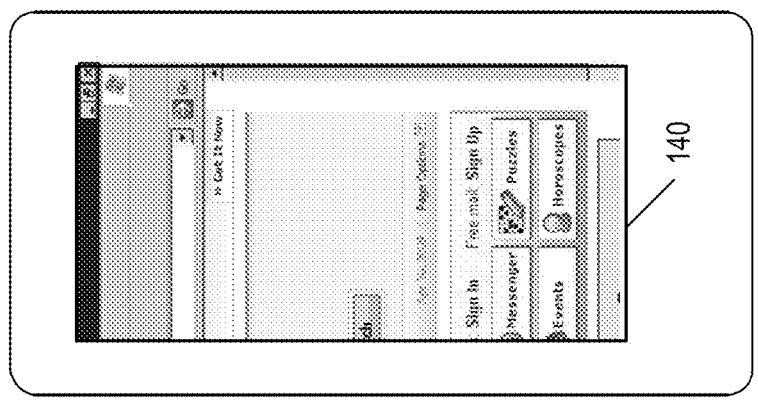
Figure 1C:
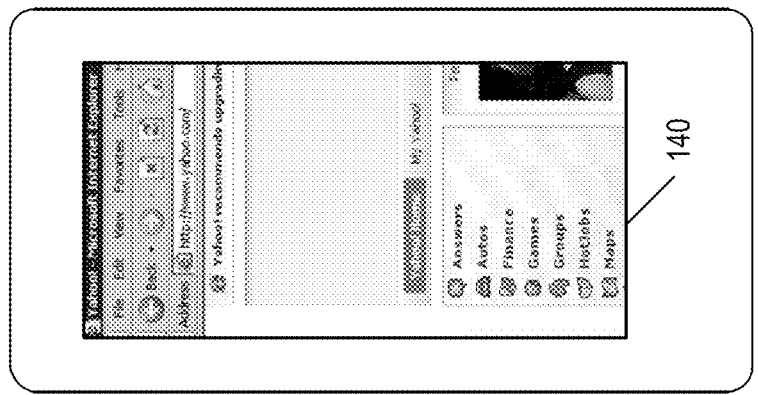

If the user at the client device zooms in on a portion of the remote web browser application 120 to enlarge that portion for viewing on a client device with a small screen (e.g., mobile phone), then the user needs to constantly manipulate the remote view by adjusting the zoom and scrolling to view different portions of the web browser application 120. FIG. 1C shows an example of a client device 135 in which a portion of the remote web browser application 120 has been zoomed in for viewing on the display 140 of the client device 135 (e.g., smartphone). In this example, only a portion of the GUI 122 is visible. As a result, the user at the client device has to adjust the zoom and/or scroll the remote view on the display 140 to view the GUI 122. FIG. 1D shows another example in which a different portion of the GUI 122 is visible on the display 140. FIG. 1E shows an example in which the GUI 122 is not visible at all on the display 140. The different portions of the web browser application 120 displayed in FIGS. 1C to 1E are shown in FIG. 1B in dashed boxes. Thus, interacting with a remote application running on a server from a client device (e.g., smartphone) can be very cumbersome and difficult.

Figure 2:
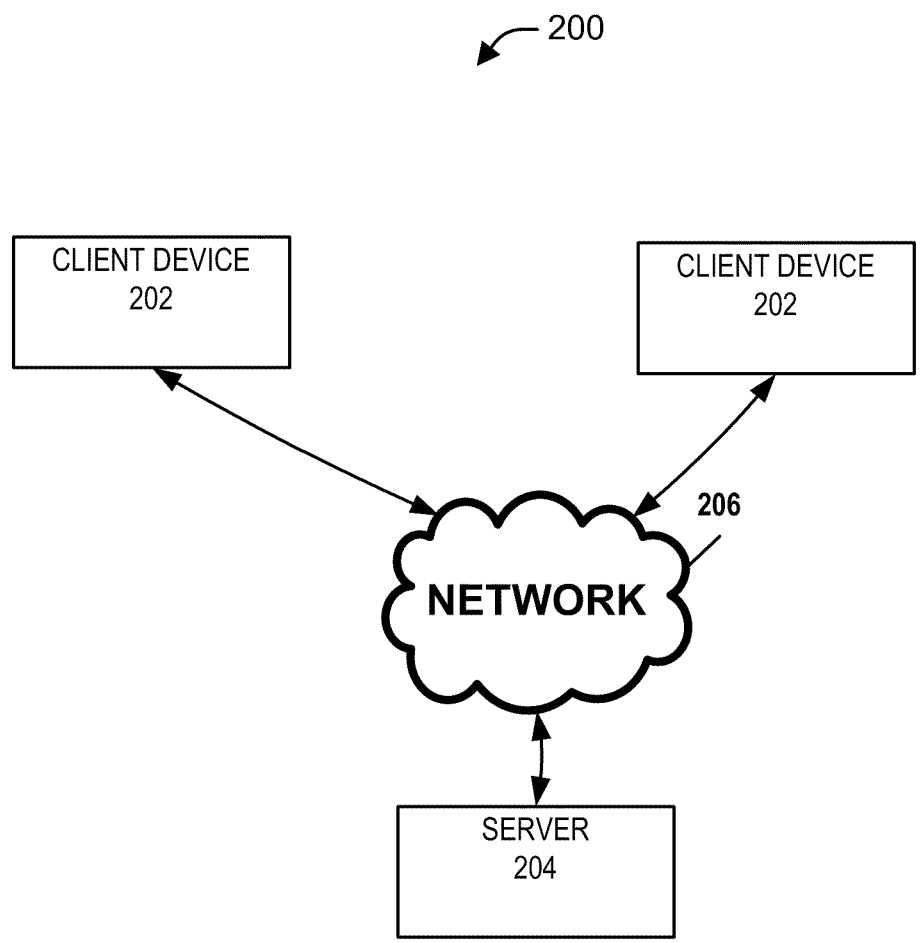
FIG. 2 is a conceptual block diagram of a computer network according to certain aspects of the present disclosure.

FIG. 2 illustrates a simplified diagram of a system 200 in accordance with an aspect of the present disclosure. The system 200 may include one or more remote client devices 202 in communication with a server computing device 204 (server) via a network 206. In one aspect, the server 204 is configured to allow remote sessions (e.g., remote desktop sessions) wherein users can access applications and files on the server 204 by logging onto the server 204 from a client device 202. Such a connection may be established using any of several well-known techniques such as the Remote Desktop Protocol (RDP) on a Windows-based server.

By way of illustration and not limitation, in one aspect of the disclosure, stated from a perspective of a server side (treating a server as a local device and treating a client device as a remote device), a server application is executed (or runs) at a server 204. While a remote client device 202 may receive and display a view of the server application on a display local to the remote client device 202, the remote client device 202 does not execute (or run) the server application at the remote client device 202. Stated in another way from a perspective of the client side (treating a server as remote device and treating a client device as a local device), a remote application is executed (or runs) at a remote server 204.

By way of illustration and not limitation, a client device 202 can represent a computer, a mobile phone, a laptop computer, a thin client device, a personal digital assistant (PDA), a portable computing device, or a suitable device with a processor. In one example, a client device 202 is a smartphone (e.g., iPhone, Android phone, Blackberry, etc.). In certain configurations, a client device 202 can represent an audio player, a game console, a camera, a camcorder, an audio device, a video device, a multimedia device, or a device capable of supporting a connection to a remote server. In one example, a client device 202 can be mobile. In another example, a client device 202 can be stationary. According to one aspect of the disclosure, a client device 202 may be a device having at least a processor and memory, where the total amount of memory of the client device 202 could be less than the total amount of memory in a server 204. In one example, a client device 202 does not have a hard disk. In one aspect, a client device 202 has a display smaller than a display supported by a server 204. In one aspect, a client device may include one or more client devices.

In one aspect, a server 204 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server 204 can be stationary. In another aspect, a server 204 can be mobile. In certain configurations, a server 204 may be any device that can represent a client device. In one aspect, a server 204 may include one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client device 202 and a server 204 are remote with respect to each other, a client device 202 may connect to a server 204 over a network 206, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 206 can be a LAN network, a WAN network, a wireless network, the Internet, an intranet or other network. A network 206 may include one or more routers for routing data between client devices and/or servers. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s).

According to certain aspects of the present disclosure, the terms "client device" and "remote client device" are generally used synonymously in relation to a server, and the word "remote" may indicate that a client device is in communication with a server(s), for example, over a network connection(s).

In one aspect of the disclosure, a "client device" may be sometimes referred to as a client or vice versa. Similarly, a "server" may be sometimes referred to as a server device or vice versa.

In one aspect, the terms "local" and "remote" are relative terms, and a client device may be referred to as a local client device or a remote client device, depending on whether a client device is described from a client side or from a server side, respectively. Similarly, a server may be referred to as a local server or a remote server, depending on whether a server is described from a server side or from a client side, respectively. Furthermore, an application running on a server may be referred to as a local application, if described from a server side, and may be referred to as a remote application, if described from a client side.

In one aspect, devices placed on a client side (e.g., devices connected directly to a client device(s) or to one another using wires or wirelessly) may be referred to as local devices with respect to a client device and remote devices with respect to a server. Similarly, devices placed on a server side (e.g., devices connected directly to a server(s) or to one another using wires or wirelessly) may be referred to as local devices with respect to a server and remote devices with respect to a client device.

Figure 3:
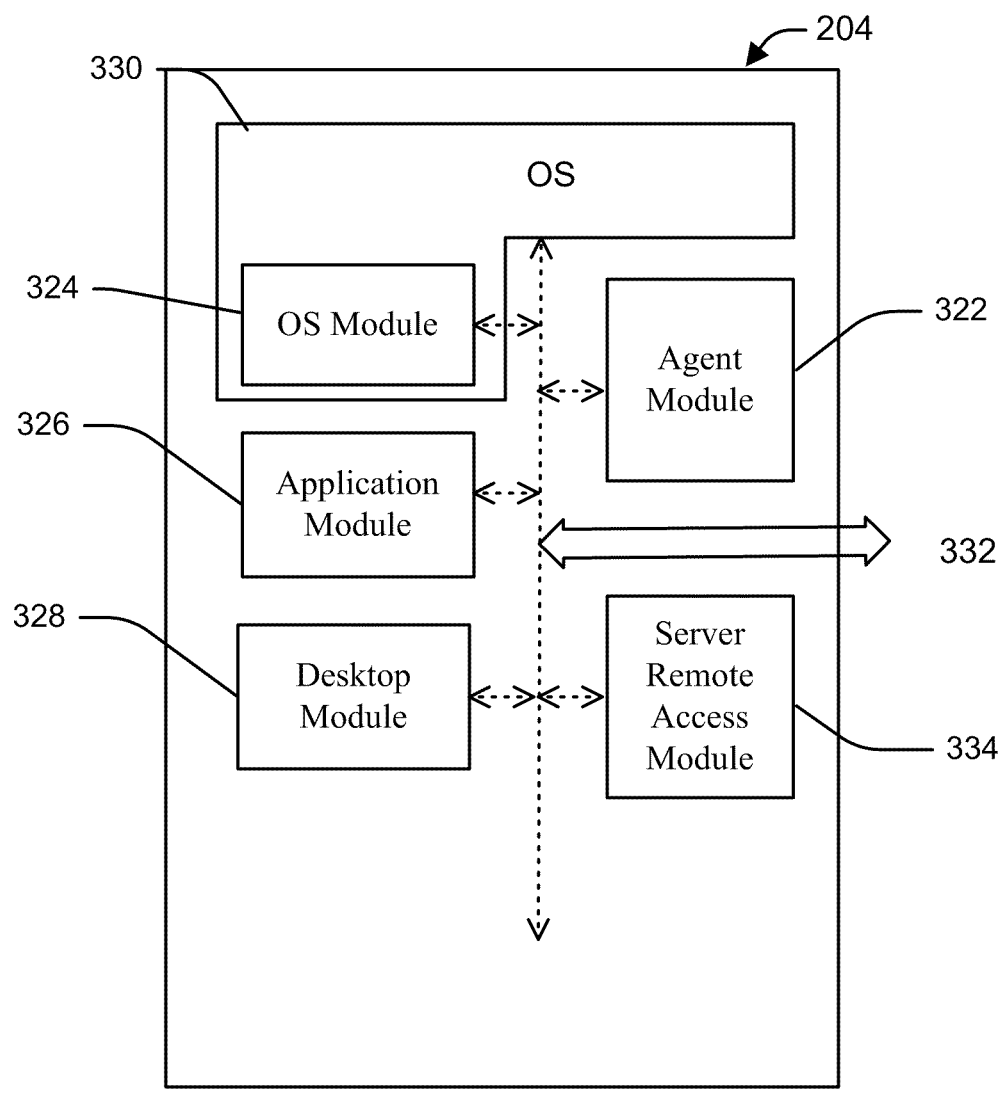
FIG. 3 is a conceptual block diagram of a server according to certain aspects of the present disclosure.

FIG. 3 illustrates a simplified block diagram of a server 204 in accordance with an aspect of the present disclosure. The server 204 comprises an agent module 322, an OS module 324, one or more application modules 326, a desktop module 328, a server remote access module 334 and an operating system (OS) 330 in communication with the modules. In one aspect, the OS module 324 can be a part of the OS 330. The server 204 is communicatively coupled with the network 206 via a network interface 332. The modules can be implemented in software, hardware and/or a combination of both. Features and functions of these modules according to various aspects are further described in the present disclosure.

Figure 4:
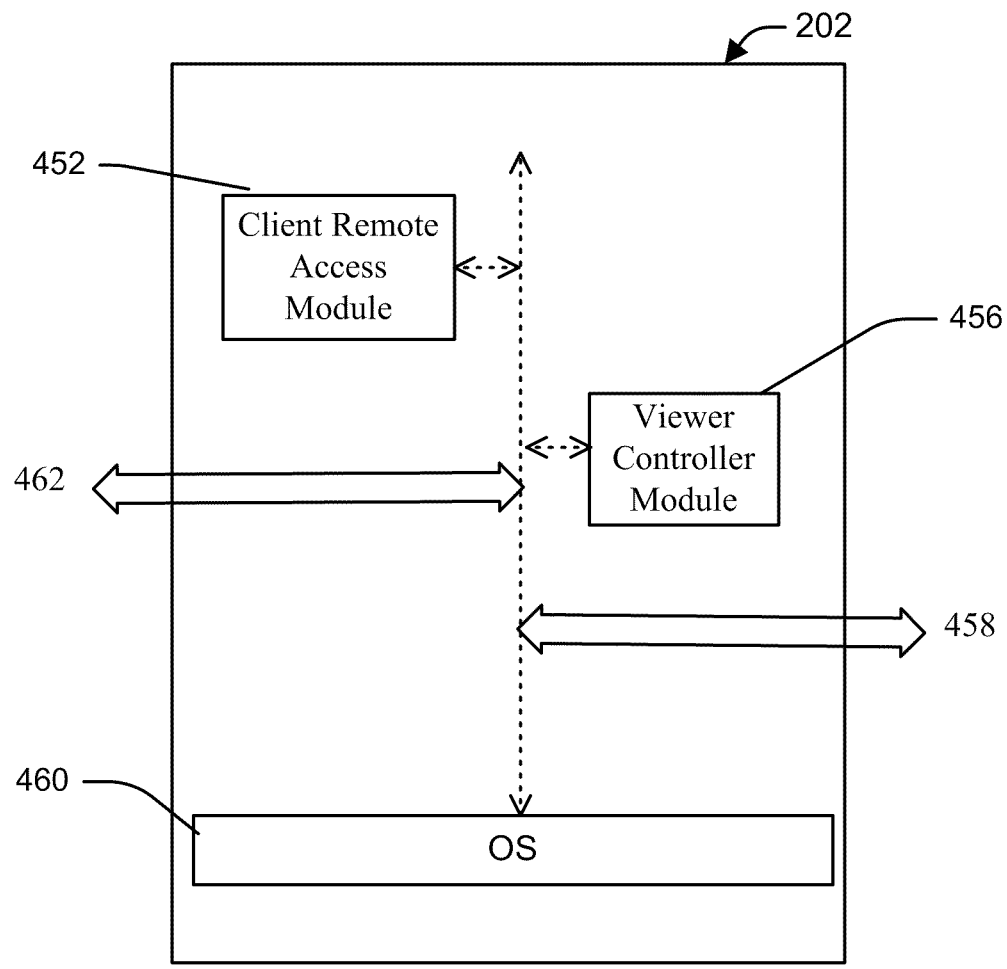
FIG. 4 is a conceptual block diagram of a client device according to certain aspects of the present disclosure.

FIG. 4 illustrates a simplified block diagram of a client device 202 in accordance with an aspect of the present invention. The client device 202 comprises a viewer controller (VC) module 456, a client remote access module 452 and an operating system (OS) 460 in communication with the modules. The modules are further in communication with various user interface devices (not shown in FIG. 4) via a human interface devices (HID) connection 458. The user interface devices may include one or more output devices (e.g., one or more of a display, a speaker, or other audio, image or video output devices) and one or more input devices (e.g., one or more of a keyboard, a mouse, a trackball, a microphone, a stylus, a touch screen, a touch pad, a pen, a tablet, or other audio, image or video input devices). The modules are also in communication with the network 206 via a network connection 462. The modules can be implemented in software, hardware and/or a combination of both. Additional features and functions of these modules according to various aspects of the present disclosure are further described in the disclosure.

Figure 5B:
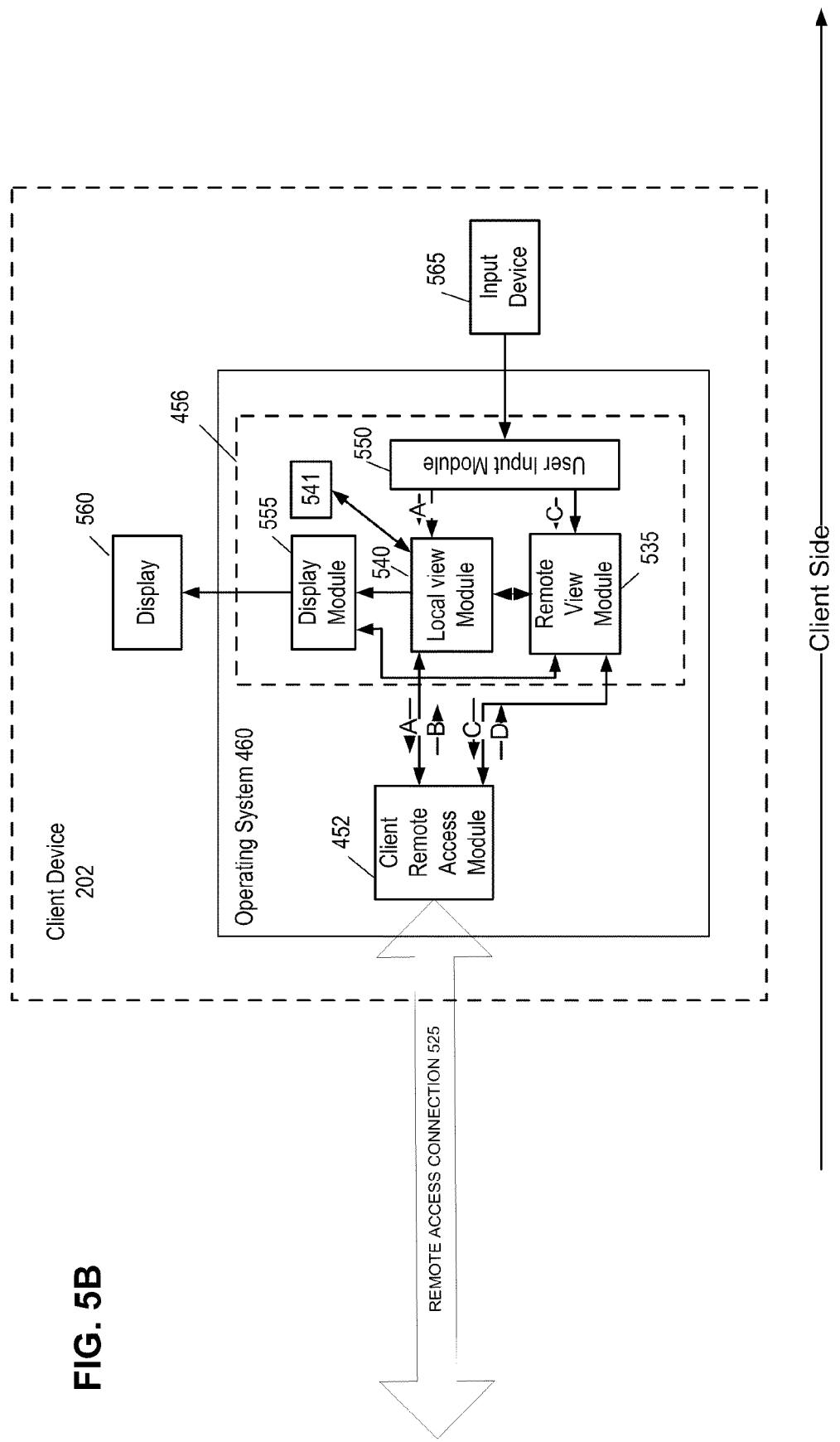
FIG. 5B is a conceptual block diagram of a client according to certain aspects of the present disclosure.

FIGS. 5A and 5B are conceptual block diagrams illustrating a server 204 and a client device 202 according to an aspect of the disclosure.

Referring to FIG. 5A, the server 204 may comprise the server remote access module 334 and the agent module 322. The server remote access module 334 is configured to establish a remote access connection 525 with the client device 202 to provide the client device 202 with remote access to a desktop and/or applications running on the server 204. The server remote access module 334 may comprise a remote access application and may communicate with the client device 202 over a network 206 based on a remote access protocol (e.g., RDP/ICA), other protocols or a combination of protocols. Remote access applications allow a user at a client device to remotely access a desktop and/or application running on a server. Examples of remote access applications include, but are not limited to, the Microsoft® Remote Desktop Protocol (RDP) application and the Citrix® Independent Computing Architecture (ICA) application.

The server remote access module 334 is also configured to receive command messages from the client device 202 and communicate the received command messages to the agent module 322. The agent module 322 may be configured to control a desktop and/or application running on the server 204 based on the received command messages, as described further below.

The server 204 further comprises an application module 326, the desktop module 328 and the OS module 324. The application module 326 comprises an application 327 and an application control module 325. An application 327 may include one or more applications. The application 327 may include, for example, a web browser application, a word processing application, a spreadsheet application, a game application, an audio application, and/or other applications. The application 327 may also include applications for rendering multi-media content including, for example, Adobe® Acrobat, Microsoft® Silverlight, and/or other applications. In one example, the application 327 is executed (or runs) at the server 204, and the client device 202 does not execute (or run) the application 327 locally at the client device 202.

An application control module 325 may include one or more application control modules. The application control module 325 may be configured to control the application 327 based on commands from the agent module 322. The application control module 325 may comprise one or more ActiveX controllers for controlling Windows-based applications or other types of controller. The application control module 325 may also control the applications based on user inputs received by the remote access module 334 from the client device 202. The user inputs may comprise pointer inputs, keyboard inputs and/or other inputs. The application control module 325 may also control the applications based on events generated by the application 327 or the OS 330.

The desktop module 328 may be configured to generate a desktop that provides a GUI for allowing a user to select and launch applications on the server 204, manage files, and configure certain features of the operating system 330. The GUI may be a server-based GUI presented by the agent module 322. Alternatively, the GUI may be controlled by the agent module 322 and displayed natively on the client device. The desktop may display icons representing different applications that can be launched on the server 204, in which a user can select an application by moving a pointer to the corresponding icon and double clicking on the icon. The OS module 324 may be configured to communicate certain OS events to the agent module 322 and the server remote access module 334, as described further below.

The server 204 further comprises the operating system 330, which may manage and provide communication to and receive communication from the modules and application shown in FIG. 5A. The operating system 330 may also manage multiple remote user sessions allowing multiple client devices to remotely access the server 204. The operating system 330 may include Microsoft® Windows, Linux, Unix, Mac OS or another operating system. Although the server remote access module 334 is shown separately from the operating system 330, the server remote access module 334 may be considered part of the operating system 330. For example, the remote access module 334 may comprise an RDP application that comes pre-installed on the server 204 as part of Microsoft® Windows.

Referring now to FIG. 5B, the client device 202 may comprise the client remote access module 452 and the viewer controller module 456. The client remote access module 452 may be configured to communicate with the server 204 over a network 206 to remotely access a desktop and/or applications running on the server 204. The client remote access module 452 may communicate with the server remote access module 334 based on a remote access protocol (e.g., RDP/ICA), other protocols or a combination of protocols. In one aspect, the client remote access module 452 may be configured to receive display output data of a desktop and/or application running on the server 204 from the server remote access module 334 over a network 206.

In one aspect of the disclosure, display output data may comprise visual/audio information that a user located at a server 204 would have seen on a display at the server (e.g., a "virtual" display) and/or would have heard from an audio output such as a speaker at the server (e.g., a "virtual" speaker). In one aspect, the display output data may comprise an image (e.g., bitmap) and/or drawing commands of the display output of a desktop and/or application running on the server 204. In one aspect, drawing commands provide instructions or information to a display system as to what is to be drawn on a display. The instructions or information may include, for example and without limitation, the location, texture, geometry, shading, light intensity, or color, or any combination therein, of a pixel or group of pixels of the display. In some aspects, a drawing command corresponds to multiple pixels. Still in some aspects, a drawing command corresponds to a single pixel of a display. In some aspects, drawing commands may include raster operations. In one aspect of the disclosure, the phrase "display output data" may be sometimes referred to as "display data", "display output" or vice versa.

Figure 6:
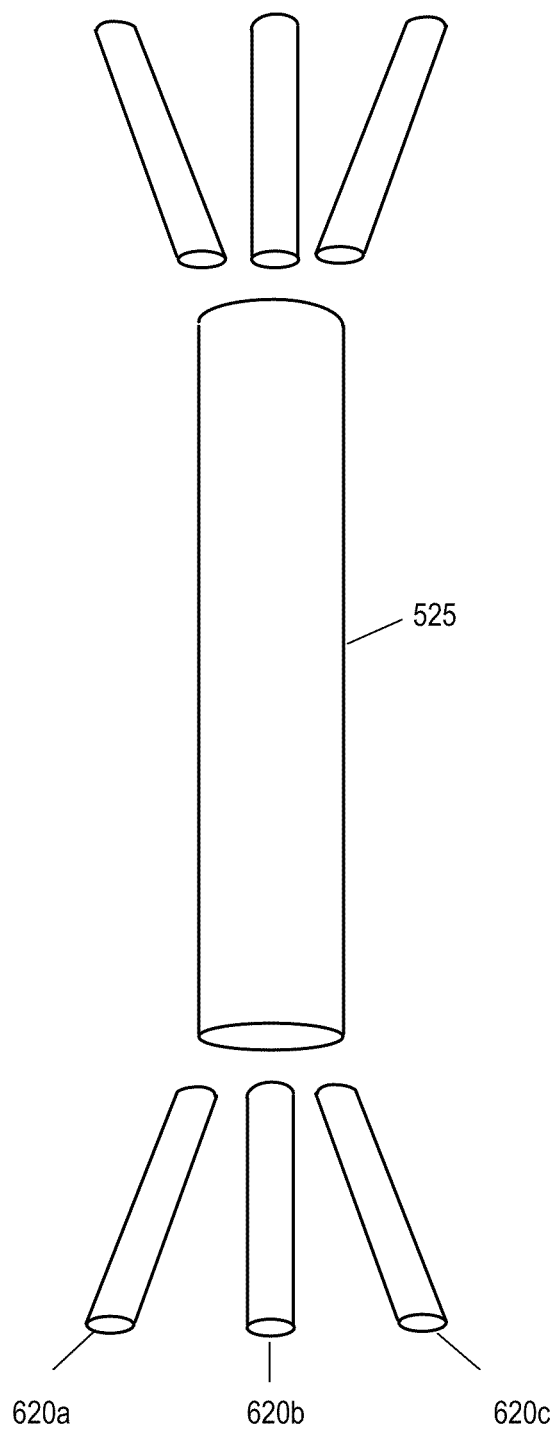
FIG. 6 illustrates an example of a remote access connection.

The client remote access module 452 may be configured to send user inputs to the server remote access module 334 over a network 206. The user inputs may comprise pointer inputs, keyboard inputs and/or other types of input. The client remote access module 452 may also be configured to send command messages to the server remote access module 334, which are described in further detail below. The remote access connection 525 between the server 204 and client device 202 may comprise a plurality of virtual channels for communicating different types of data. For example, a RDP connection may include different virtual channels for display output data and user inputs. FIG. 6 illustrates an example of the remote access connection 525 comprising multiple virtual channels 620a to 620c.

The viewer controller module 456 may comprise a remote view module 535, a local view module 540 and a display module 555. The remote view module 535 may be configured to receive display output data of a desktop and/or application 327 running on the server 204 from the client remote access module 452 and generate a remote view of the display output data of the remote desktop and/or application. In one aspect of the disclosure, the phrase "remote view" may sometimes be referred to as "remote application view" or vice versa. In one aspect of the disclosure, the term "an application" or "a remote application" may refer to an application, a remote application, a desktop, or a remote desktop.

The local view module 540 may be configured to generate a local GUI that allows a user at the client device 202 to remotely control the application 327 running on the server 204. The local view module 540 may generate the local GUI based on a configuration file 541. In one aspect, the file 541 may be generated by the agent module 322 or application module 326 and be sent to the client device 202. The file 541 may fully define the layout, design and logical operation of the local GUI. This would allow the server 204 to update the local GUI in the client device 202 without having to make modifications to the client device 202. The local GUI may provide similar controls as the GUI of the application 327 running on the server 204. The local GUI may include graphical control objects for controlling certain functions of the application 327.

For the example of a web browser application, the graphical control objects of the local GUI may include an address field for entering the address (e.g., URL) of a web page, a refresh button, a go button, and scrollbars. The local GUI is displayed on the local display 560 of the client device 202. A user at the client device 202 may select graphical control objects of the local GUI displayed on the display 560 using an input device 565, for example, a touch screen overlying the display 560. As described further below, the local GUI may be optimized for the display 560 of the client device 202 to provide the user at the client device 202 with a user friendly interface for remotely controlling the application 327 running on the server 204.

The display module 555 may be configured to receive a local GUI from the local view module 540 and a remote application view of a remote desktop and/or a remote application from the remote view module 535 and generate a composite view comprising the local GUI and the remote application view of the remote desktop and/or remote application.

Figure 7:
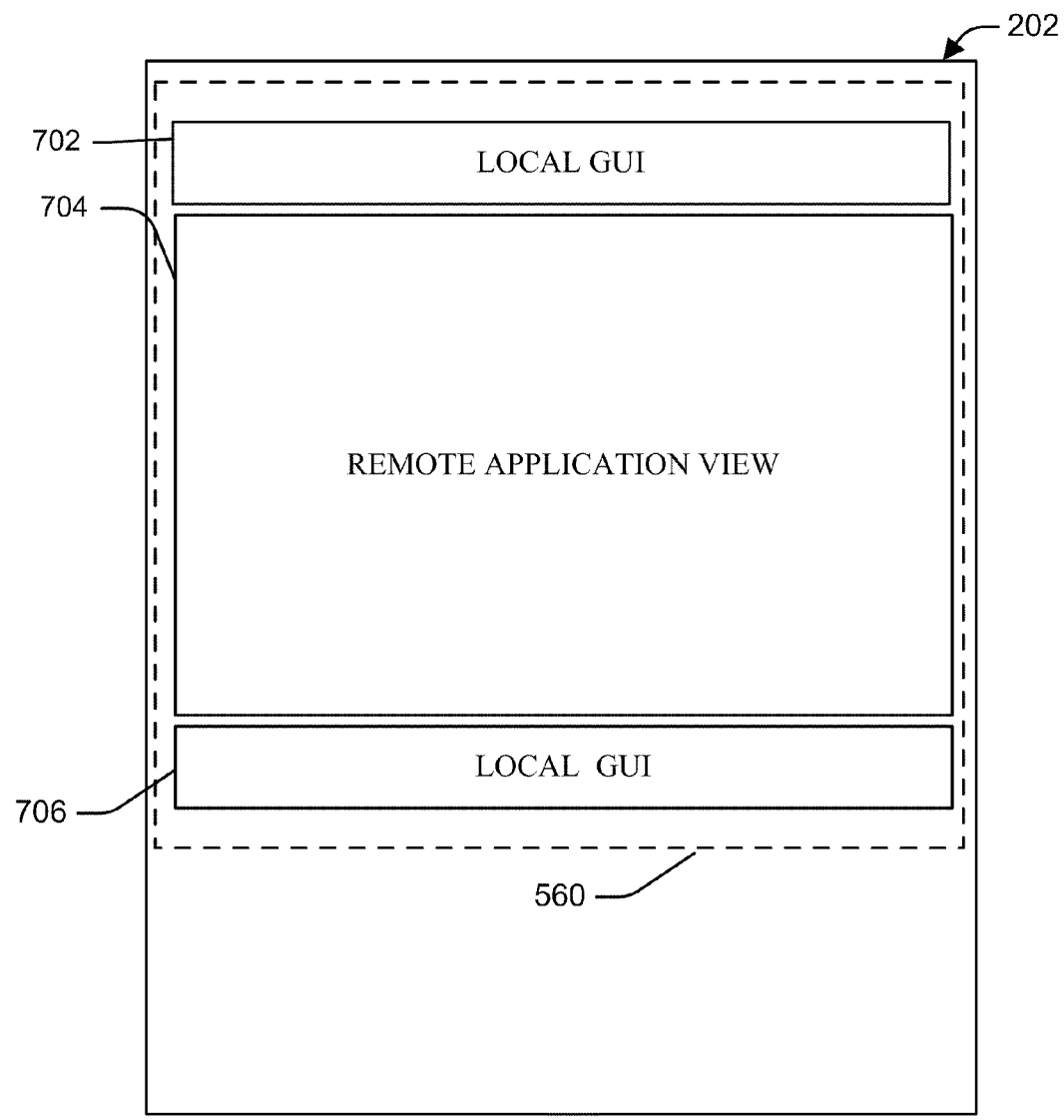
FIG. 7 illustrates a composite view at the client device according to certain aspects of the present disclosure.

FIG. 7 shows an example of a composite view rendered on a display 560 of a client device 202. In this example, the composite view includes a remote application view 704 for viewing an image of the display output of a remote application 327 running on the server 204. The remote application view is based on the display output data of the remote application 327 received from the server 204. The user may manipulate the image of the remote application 327 shown in the remote application view 704. For example, the remote application view 704 may be responsive to, for example, viewing selections by a user such as zooming factor, the depth of the color palette used, viewing angle (pan and tilt) and so on. The viewing selections may be provided in a GUI. The user may also zoom in and out within the remote application view 704 using any technique. For example, the user may zoom in by sliding two fingers on the display 560 away from each other and zoom out by sliding the fingers on the display towards each other on the display 560, which is currently supported by, for example, iPhone and Palm Pre. User inputs within the remote application view 704 are directed to the remote view module 535.

The composite view may also include a local GUI 702 and 706. The local GUI 702 may display a local header for the application shown in the display area 704. In one aspect, the local header may display an application name based on information received from the server 204. In another aspect, the local header may be locally generated (e.g., a remote session window). In yet another aspect, the local header may display an editable text input area, such as an address field for a web browser. The local GUI 706 may display, for example, local control GUI objects such as a local control GUI toolbar. The local control GUI objects may be based on information received from the remote server 204.

The dimensions and layouts of the remote application view 704 and local GUI 702 and 706 are not limited to the example shown in FIG. 7. The remote application view 704 and local GUI 702 and 706 may have other dimensions and layouts, for example, based on the remote application being accessed by the client device 202.

In one aspect, the local GUI 702 and 706 is not generated from the display output of a remote application 327 running on the server 204. For example, the local GUI 702 and 706 is not an image of the remote application's GUI generated from the display output of the remote application 327 running on the server 204. Instead, the local GUI is locally generated by the local view module 540, for example, based on configuration file 541 (shown in FIG. 5B). Furthermore, the configuration file 541 may be received by the local view module 540 from the application control module 325 or the agent module 322.

Figure 8A:
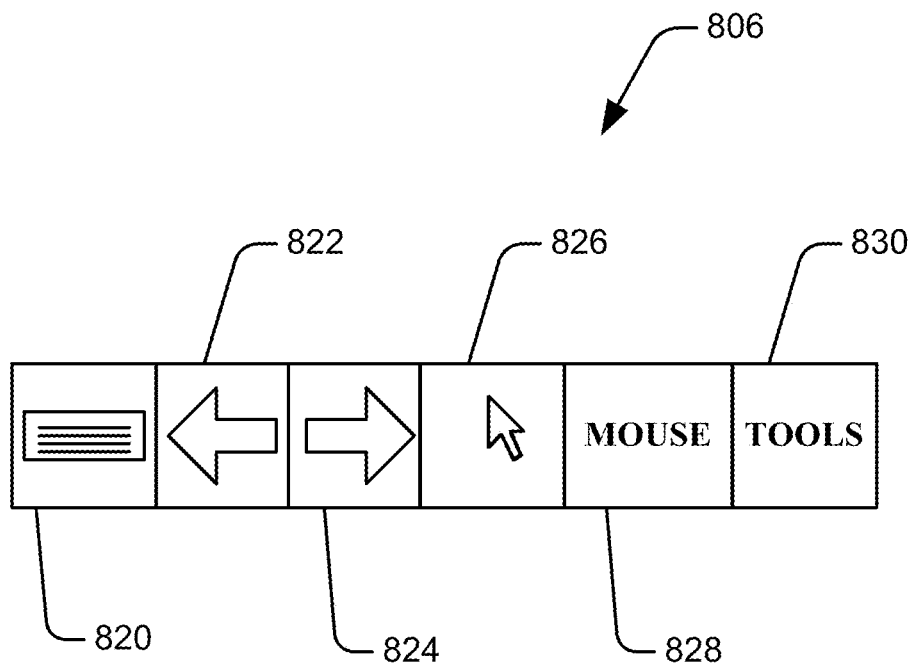
FIG. 8A illustrates an example of a local GUI according to certain aspects of the present disclosure.

FIG. 8A shows an example of a local control GUI 706. The local control GUI 706 comprises a toolbar 806 including graphical control objects. The graphical control objects may include a keyboard icon 820, a BACK arrow 822, a FORWARD arrow 824, a pointer icon 826, a MOUSE icon 828 and a TOOLS icon 830. When a user selects the keyboard icon 820 (e.g., by touching or tapping), the local view module 540 may change the local control GUI 806 to display a graphical keyboard 820a for the user to enter text (shown in FIG. 8B). The layout details of a keyboard 820a may be provided in a configuration file 541 (shown in FIG. 5B), or may be based on the local GUI tools provided by the OS 460 of the client device 202.

When a user selects the BACK icon 822, the web browser application displays a previously displayed web page. In certain embodiments, the client device 202 may perform this by communicating to the server 204, a control code corresponding to this event. In other embodiments, the client device 202 may include a local cache of previously displayed web pages and may use the cached data to render the previously displayed web page. In a manner similar to the BACK icon 822, the FORWARD icon 824 may be used to render a later viewed web page in the web browser. The pointer icon 826 may allow a user to activate a pointer within the display area of the remote application view 704. The MOUSE icon 828 may allow a user to activate a mouse cursor, which then will invoke mouse movements or mouse clicks, and the TOOLS icon 830 may open further menus containing additional tools, as provided in a configuration file and as provided by the OS 460 of the client device 202.

It will be appreciated by one skilled in the art that, according to one aspect of the disclosure, because the control objects of the local GUI are rendered locally, these objects can be advantageously rendered at the resolution of the local display 560 and can be rendered to have dimensions that can be easily navigated or handled by a user using a finger, a stylus or any other native navigation method(s) provided by the client device 202 (e.g., track-ball, keyboard, etc.). Furthermore, the available display area for the remote application view (e.g., 704) of a remote application can be fully dedicated to content displayed by the remote application by deactivating control GUI objects from the remote application view 704. For example, a web browser executed at a remote server 204 may be displayed in the remote application view 704 after deactivating scrollbars and menu header of the web browser at the server 204. The toolbar and the menu header controls can be provided by the local GUI instead.

Figure 9:
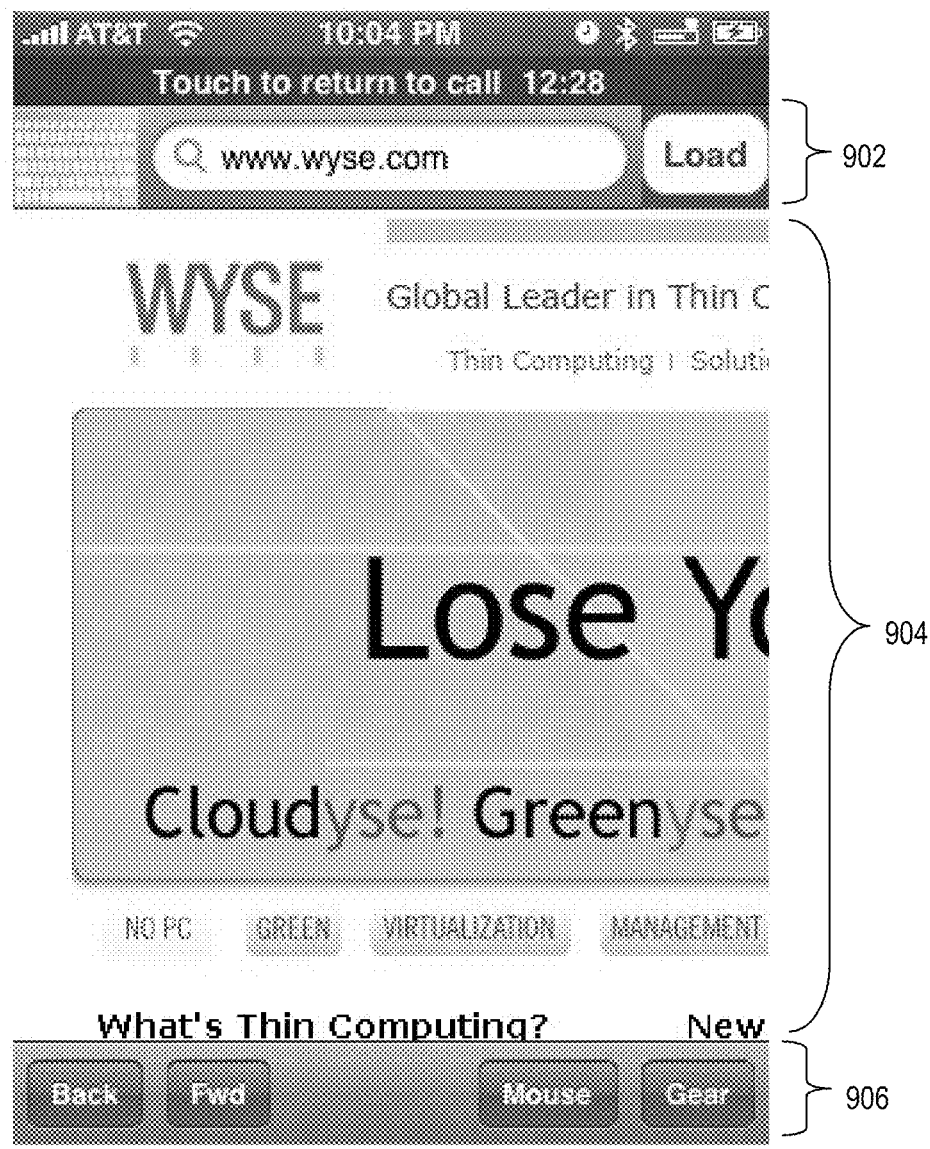
FIG. 9 illustrates a display at the client device according to certain aspects of the present disclosure.

FIG. 9 illustrates an example of a composite view 900 that may be rendered locally on display 560. The composite view 900 comprises the local GUI 902 and 906 and the remote application view 904 of a remote application 327 running on the server 204. In this example, the graphical control objects of the local GUI 902 and 906 include an IP address field, a LOAD button, a BACK button, a FORWARD button, a MOUSE button, and a GEAR button for remotely controlling a web browser application 327 running on the server 204.

Referring to the figures discussed above, various operations of the modules in a server 204 and in a client device 202 are further described below in accordance with one aspect of the disclosure.

Now referring to FIGS. 5B and 7, the client device 202 may further comprise an input device 560 and a user input module 550. In one example, the input device 560 comprises a touch screen overlaying the display 560. In this aspect, the user may enter user inputs within a display area corresponding to the local GUI 702 and 706 by tapping on a desired graphical control object using a finger or stylus. The user input module 550 may send user inputs to the local GUI 702 and 706 for remotely controlling the application 327 to the local view module 540. For the example of a touch screen, when the user touches a display area corresponding to the local GUI 702 and 706, the user input module 550 directs the corresponding user inputs to the local view module 540. The user inputs may comprise coordinates of the location where the user touched the display 560.

The user may also enter user inputs within a remote application view 704 of a remote application 327 on the display 560. For the example of a touch screen, the user may enter user inputs by moving a pointer (not shown) within a display area corresponding to the remote application view 704 of the remote application 327. In this aspect, the user input module 550 directs user inputs within the remote view 704 to the remote view module 535.

In one aspect of the disclosure, the local view module 540 may be configured to generate a command message based on user inputs to the local GUI 702 and 706 for remotely controlling the application 327 and send the command message to the server 204. For the example of a touch screen, the local view module 540 interprets user inputs to the local GUI 702 or 706 and then translates them into corresponding command messages. In this example, a user input may comprise coordinates of a location where the user touches the local GUI 702 or 706 on the display 560 or coordinates of a pointer within the local GUI 702 or 706 controlled by the user, for example, using a pointer device. The local view module 540 can determine which graphical control object is selected by the user based on the graphical control object in the local GUI 702 and 706 corresponding to the coordinates of the user inputs. The local view module 540 determines the function associated with the selected graphical control object and generates a command message for the server 204 with a command to perform the function. For example, if the user touches the local GUI 702 or 706 (e.g., using a finger) at a location corresponding to a refresh button in the local GUI 702 and 706, then the local view module 540 generates a command message for the server 204 to refresh the web page.

In one aspect, the agent module 322 on the server 204 receives the command message and issues a command to the application control module 325 to control the application 327 based on the command message. For example, if the command message is to refresh the web page, then the agent module 322 instructs the application control module 325 to reload the web page on the web browser application 327. Thus, the local view module 540 generates command messages based on user inputs to the local GUI and sends the command messages to the agent module 322 on the server 204, and the agent module 322 controls the remote application based on the received command messages using the application control module 325.

In one aspect, when a local view module 540 receives one or more user inputs directed to, or placed into, a local GUI (e.g., 702 or 706), the local view module 540 may interpret the one or more user inputs, determine (or identify) function(s) corresponding to the one or more user inputs, and generate one or more command messages corresponding to the function(s) by, for example, translating the one or more user inputs into the command message(s). Determining the function of a user input may, for example, include identifying the type of user input (e.g., a text entry, a button selection, a menu selection) and/or determining a function corresponding to the user input (e.g., a text entry for an IP address field, a selection of a BACK button, etc.). For example, when the user input comprises a selection of a button (e.g., refresh button) in the local GUI (e.g., based on coordinates of a user's touch on the display 560), the local view module 540 may determine the function (e.g., refresh current web page) associated with the selected button. In one aspect, these functions are predetermined. The local view module 540 then generates a command message based on the determined function. Some examples of command messages may include, but are not limited to, a command to load a web page from an IP address, display a previously viewed web page, display a later viewed web page, refresh or reload a current web page, stop loading of a webpage, zoom in or out, switch applications, open bookmarks or history (e.g., for a web browser application), and other commands. A command message may comprise a command packet that is transmitted from the client device 202 to the server 204 using various protocols, compressions and encryption schemes. The server 204 may also send commands and status information to the client device 202. For example, the server 204 may send the client device 202 a web page loading status, a redirected URL or keyboard state.

In one aspect, the remote view module 535 may be configured to send user inputs received within the remote application view 704 to the server 204 via the remote access module 452. The user inputs may include pointer inputs comprising coordinates of pointer movements and clicks (e.g., mouse clicks). For example, the user may move a pointer (not shown) within the remote application view 704 using a touch screen, a touch pad, a trackball, a mouse or other pointer input device. In this example, the coordinates of the pointer movements may be transmitted to the server 204. The user inputs may also include keyboard inputs. The user inputs may enter keyboard inputs using a graphical keyboard (e.g., 820*a*) displayed on the display 560, a keypad or other device. For example, when the user desires to enter text at the location of a pointer or cursor within the remote application view 704, the user may tap on a keyboard icon (e.g., 920) to bring up the graphical keyboard to enter the text. In one aspect, the client device access module 452 may send user inputs comprising pointer inputs (e.g., coordinates of pointer movements) and keyboard inputs to the server 204 using RDP, ICA or other remote access protocol.

In one aspect, the server remote access module 334 may receive the user inputs from the client remote access module 452 over the remote access connection 525 and sends the user inputs to the application control module 325. The application control module 325 interprets the received user inputs and controls the application 327 accordingly.

In one aspect, when an application 327 updates its display output in response to a received command message or user inputs, the remote access module 334 may send updated display output data to the client device 202. The client remote access module 452 receives the updated display output data of the remote application 327 and sends the updated display output data to the remote view module 535. The remote view module 535 then generates an updated image of the display output of the remote application, which is displayed within the remote application view 704 of the display 560.

Aspects of the disclosure allow the user at the client device 202 to remotely view an application running on the server 204 while controlling the application using a local GUI that can be optimized for the display 560 of the client device 202.

An advantage of aspects of the disclosure may be illustrated with reference to FIGS. 9 and 1B. FIG. 9 shows an example of a composite view 900 at the client device 202 for a web browser application running on the server 204, according to an aspect of the disclosure. In this example, the GUI of the application 327 running on the server 204 may be similar to the GUI 122 shown in FIG. 1B, which is designed for a large display. Instead of displaying an image of the remote application's GUI 122 running on the server 204, the local view module 540 advantageously generates and displays a local GUI 902 and 906 for controlling the remote application 327. In one aspect, the local GUI 902 and 906 in FIG. 9 is not based on the display output of the remote application 327. The local GUI 902 and 906 may be optimized for the display 560 of the client device 202. An image of the display output of the remote web browser application 327 is displayed within the remote application view 904 allowing the user at the client device 202 to remotely view the web browser application 327 while remotely controlling the web browser application 327 using the local GUI 902 and 906.

The local GUI 702 and 706 may be designed to have a similar look and feel of a web browser application that is native to the client device (e.g., smartphone). This allows the user at the client device to control a web browser application 327 running on a server 204 in a similar manner as a web browser that is native to the client device (e.g., smartphone), while enjoying the benefits of server-side computing such as increased computing power and resources available on the server 204. For example, a web browser application 327 running on a server has access to plug-in applications on the server 204 for rendering multi-media content. As a result, the plug-in applications do not have to be, for example, loaded onto the client device 202. Another advantage of the local GUI is that it allows a user at the client device 202 to use the application on the server 204 in a user friendly environment without having to extensively rewrite the application or port the application to the client device.

In an aspect of the disclosure, the local GUI and the remote application view 704 on the display 560 can be controlled independently. For example, the remote view module 535 may allow the user to adjust the zoom and scroll the image of the remote application 327 within the remote application view 704 while the local view module 540 maintains the size and location of the local GUI 702 and 706 on the display 560. Thus, the local GUI 702 and 706 can remain on the display 560 and be readily accessible to the user while the user manipulates the image of the remote application within the remote application view 704.

In an aspect of the disclosure, the agent module 322 may instruct the application control module 325 to deactivate the GUI of the application 327 so that display output data of the application 327 sent to the client device 202 does not include the GUI of the application. For the example of the web browser 120 running on a server in FIG. 1B, the agent module 322 may deactivate the GUI 122 so that only the display of the web content 124 is sent to the client device 202. This allows a user at the client device 202 to view the web content 124 of the web browser 120 running on the server 204 while controlling the web browser 120 with the local GUI 702 and 706 instead of the remote application's GUI 122 running on the server 204.

The local GUI at the client device 202 is not limited to the example of a web browser application and may be used to remotely control many other applications on the server 204. Examples of applications that may be controlled by local GUIs include word processing applications, spread sheet applications, multi-media player applications, electronic mail applications, and other applications. For the example of a word processing application, the local GUI may include graphical control objects for print, edit, and formatting functions. For a multi-media player, the local GUI may include graphical control objects for play, stop and rewind functions.

In one aspect, the client device 202 may have a plurality of local GUIs for controlling different applications. In this aspect, when the user at the client device 202 remotely launches an application on the server 204, the agent module 322 may determine what type of application was launched. The agent module 322 may then send a message to the client device 202 via the server remote access module 334 indicating the type of application that was launched on the server 204. The client remote access module 452 sends the received message to the local view module 540. The local view module 540 may then select a local GUI from a plurality of local GUIs that matches the type of application indicated by the received message. The agent 322 may also send a configuration file to the client device 202 specifying the local GUI. Thus, the local view module 540 can change the local GUI to adapt to changes in the application running on the server 204.

Figure 10:
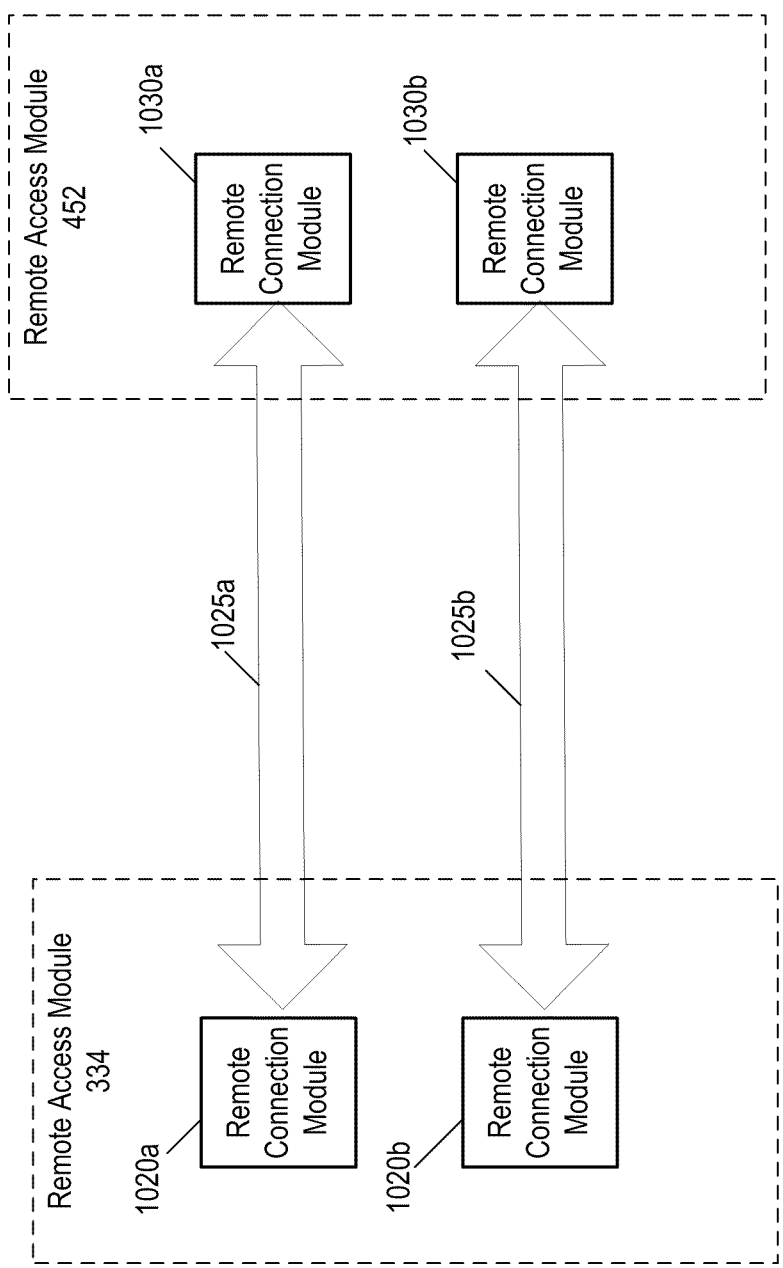
FIG. 10 is a conceptual block diagram of server and client remote access modules according to certain aspects of the present disclosure.

FIG. 10 is a conceptual block diagram illustrating a server remote access module 334 and a client remote access module 452 according to an aspect of the disclosure. In one aspect, a server remote access module 334 comprises first and second server remote connection modules 1020a and 1020b and the client remote access module 452 comprises first and second client remote connection modules 1030a and 1030b. The first server remote connection module 1020a and the first client remote connection module 1030a communicate over connection 1025a. The second server remote connection module 1020b and the second client remote connection module 1030b communicate over connection 1025b. The connections 1025a and 1025b may be established between the server 204 and the client device 202 over a network 206 using different sockets. In this aspect, different types of information may be communicated over the different connections 1025a and 1025b.

In one aspect of the disclosure, the first server remote connection module 1020a and the first client remote connection module 1030a are implemented using a remote access application (e.g., RDP application) for communicating display output data and user inputs between the server 204 and the client device 202. The connection 1025a may comprise a plurality of virtual channels with different virtual channels carrying display output data (e.g., images or audio output of a remote application) and user inputs (e.g., pointer and keyboard inputs from a user at a client device) between the server 204 and the client device 202.

The second server remote connection module 1020b and the second client remote connection module 1030b may be configured to communicate command messages over the connection 1025b. In this aspect, the second client remote connection module 1030b sends command messages from the local view module 540 to the server 204 over the connection 1025b. The second client remote connection module 1020b communicates the received command messages to the agent module 322. In this aspect, the agent module 322 may manage the connection 1025b. In one aspect, the second remote connection module 1020b may be integrated with the agent module 322. Thus, in this aspect, the command messages are communicated over a different connection than the display data and user inputs. An advantage of this aspect is that the command messages may be communicated using a different protocol than the display data and user inputs. For example, the display output data and user inputs may be communicated using a remote access protocol (e.g., RDP) while the command messages are communicated using a different protocol. For example, the command messages may be communicated using a protocol having different encryption, compression and/or security features than the remote access protocol.

Figure 11:
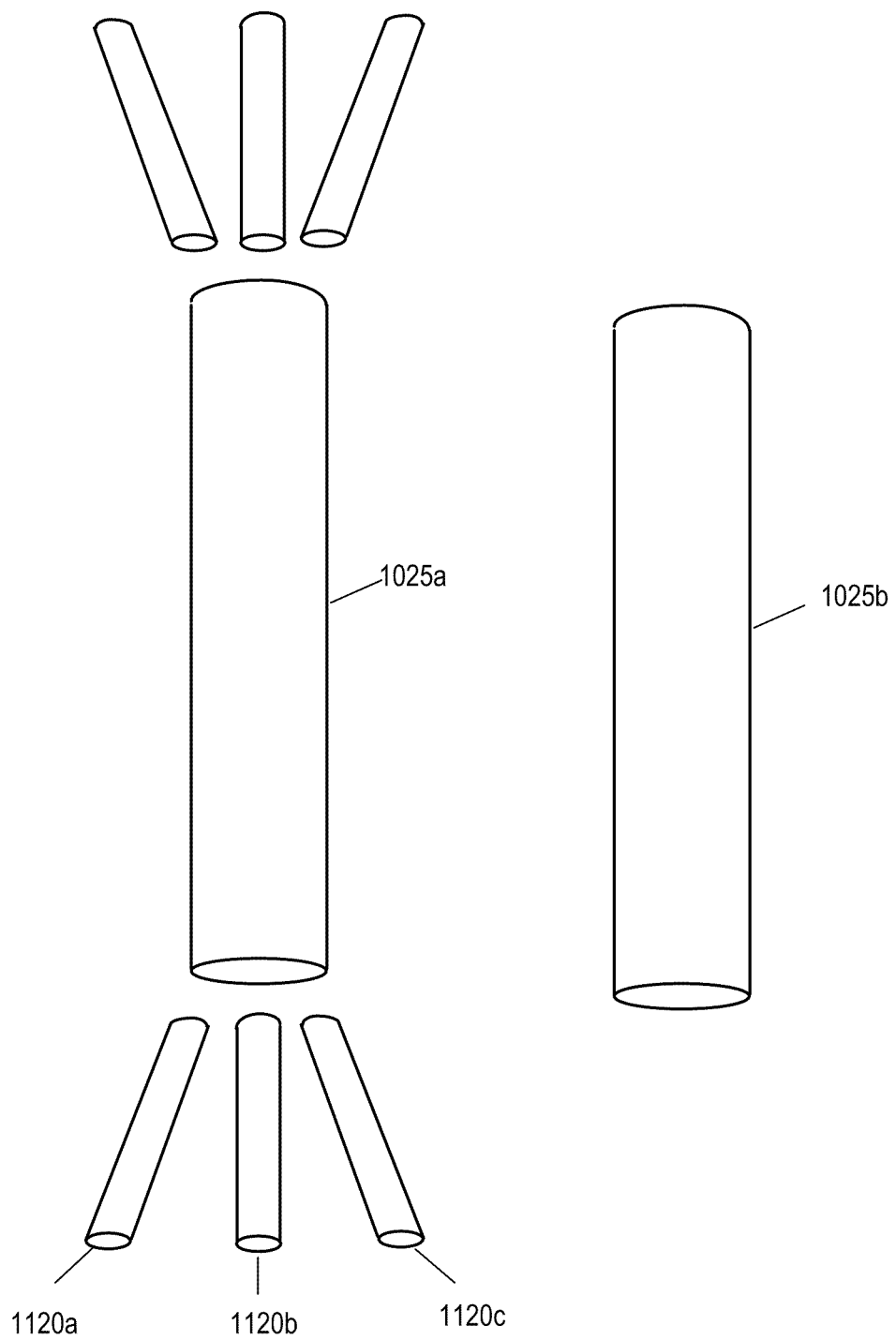
FIG. 11 illustrates an example of a plurality of connections between the server and the client device.

FIG. 11 depicts an example of the connection 1025a comprising multiple virtual channels 1120a to 1120c and the connection 1025b. In this example, the connection 1025a may be based on a remote access protocol (e.g., RDP) for communicating display output data and user inputs on different virtual channels 1120a to 1120c. The connection 1025b is used to communicate command messages. Alternatively, the command messages may be sent over the connection 1025a, in which case the second remote connection modules 1020b and 1030b may be omitted. For example, the command messages may be sent on a virtual channel of the connection 1025a established for command messages. In an aspect, a command message may include a flag or other indicator identifying the message as a command message.

FIGS. 10 and 11 illustrate merely examples of communications between a server and a client device. A server may include one or more remote connection modules (e.g., one, two, three or more), and a client device include one or more remote connection modules (e.g., one, two, three or more).

Figure 12:
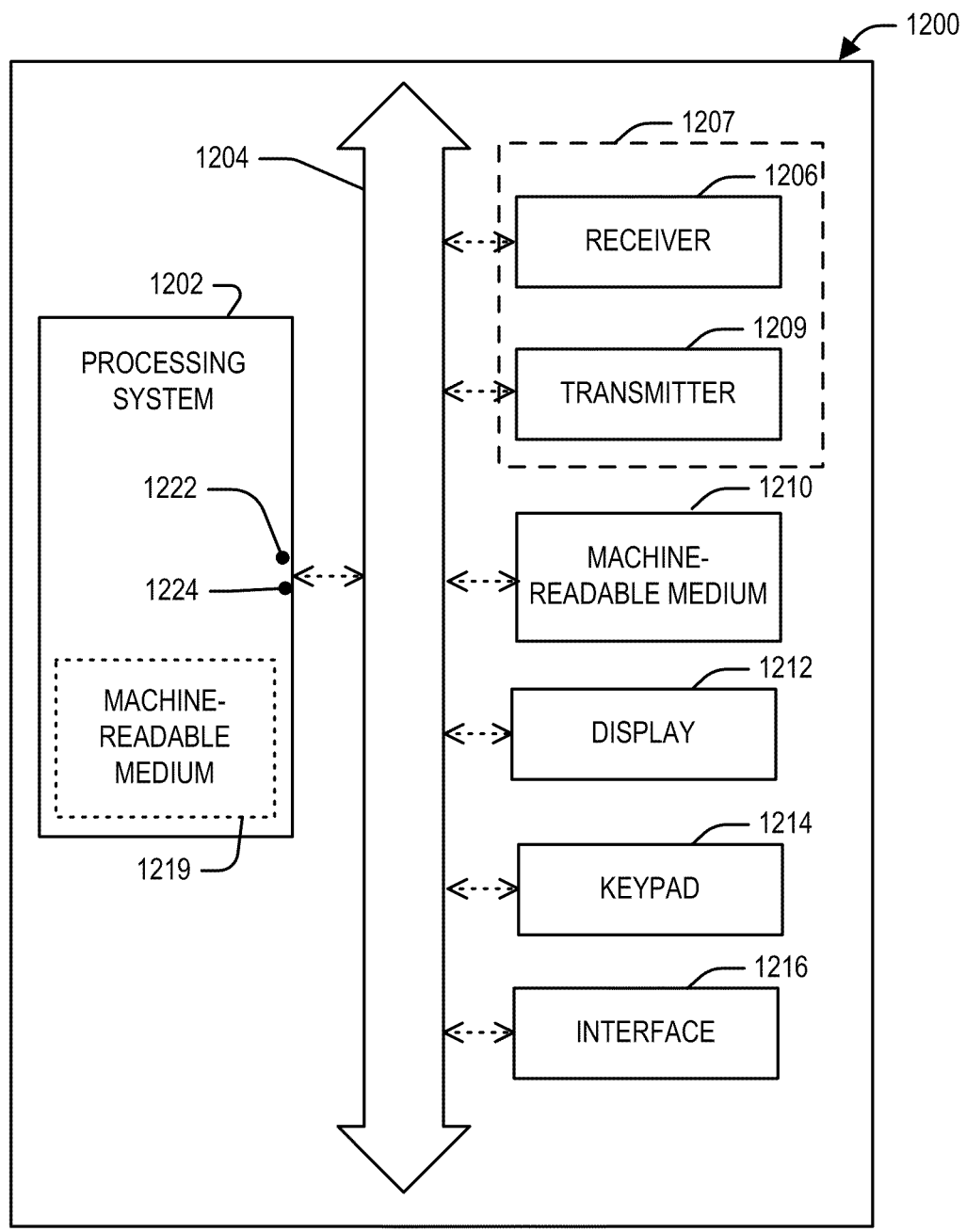
FIG. 12 is a block diagram that illustrates an exemplary computing system in accordance with certain embodiments of the present disclosure.

FIG. 12 is a conceptual block diagram illustrating an example of a system.

A system 1200 may be, for example, a client device or a server. The system 1200 includes a processing system 1202. The processing system 1202 is capable of communication with a receiver 1206 and a transmitter 1209 through a bus 1204 or other structures or devices. It should be understood that communication means other than busses can be utilized with the disclosed configurations. The processing system 1202 can generate audio, video, multimedia, and/or other types of data to be provided to the transmitter 1209 for communication. In addition, audio, video, multimedia, and/or other types of data can be received at the receiver 1206, and processed by the processing system 1202.

The processing system 1202 may include a general-purpose processor or a specific-purpose processor for executing instructions and may further include a machine-readable medium 1219, such as a volatile or non-volatile memory, for storing data and/or instructions for software programs. The instructions, which may be stored in a machine-readable medium 1210 and/or 1219, may be executed by the processing system 1202 to control and manage access to the various networks, as well as provide other communication and processing functions. The instructions may also include instructions executed by the processing system 1202 for various user interface devices, such as a display 1212 and a keypad 1214. The processing system 1202 may include an input port 1222 and an output port 1224. Each of the input port 1222 and the output port 1224 may include one or more ports. The input port 1222 and the output port 1224 may be the same port (e.g., a bi-directional port) or may be different ports.

The processing system 1202 may be implemented using software, hardware, or a combination of both. By way of example, the processing system 102 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1219) may include storage integrated into a processing system, such as might be the case with an ASIC. Machine-readable media (e.g., 1210) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 1202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client device or server or by a processing system of a client device or server. Instructions can be, for example, a computer program including code.

An interface 1216 may be any type of interface and may reside between any of the components shown in FIG. 12. An interface 1216 may also be, for example, an interface to the outside world (e.g., an Internet network interface). A transceiver block 1207 may represent one or more transceivers, and each transceiver may include a receiver 1206 and a transmitter 1209. A functionality implemented in a processing system 1202 may be implemented in a portion of a receiver 1206, a portion of a transmitter 1209, a portion of a machine-readable medium 1210, a portion of a display 1212, a portion of a keypad 1214, or a portion of an interface 1216, and vice versa.

Referring back to FIGS. 2 through 5B and 8B, in one aspect of the disclosure, the agent module 322 may be configured to receive notification of events that occur at the server 204 from the OS module 324. For example, the OS module 324 may report certain events to the agent module 322 including when the client device 202 has logged onto the server 204, when an application is launched on the desktop, when a dialog box or new window is opened, when a textbox field is clicked, pointer movements, clicks (e.g., mouse clicks), and/or other events. To receive notification of events, the agent module 322 may register as an events handler with the OS module 324 to receive reports of certain events.

In one aspect of the disclosure, the agent module 322 may determine an action to be taken at the client device 202 based on the reported event. The agent module 322 may then generate a message based on the determined action and send the message to the client device 202 (e.g., via the server remote access module 334). For example, when the event is a click on a textbox, the agent module 322 may determine that a graphical keyboard is to be activated on the client device 202 and send a message to the client device 202 to activate the graphical keyboard 820a. At the client device 202, the local view module 540 receives the message from the agent module 322 and performs an action based on the received message, as discussed further below. In the above example, the local view module 540 may bring up the graphical keyboard 820a on the display 560 in response to the message.

Examples of events that may be reported to the agent module 322 and messages generated by the agent module 322 for the client device 202 based on the reported events are discussed further below.

In one aspect of the disclosure, the OS module 324 may report a click on a textbox to the agent module 322. This may occur, for example, when user inputs (e.g., pointer movements and a click) received from the client device 202 result in a textbox of the application 327 being clicked on. When this event occurs, the agent module 322 may determine that a graphical keyboard is to be activated on the client device 202 for the user at the client device 202 to enter text. The agent module 322 may then generate a message for the client device 202 including a command to bring up the graphical keyboard 820a on the display 560 of the client device 202, and send the message to the client device 202 (e.g., via the server remote access module 334).

On the client side, the client remote access module 452 receives the message and sends the received message to the local view module 540. Upon reading the received message, the local view module 540 brings up the graphical keyboard 820a on the display 560 of the client device 202 to allow the user at the client device 202 to enter text. An example of this is illustrated in FIGS. 14A and 14B.

Figure 14A:
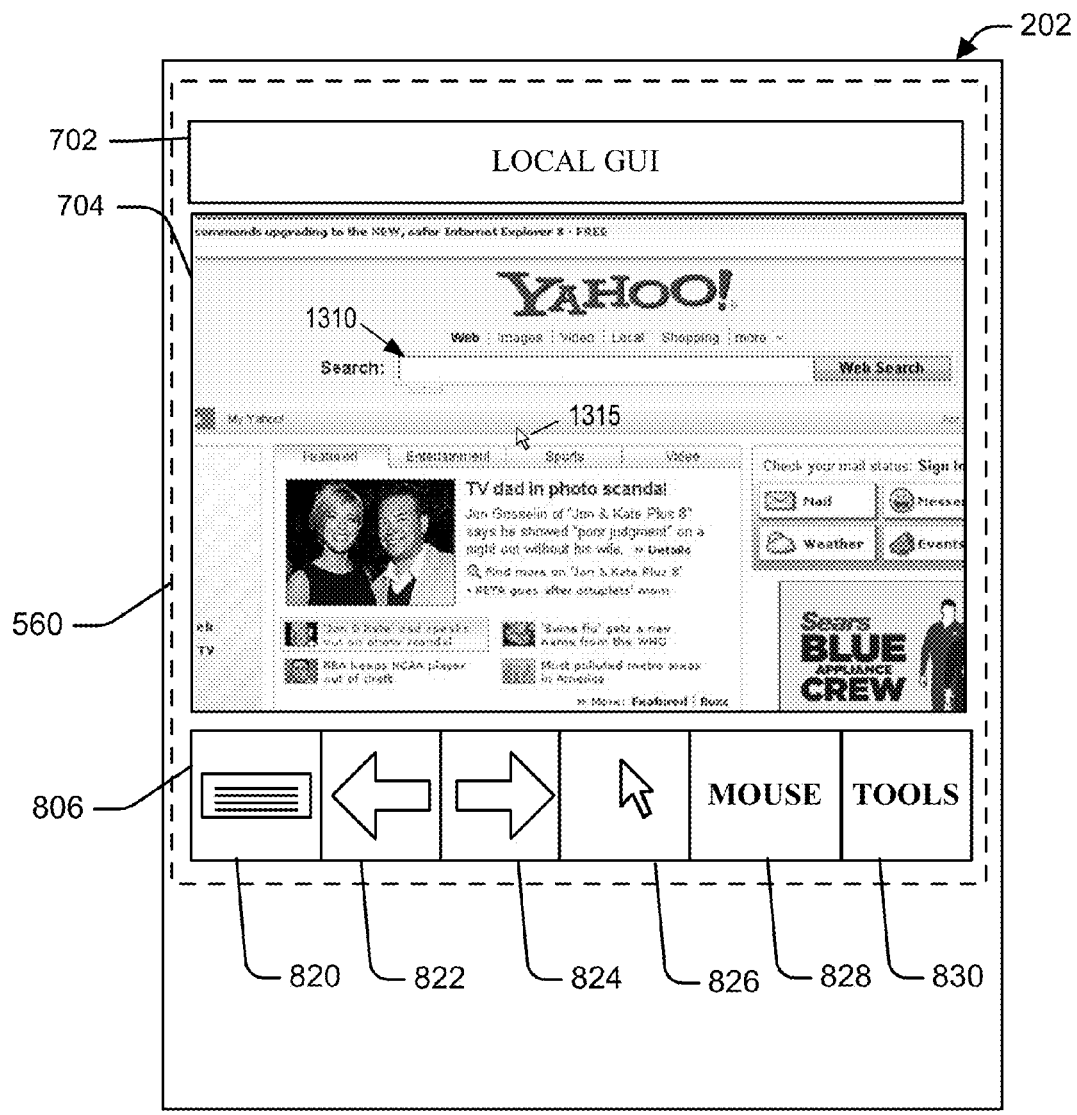
FIG. 14A illustrates an example of a remote application displayed at a client device.
Figure 14B:
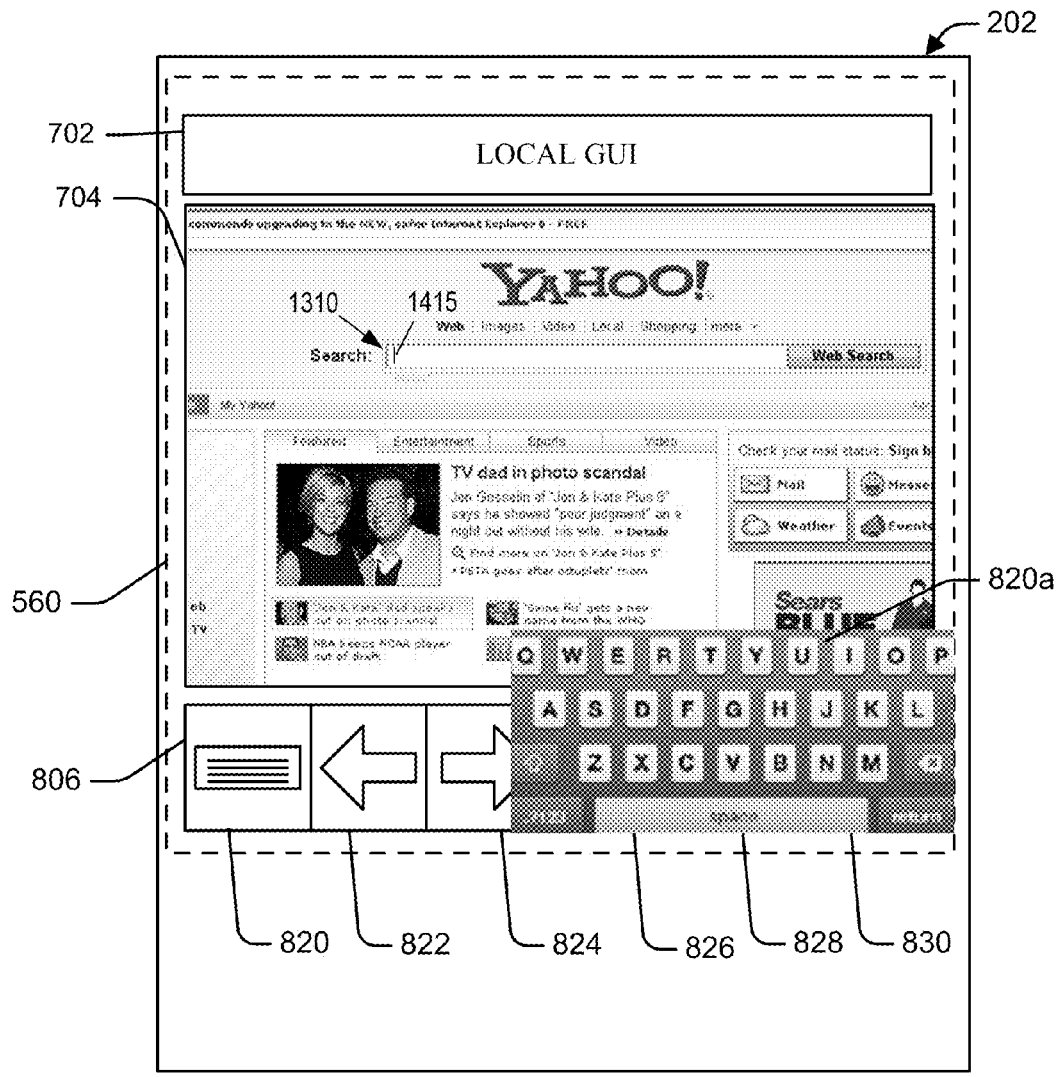
FIG. 14B illustrates an example of a graphical keyboard displayed at the client device for entering text for the remote application.

FIG. 14A shows a display 560 at the client device 202, in which the remote application view 704 displays a web page of a remote web browser application 327. The web page includes a textbox 1310 (e.g., search textbox). In this example, the user at the client device 202 inputs user inputs (e.g., pointer movements and clicks) using a touch screen or other pointer input device at the client device 202. The remote view module 535 sends the user inputs to the server 204 (e.g., via the client remote access module 452). On the server side, the application control module 325 controls the web browser application 327 based on the received user inputs. Updated display output data of the web browser application 327 in response to the user inputs are sent to the client device 202. On the client side, the remote view module 535 updates the image in the remote application view 704 based on the received updated display output data.

On the server side, if a received pointer movement and click result in a textbox being click on, then the OS module 324 reports this event to the agent module 322. The agent module 322 determines that a graphical keyboard 802a is to be activated at the client device 202 and generates a message for the client device 202 including a command to activate the graphical keyboard 820a. The agent module 322 then sends the message to the client device 202. On the client side, the local view module 540 receives the message and brings up the graphical keyboard 820a on the display 560 in response to the message. FIG. 14B shows the display 560 at the client device 202, in which the graphical keyboard 820a is brought up on the display 560 after the textbox 1310 has been click on. An I-beam 1415 or other type of cursor may appear in the textbox 1310 to indicate that text will be entered into the textbox 1310.

As the user at the client device 202 inputs text using the graphical keyboard 820a, the text inputs to the graphical keyboard 820a may be directed to the remote view module 535, for example, as if the user had entered the text using a physical keyboard. The remote view module 535 may then send the user text inputs to the server 204 (e.g., using a RDP/ICA or other remote access protocol). On the server side, the application control module 325 enters the received text into the textbox. Updated display output data showing the inputted text in the textbox is then sent back to the client device 202. In this aspect, when the user at the client device 202 hits the enter button on the graphical keyboard 820a after entering text, the local view module 540 may automatically deactivate the graphical keyboard 820a.

An advantage of this aspect is that the graphical keyboard 820a is automatically brought up on the display 560 when the textbox 1310 is clicked on without requiring the user at the client device 202 to hit the keyboard button 820. This is not possible in other approaches in which only display output data of the remote application 327 is sent to the client device 202. In these approaches, the client device 202 simply displays the display output of the remote application 327 and receives no information about when a textbox of the remote application is clicked on. By contrast, in the above aspect, the agent module 322 determines when the textbox has been clicked on and sends a message to the client device 202 to bring up the graphical keyboard 820a.

Figure 15A:
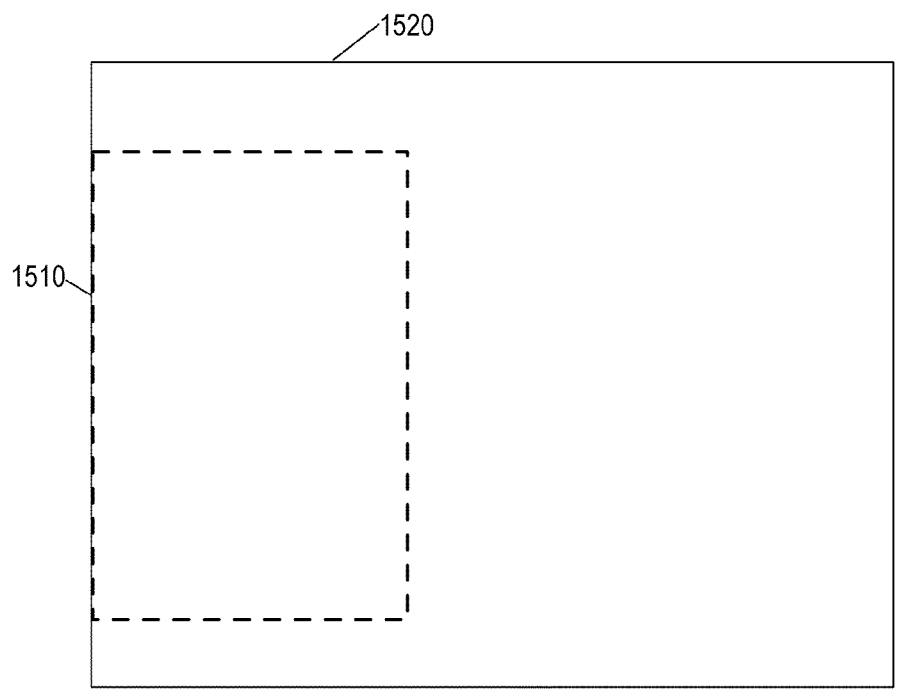
FIG. 15A illustrates an example of an area of the display output of a remote application that is displayed in a remote application view of a client device.

In one aspect, the local view module 540 keeps track of the area of the display output of the remote application 327 that is currently displayed in the remote application view 704. FIG. 15A shows an exemplary area 1510 of the display output 1520 that may be displayed in the remote application view 704. In this example, the total area of the display output 1520 may represent what a user at the server 204 might see on a large display at the server 204. In this example, the server 204 may send the entire display output of the remote application 327 to the client device 202, and the client device 202 may store the entire display output in a machine-readable medium (e.g., cache memory).

Figure 15B:
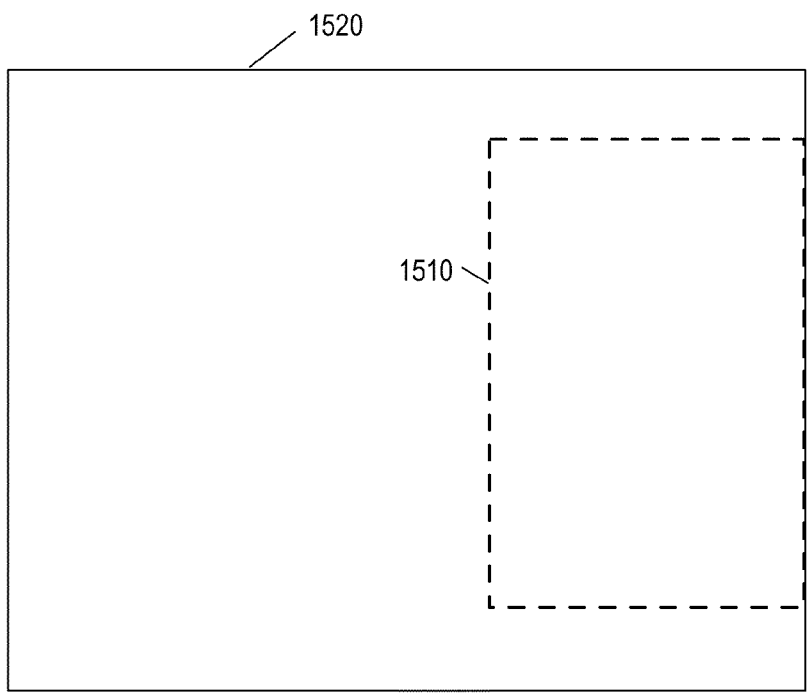
FIG. 15B illustrates an example in which the area of the display output in FIG. 15A is scrolled to the right.

The local view module 540 may then allow the user to manipulate the area 1510 of the display output that is displayed in the remote application view 704. For example, the local view module 540 may allow the user to zoom in by moving two fingers away from each other on a touch screen 565 starting at a desired zoom in location. The local view module 540 may also include zoom in and zoom out buttons on the local GUI 702 and 706. The local view module 540 may also display scrollbars on the display 560 that allow the user to scroll (up, down, left, right) the area 1510 of the display output 1520 displayed in the remote application view 704. FIG. 15B shows an example in which the area 1510 of the display output 1520 displayed in the remote application view 704 has been scrolled to the right. In this aspect, the local view module 540 may send a command to the remote view module 535 specifying which area 1510 of the display output 1520 to display in the remote application view 704 based on inputs from the user. The command may include coordinates and dimensions of the area 1510 to be displayed in the remote application view 704.

As discussed further below, the local view module 540 may keep track of the area 1510 of the display output 1520 displayed in the remote application view 704 to determine whether the user at the client device 202 can view certain events (e.g., a dialog box popup) communicated to the local view module 540 by the agent module 322.

In one aspect of the disclosure, the OS module 324 may report to the agent module 322 when a dialog box and/or window opens as a result of user inputs (e.g., pointer movements and clicks) received from the client device 202. For example, a dialog box may open when a pointer is moved over an object (e.g., icon) and/or when a object is clicked on. The dialog box may display information to the user and/or request information from the user. For an example of a web browser application 327, a new browser window may open when the user clicks on a link.

When the OS module 324 reports that a dialog box and/or window has opened, the agent module 322 may determine that the dialog box and/or window is to be displayed to the user at the client device 202. In this aspect, the OS module 324 may also communicate the coordinates and dimensions of the dialog box or window to the agent module 322. The agent module 322 may then generate a message for the client device 202 including the coordinates and dimensions of the dialog box or window. The agent module 322 may then send the message to the client device 202 (e.g., via the server remote access module 334).

On the client side, the client remote access module 452 receives the message and sends the received message to the local view module 540. Upon reading the received message, the local view module 540 may determine whether the newly opened dialog box or window is currently shown in the remote application view 704. The local view module 540 may do this, for example, by comparing the coordinates and dimensions of the dialog box or window with the coordinates and dimensions of the area 1510 of the display output 1520 displayed in the remote application view 704. If the dialog box or window is not currently shown in the remote application view 704, then the local view module 540 may command the remote view module 535 to scroll and/or zoom out the remote application view 704 by a certain amount so that the dialog box or window is shown in the remote application view 704. The local view module 540 may determine the amount that the remote application view 704 needs to be scrolled and/or zoomed out based on differences between the coordinates and/or dimensions of the dialog box or window and the coordinates and/or dimensions of the area 1510 of the remote application view 704. An example of this is shown in FIGS. 16A and 16B.

Figure 16A:
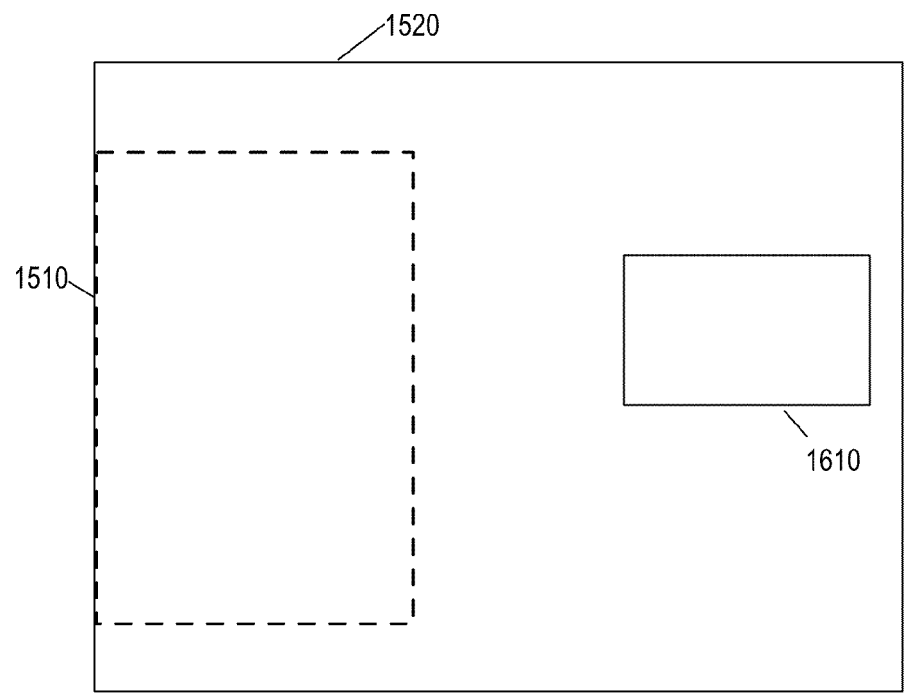
FIG. 16A illustrates an example in which a dialog box or window is located outside the area of the display output displayed in the remote application view.
Figure 16B:
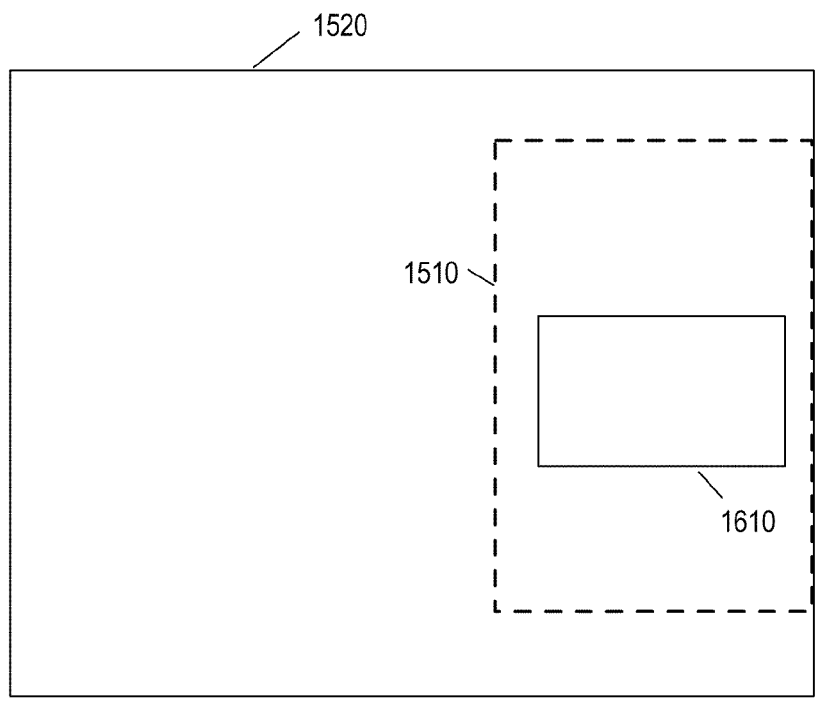
FIG. 16B illustrates an example in which the area of the display output displayed in the remote application view is scrolled to the right to encompass the dialog box or window.

FIG. 16A shows an example in which a dialog box or window 1610 opens outside the area 1510 of the remote application view 704. As a result, the user at the client device 202 cannot see the dialog box or window 1610. For example, the dialog box 1610 may require certain information (e.g., billing information) from the user to continue with a transaction (e.g., purchase). In this example, if the user cannot see the dialog box 1610 at the client device 202, then the user may be unaware that information is being requested.

In this example, the agent module 322 may send the coordinates and dimensions of the dialog box 1610 to the local view module 540 on the client side. The local view module

540 may then determine that the dialog box 1610 is not displayed in the remote application view 704. After making this determination, the local view module 540 may command the remote view module 535 to scroll the remote application view 704 so that the dialog box 1610 is shown in the remote application view 704. FIG. 16B shows an example in which the area 1510 of the remote application view 704 has been scrolled to the right so that the dialog box 1610 is shown in the remote application view 704. The local view module 540 may also command the remote view module 535 to zoom out the remote application view 704 so that the dialog box 1610 is shown in the remote application view 704. This advantageously allows the user at the client 204 to view the dialog box 1610 in order to receive information in the dialog box 1610 and/or enter information requested by the dialog box 1610.

In one aspect, the local view module 540 may notify the user at the client device 202 when a dialog box or window 1610 opens outside the area 1510 of the remote application view 704. In this aspect, the local view module 540 may display an arrow or other indicator on the display 560 indicating the direction of the dialog box or window 1610. The user may then choose whether to scroll the remote view application 704 in the indicated direction to view the dialog box or window 1610.

In one aspect, the OS module 324 may also report to the agent module 322 when the dialog box or window closes. For example, a dialog box may close when the user has entered information requested by the dialog box. In this aspect, the agent module 322 may send a message to the local view module 540 indicating that the dialog box or window has closed. The local view module 540 may then command the remote view module 535 to return the area 1510 of the remote application view 704 back to its original location before the dialog box or window was opened. In other words, the local view module 540 may undo the scrolling and/or zooming when the dialog box or window closes.

In one aspect, the OS module 324 may also report to the agent module 322 when a new web page is loaded in a web browser application 327. The agent module 322 may then send a message to the local view module 540 informing the local view module 540 that a new web page has been loaded. The local view module 540 may then command the remote view module 535 to zoom out the remote application view 704 to show substantially the entire display output 1520. This aspect automatically gives the user at the client device 202 an overview of content in the newly loaded web page. The user may then decide to zoom and/or scroll the remote application view 704 to focus on a desired portion of the new web page.

In one aspect, the OS module 324 may report the current coordinates (e.g., x-y coordinates) of the pointer to the agent module 322. The coordinates of the pointer may refer to coordinates of a pointer moved by the user at the client device 202 using a pointer input device or coordinates of a location where the user touches a display 560 at the client device 202 (e.g., using a touch screen overlaying the display 560). The agent module 322 may use the current coordinates of the pointer to determine whether the pointer is on an object (e.g., picture) in the application 327. The agent module 322 may do this, for example, by determining the coordinates and dimensions of objects in the application 327 and comparing the coordinates and dimensions of the objects with the reported coordinates of the pointer.

For an example of a web browser application 327, the agent module 322 may determine the coordinates (e.g., x-y coordinates) and dimensions (e.g., width and height) of objects (e.g., pictures, icons, animations, banners, etc.) in a web page by analyzing markup language code (e.g., HTML, XML, etc.) for the web page. The agent module 322 may receive the markup language code from the application control module 325. The markup language code for the web page may identify objects in the web page and their locations in the web page. The markup language code may also provide attributes for each object including object type (e.g., picture) and dimensions (e.g., height and width) of the object. The agent module 322 may use this information to determine the types of objects in the web page and the coordinates and dimensions of the objects in the web page. The agent module 322 may make this determination each time a new web page is loaded into the web browser application 327.

In this aspect, when the agent module 322 determines that the pointer is on an object in the application, then the agent module 322 may determine that substantially the entire object is to be displayed at the client device 202. The agent module 322 may then send a message to the client device 202 including information of the object. The information may include object type (e.g., picture) and the coordinates and dimensions of the object. On the client side, the local view module 540 may receive the coordinates and dimensions of the object and use the received coordinates and dimensions of the object to determine whether substantially the entire object is shown in the remote application view 704. The local view module 540 may do this, for example, by comparing the coordinates and dimensions of the object with the coordinates and dimensions of the area 1510 of the remote application view 704.

If the local view module 540 determines that substantially the entire object is not shown in the remote application view 704, then the local view module 540 may command the remote view module 535 to scroll and/or zoom the remote application view module 535 by a certain amount to show substantially the entire object. The local view module 540 may determine the amount based on differences between the coordinates and dimensions of the object and the coordinates and dimensions of the area 1510 of the remote application view 704. An example of this is illustrated in FIGS. 17 and 18.

Figure 17:
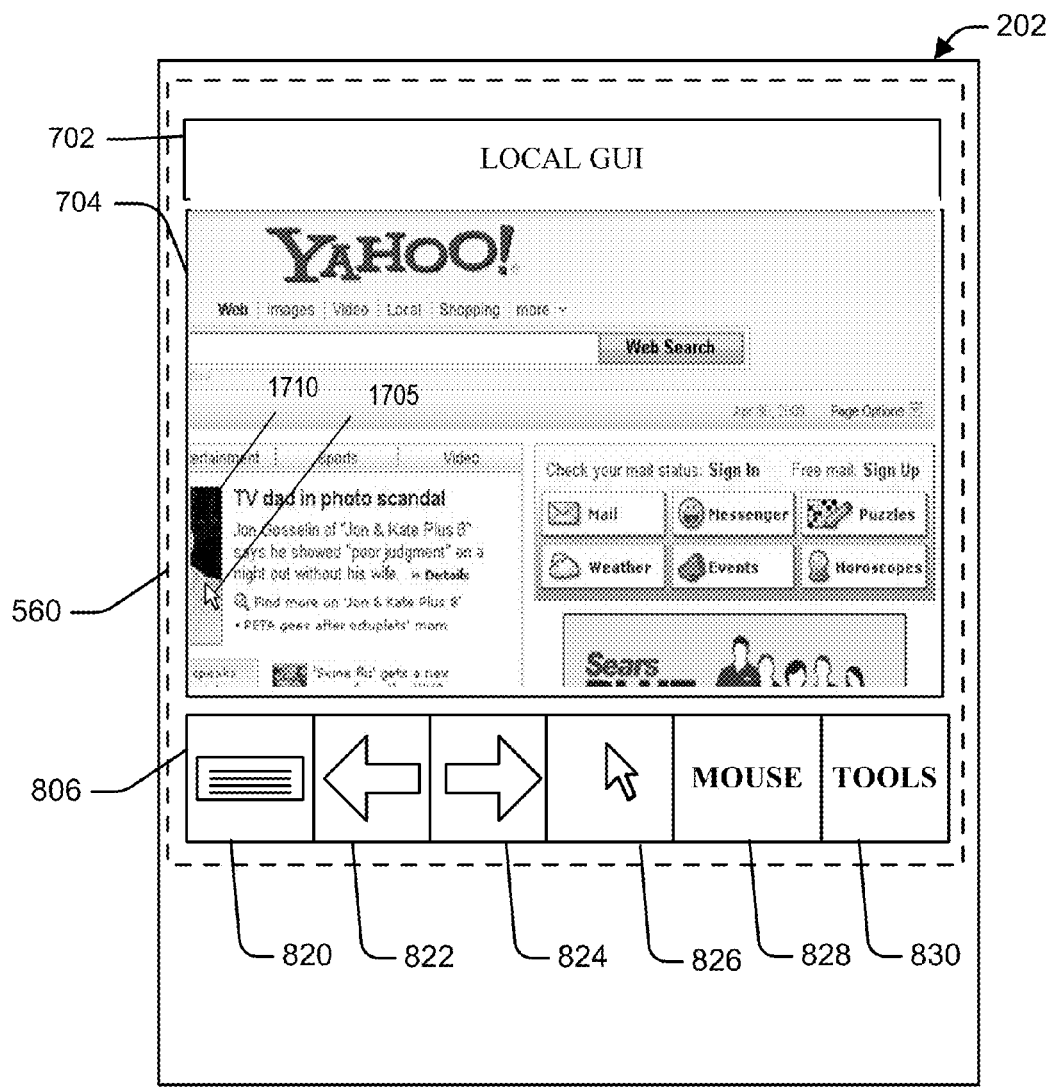
FIG. 17 illustrates an example in which a portion of an object of a remote application is displayed at a client device.
Figure 18:
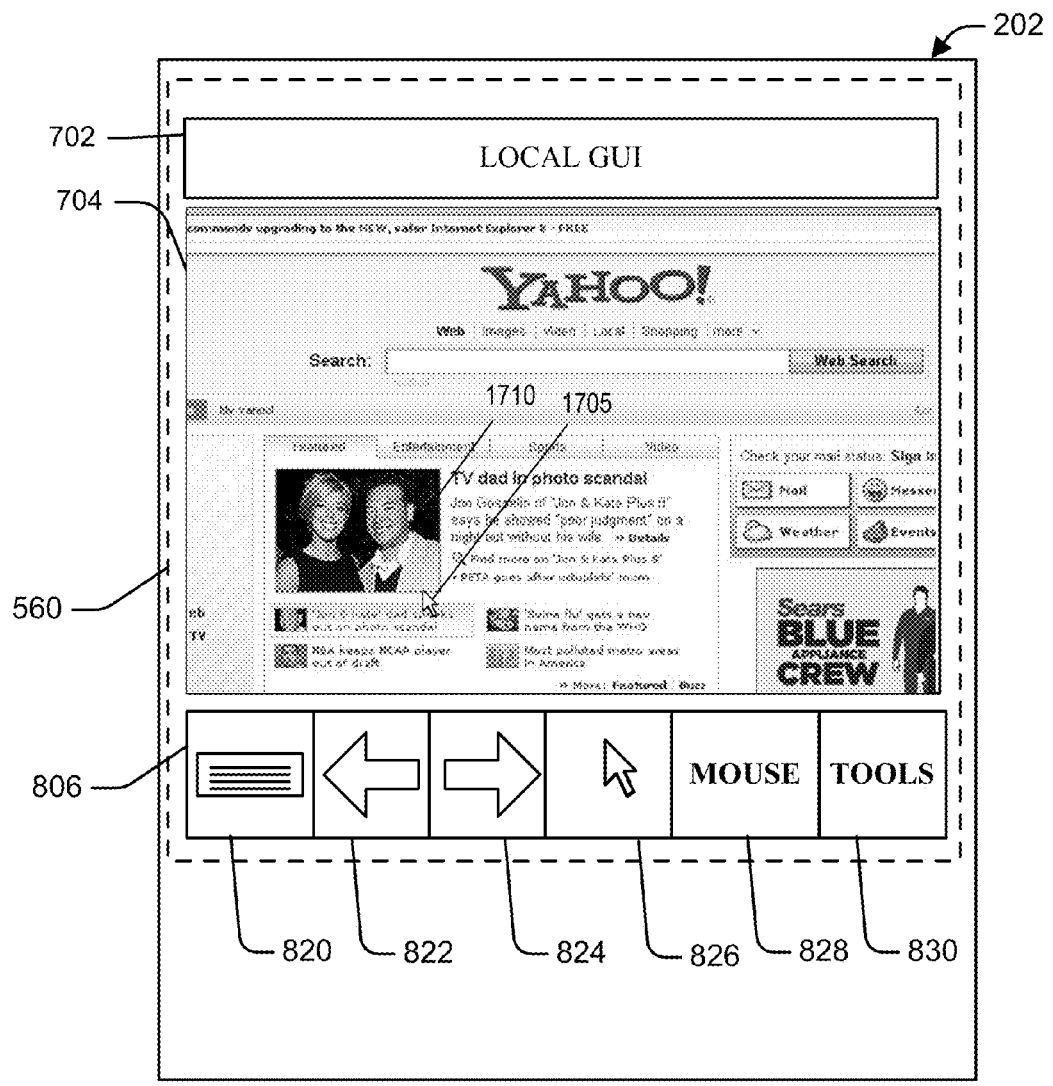
FIG. 18 illustrates an example in which a remote application view of the client device is scrolled to the right to reveal the entire object of the remote application.
Figure 19A:
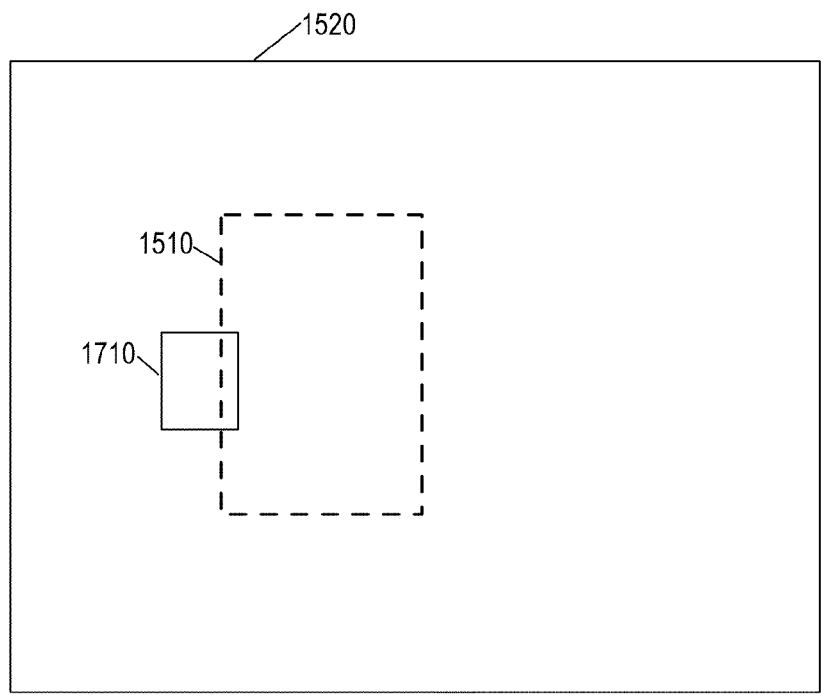
FIG. 19A illustrates an example in which a portion of an object is located within an area of the display output displayed in the remote application view.
Figure 19B:
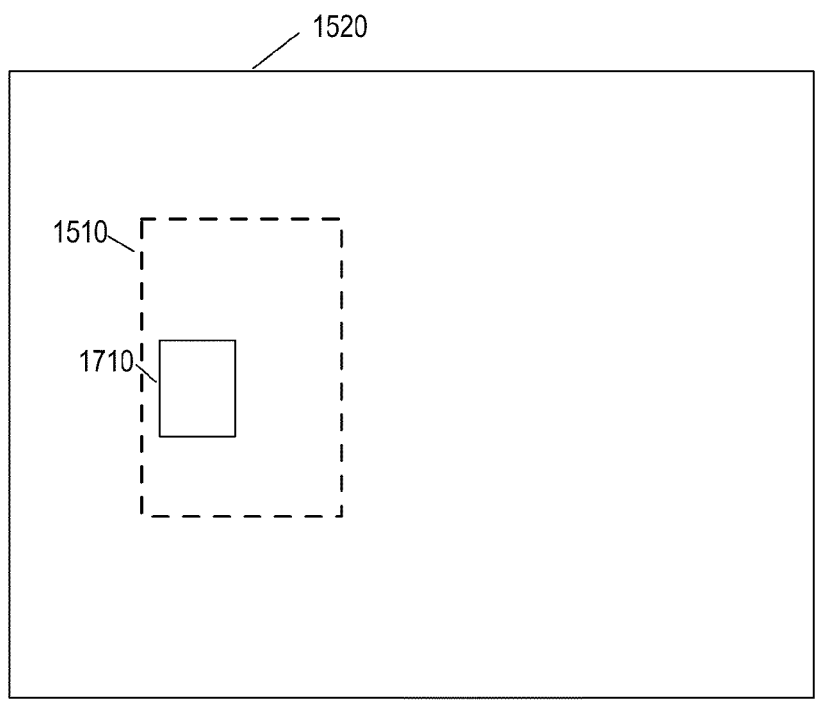
FIG. 19B illustrates an example in which the entire object is located within the area of the display output displayed in the remote application view.

FIG. 17 shows an example of a display 560 at the client device 202, in which the remote application view 704 displays a web page on the remote web browser application 327. The web page includes an object 1710 (e.g., a picture). In this example, only a small portion of the object 1720 is shown in the remote application view 704 and a pointer 1705 is placed on the object 1710. FIG. 19A shows the portions of the object 1710 that are within and outside the area 1510 of the remote application view 704.

On the server side, the agent module 322 determines that the pointer 1705 is on the object 1720 based on the coordinates of the pointer reported from the OS module 324 and the coordinates and dimensions of objects in the web page. The agent module 322 then generates a message for the client device 202 including the coordinates and dimensions of the object 1710, and sends the message to the client device 202.

On the client side, the local view module 540 receives the message and determines whether substantially the entire object 1710 is shown in the remote application view 704. In this example, the local view module 540 determines that only a small portion of the object 1710 is shown in the remote application view 704. The local view module 540 then commands the remote view module 535 to scroll the remote application view 704 to the left so that substantially the entire object 1710 is shown the remote application view 704. FIG. 18 shows an example of the display 560 after the remote application view 704 has been scrolled to the left to show the entire object 1710 in the remote application view 704. FIG.

19B shows that, after scrolling to the left, the entire object 1710 is within the area 1510 of the remote application view 704.

In one aspect, the local view module 540 may also zoom in on the object 1710. For example, the local view module 540 may also command the remote view module 535 to zoom in on the object 1710 in the remote application view 704. For example, the local view module 540 may center the object 1710 in the remote application view 704 and maximize the size of the object 1710 in the remote application view 704.

An advantage of this aspect is that, when the user shows an interest in an object by moving a pointer to the object or touching the object using a touch screen, substantially the entire object is automatically shown in the remote application view 704. Thus, the user does not have to scroll and/or zoom out to see the rest of the object of interest.

In another example, the object 1710 may be a video. In this example, the video file for the object 1710 may be downloaded from a uniform resource locator (URL) and played using a media player application. The URL for the video file may be included in markup language code for a web page or other source.

In this example, the agent module 322 on the server side may determine when the pointer is on the object 1710 and/or clicks on the object 1710 based on coordinates of the pointer and/or pointer clicks reported from the OS module 324. The agent module 322 may then generate a message including the URL for the video file, and send the message to the client device 202.

On the client side, the local view module 540 receives the message, retrieves the URL for the video file from the message, and downloads the video file onto the client device 202 from the URL. In this example, the client remote access module 452 may establish a connection with the Internet or other network, and the local view module 540 may download the video file from the URL through the connection. After the video file is downloaded or while the video file is downloading, the local view module 540 may launch a local media player application on the client device 202 and play the video file using the local media player application. The local view module 540 may then display the output of the local media player application on the display 650. For example, the local view module 540 may display the output of the local view module 540 over the remote application view 704.

A process for establishing a remote session on the server 204 for a user at the client device 202 will now be discussed according to an aspect of the disclosure. When the user at the client device 202 desires to remotely access a remote server, the local view module 540 may display a plurality of remote servers from which the user can select on the display 560. For each available remote server, the client device 202 may store an address (e.g., IP address) and user credentials (e.g., login name and password) for the server. The user may then select one of the remote servers on the display 560, for example, using a touch screen overlaying the display 560.

When the user selects a remote server, the client remote access module 452 may initiate a remote access connection 525 with the server remote access module 334 of the server 204. To do this, the client remote access module 452 may send a request for remote access to the server 204 (e.g., over a TCP/IP network connection using an IP address of the server 204). The request may include user credentials (e.g., login name and password). If the user credentials are accepted, then the server remote access module 334 of the server 204 establishes a remote session for the client device 202, providing the client device 202 with remote access to the server 204.

In one aspect, the OS module 324 may notify the agent module 322 that a remote session has been established for the client device 202. The agent module 322 may then send a message to the client device 202, via the server remote access module 334, informing the client device 202 that the agent module 322 is active and ready to accept command messages from the client device 202. On the client side, the client remote access module 452 may send the message to the local view module 540. Upon receiving the message, the local view module 540 may send an acknowledgement to the server 204. On the server side, the server remote access module 334 may send the acknowledgement to the agent module 322. This process may be used to initialize communication between the agent module 322 and the local view module 540.

Figure 20:
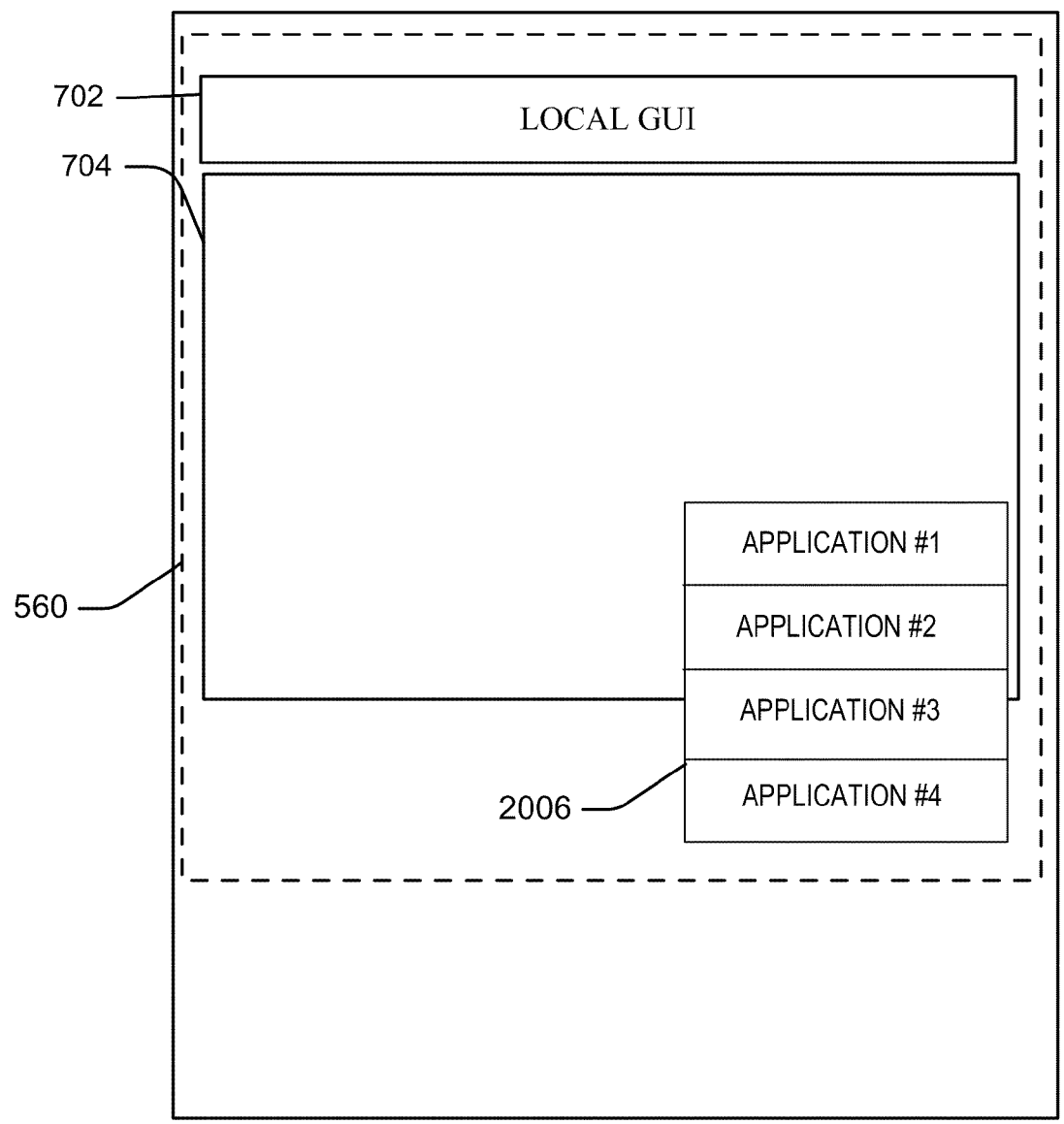
FIG. 20 illustrates an example of a local GUI at a client device listing applications that are available at a remote server.

After initializing communication with the agent module 322, the local view module 540 may display a plurality of applications that are available on the server 204. The local view module 540 may display a list of the available applications in a menu on the display 560 and the user may select a desired one of the applications, for example, using a touch screen. FIG. 20 shows an example of a local GUI 2006 listing applications that are available on the server 204. The local GUI 2006 is locally generated and not generated from display output data from the server 204.

When the user selects an application, the local view module 540 may generate a command message identifying the selected application and send the command message to the server 204 via the client remote access module 452. On the server side, the server remote access module 334 may send the command to the agent module 322. The agent module 322 may then issue a command to the OS module 324 to launch the identified application 327 on the server 204. The agent module 322 may also command the application control module 325 to maximize the size of the display output of the application 327.

The server remote access module 334 may then send display output data of the application 327 to the client device 202. On the client side, the local view module 540 may display a local GUI 702 and 706 for the selected application on the display 560. The local view module 540 may also translate user inputs to the local GUI 702 and 706 into corresponding command messages and send the command message to the agent module 322, as discussed above.

In one aspect of the disclosure, the desktop module 328 may generate a desktop on the server 204. The desktop may include icons of available applications that can be selected and launched on the server 204. In one aspect, the desktop module 328 may be integrated with the operating system 330 (e.g., Windows-based operating system).

Figure 21:
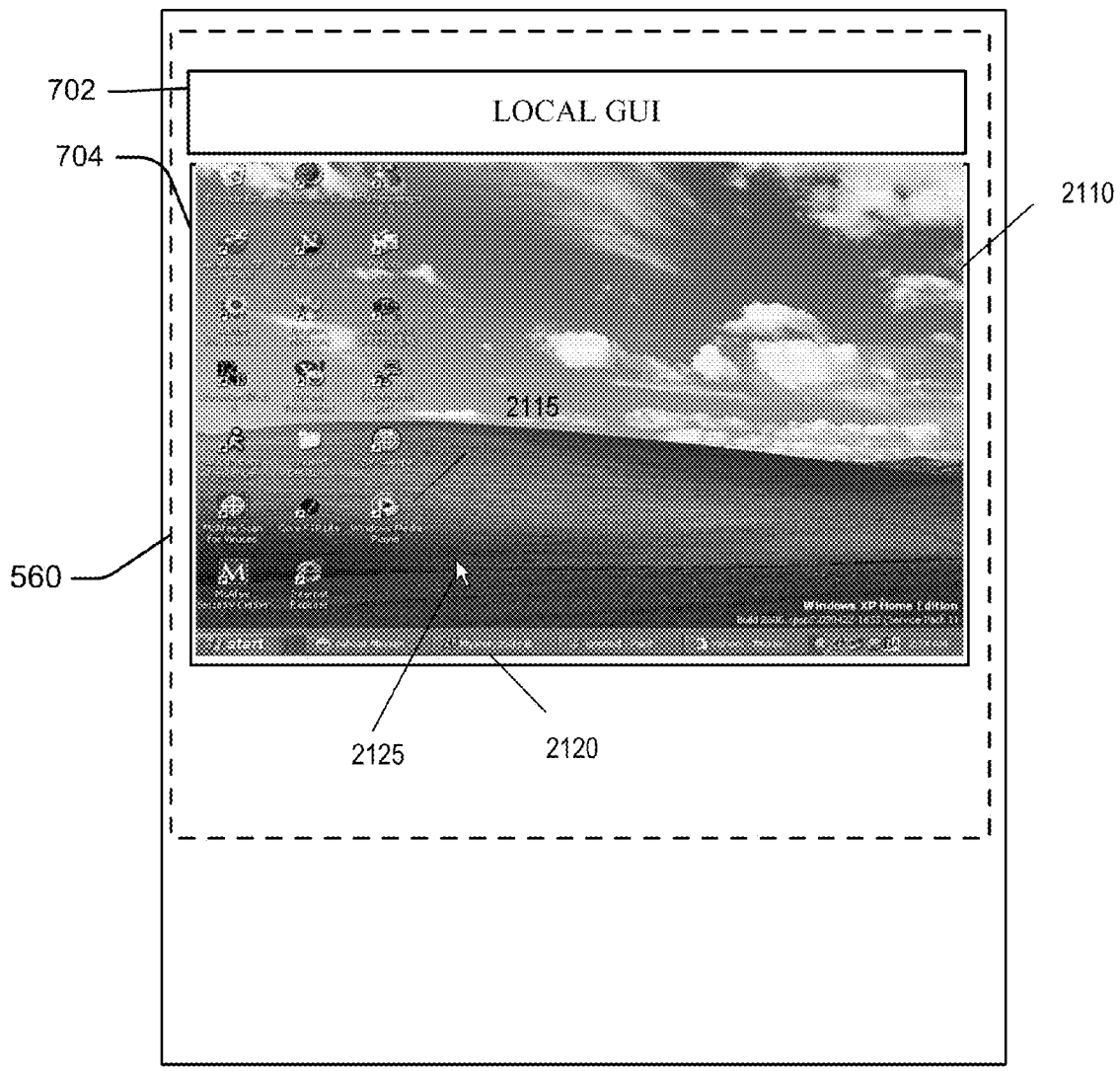
FIG. 21 illustrates an example of a remote desktop displayed at a client device.

In this aspect, the server remote access module 334 may send display output data of the desktop to the client device 202. On the client side, the remote view module 535 may display the remote desktop in the remote application view 704 on the display 560. FIG. 21 shows an example of a remote desktop 2110 displayed in the remote application view 704 at the client device 202. The remote desktop 2110 includes icons 2115 of applications that can be launched on the server 204 and a taskbar 2120.

In this aspect, the user at the client device 202 may select an application on the remote desktop displayed in the remote application view 704, for example, by moving a pointer 2125 to the icon 2115 of a desired application and clicking on the icon 2115 using a pointer input device. The remote view module 535 may then send the entered user inputs (e.g., pointer movements and clicks) to the server 204. On the server side, the server remote access module 334 may input the received user inputs to the desktop module 328. When received user inputs to the desktop result in an application being launched on the server 204, the OS module 324 may inform the agent module 322. The agent module 322 may then generate a message identifying the launched application and send the message to the client device 202 (e.g., via the server remote access module 334).

On the client side, the client remote access module 452 may send the message to the local view module 540. The local view module 540 may then display a local GUI 702 and 706 for the identified application on the display 560. For example, the client device 202 may store configuration files for a plurality of local GUIs for different applications. The local view module 540 may then retrieve the configuration file 451 for the local GUI 702 and 706 corresponding to the application identified in the received message and generate the local GUI based on the retrieved configuration file 451. The local view module 540 may then display the local GUI 702 and 706 on the display 560 to allow the user to remotely control the application 327 on the server 204, as discussed above.

In this aspect, the local view module 540 may also generate a local GUI for the user at the client device 202 to control the remote desktop at the server 204. For example, the local GUI for the remote desktop may allow the user to select a background for the desktop, hide a taskbar of the desktop, and other functions. In another example, the local GUI for the remote desktop may allow the user to minimize, resize, hide and/or move a window for an application on the remote desktop. When the user enters user inputs to the local GUI for the remote desktop, then the local view module 540 may translate the user inputs into a command message for the remote desktop. For example, the local view module 540 may translate user inputs to a graphical control object (e.g., hide taskbar button) on the local GUI into a command message to hide the taskbar. The local view module 540 may send the command message to the server 204 via the client remote access module 452. On the server side, the server remote access module 334 may send the command message to the agent module 322. The agent module 322 may then issue a command to the desktop module 328 based on the received command message. For example, when the received command message is to hide the taskbar, then the agent module 322 may issue a command to the desktop module 328 to hide the taskbar.

Figure 22:
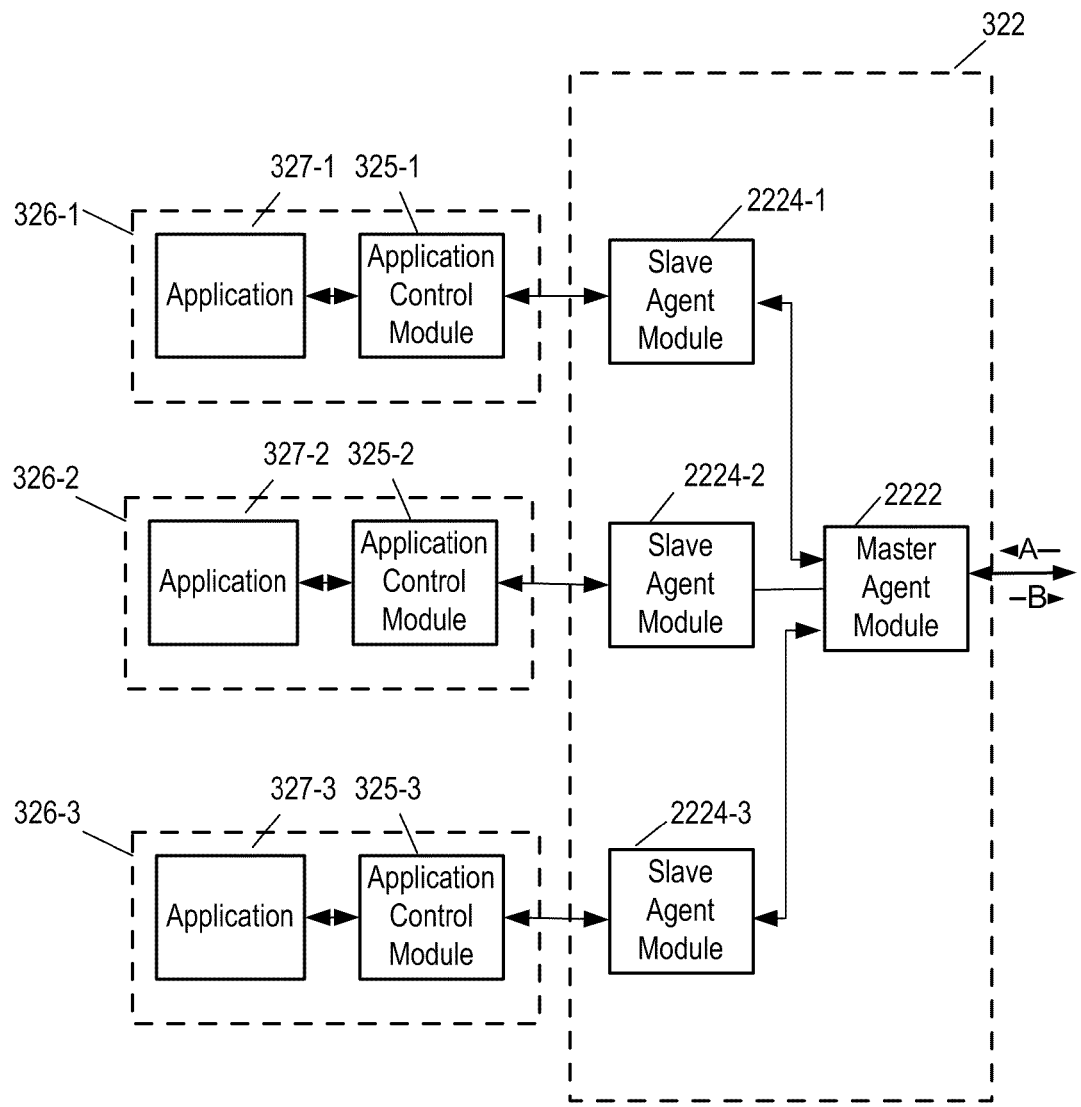
FIG. 22 is a conceptual block diagram of an agent module according to certain aspects of the present disclosure.

FIG. 22 is a conceptual block diagram of the agent module 322 according to an aspect of the disclosure. In this aspect, the agent module 322 comprising a master agent module 2222 and a plurality of slave agent modules 2224-1 to 2224-3. The agent module 322 may include any number of slave agent modules 2224-1 to 2224-3. In this aspect, each slave module agent 2224-1 to 2224-3 may be configured to control a particular application module 326-1 to 326-3 based on command messages from the client device 202. The master agent module 2222 may be configured to receive a command message from the client device 202 (via the server remote access module 334) and direct the command message to one of the slave agent modules 2224-1 to 2224-3.

In one aspect, there may be a number of applications 327-1 to 327-3 running on the server 204, in which each of the corresponding application modules 326-1 to 326-3 is controlled by one of the slave agent modules 2224-1 to 2224-2. In this aspect, the OS module 324 may notify the master agent module 2222 which one of the applications 327-1 to 327-3 is currently in focus on the server 204. For example, an application 327-2 to 327-3 may be in focus when an active pointer, cursor or I-beam appears in the window of the application 327-2 to 327-3. The master agent module 2222 may then direct command messages from the client device 202 to the slave agent module 2224-1 to 2224-3 corresponding to the application 327-1 to 327-3 currently in focus.

In one aspect, the user at the client device 202 may indicate which one of a plurality of applications 327-1 to 327-3 currently running on the server 204 he or she desires to access at a given time. For example, the local view module 540 may display a taskbar in the local GUI 702 and 704 indicating which application are currently running on the server 204. In this aspect, the OS module 324 may notify the master agent module 2222 which applications are running on the server 204 and the master agent may send a message to the client device 202 identifying these applications. The local view module 540 may then generate a local taskbar identifying these applications based on the message. When the user selects an application from the taskbar (e.g., using a touch screen), the local view module 540 may send a command message to the server 204 identifying the application.

On the server side, the server remote access module 334 may send the command message to the master agent module 2222. The master agent module 2222 may then send a command to the desktop module 328 to maximize the selected application and minimize or hide the other applications running on the server 204 so that the display output from the server 204 to the client device 202 only shows the selected application. The master agent module 2222 may then direct subsequent command messages from the client device 202 to the slave agent module 2224-1 to 224-3 corresponding to the selected application 327-1 to 327-3.

The subject technology is illustrated, for example, according to various aspects described below. Numbered clauses are provided below for convenience. These are provided as examples, and do not limit the subject technology.

1. A system for rendering at a local client side a composite view including a local graphical user interface and a remote application view associated with a remote application running at a remote server, comprising:

a local view module configured to generate a local graphical user interface (GUI) for controlling the remote application remotely from the local client side, configured to receive one or more user inputs to the local GUI, configured to determine a function corresponding to the one or more user inputs, configured to generate a command message based on the determined function, and configured to direct the command message to the remote server;

a remote view module configured to generate a remote application view of the remote application based on display output data of the remote application received at the local client side from the remote server; and a display module configured to provide, to a local display at the local client side, a composite view comprising the local GUI and the remote application view of the remote application.

2. The system of clause 1, wherein the local view module is configured to receive a message identifying a type of application running on the remote server and to select the local GUI from a plurality of local GUIs based on the received message.

3. The system of clause 1, wherein the local view module is configured to be controlled dynamically by the remote server to generate the local GUI based on the application running on the remote server.

4. The system of clause 1, wherein the remote view module is configured to direct user inputs within the remote application view to the remote server.

5. The system of clause 4, wherein the user inputs from the remote view module comprise pointer inputs, keyboard inputs or finger inputs (e.g., gestures).

6. The system of clause 1, wherein the display output data includes an image or drawing commands of a display output of the remote application.

7. The system of clause 1, wherein the one or more user inputs to the local GUI include coordinates of a pointer or a user's touch on the local display, and the local view module is configured to determine the function based on a graphical control object of the local GUI corresponding to the coordinates of the pointer or the user's touch on the local display.

8. The system of clause 1, wherein the local view module is configured to control a size and a location of the local GUI on the local display independently from the remote application view of the remote application.

9. The system of clause 1, wherein the local view module is configured to direct the command message to the remote server through a remote access module at the local client side.

10. The system of clause 9, wherein the remote access module is configured to communicate with the remote server over a first connection and a second connection via different socket connections, to receive the display output data of the remote application and to send user inputs over the first connection and to send the command message over the second connection.

11. The system of clause 9, wherein the remote access module is configured to communicate with the remote server over a plurality of virtual channels, to send user inputs over a first one of the plurality of virtual channels and to send the command message over a second one of the plurality of virtual channels.

Figure 13A:
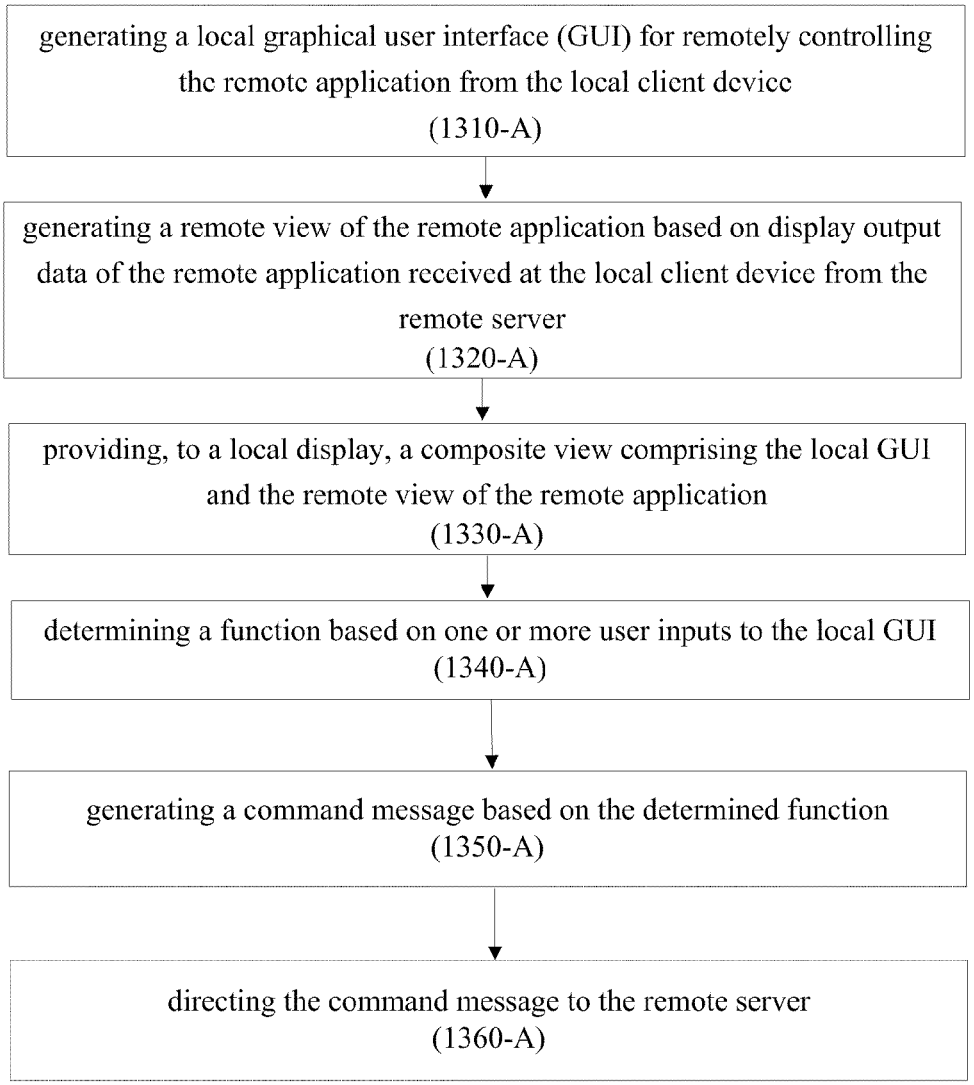
FIG. 13A illustrates an example of an operation of a system according to one aspect of the present disclosure.

12. A method for rendering at a local client side a composite view including a local graphical user interface and a remote application view associated with a remote application running at a remote server, comprising:

generating a local graphical user interface (GUI) for remotely controlling the remote application from the local client device (e.g., 1310-A of FIG. 13A);

generating a remote view of the remote application based on display output data of the remote application received at the local client device from the remote server (e.g., 1320-A);

providing, to a local display, a composite view comprising the local GUI and the remote view of the remote application (e.g., 1330-A);

determining a function based on one or more user inputs to the local GUI (e.g., 1340-A);

generating a command message based on the determined function (e.g., 1350-A); and directing the command message to the remote server (e.g., 1360-A).

13. The method of clause 12, further comprising:

receiving a message identifying a type of application running on the remote server; and selecting the local GUI from a plurality of local GUIs based on the received message.

14. The method of clause 12, further comprising directing user inputs within the remote application view to the remote server.

15. The method of clause 14, wherein the user inputs from the remote view module comprise pointer inputs or keyboard inputs.

16. The method of clause 12, wherein the display output data includes an image or drawing commands of a display output of the remote application.

17. The method of clause 12, wherein the one or more user inputs to the local GUI include coordinates of a pointer or a user's touch on the local display, and the determining the function based on the one or more user inputs comprises:

determining the function based on a graphical control object of the local GUI corresponding to the coordinates of the pointer or the user's touch on the local display.

18. The method of clause 12, further comprising controlling a size and a location of the local GUI on the local display independently from the remote application view of the remote application.

19. The method of clause 12, wherein the directing the command message to the remote server comprises directing the command message to the remote server through a remote access module at the local client side.

20. The method of clause 19, further comprising:

communicating with the remote server over a first connection and a second connection via different socket connections; and sending user inputs over the first connection, wherein the receiving the display output data comprises receiving the display output data of the remote application over the first connection, and the directing the command message to the remote server comprises sending the command message over the second connection.

21. The method of clause 19, further comprising:

communicating with the remote server over a plurality of virtual channels; and sending user inputs over a first one of the plurality of virtual channels, wherein the directing the command message to the remote server comprises sending the command message over a second one of the plurality of virtual channels.

22. A machine-readable medium encoded with instructions for rendering at a local client side a composite view including a local graphical user interface and a remote application view associated with a remote application running at a remote server, the instructions comprising code for:

generating a local graphical user interface (GUI) for remotely controlling the remote application from the local client device;

generating a remote view of the remote application based on display output data of the remote application received at the local client device from the remote server;

providing, to a local display, a composite view comprising the local GUI and the remote view of the remote application;

determining a function based on one or more user inputs to the local GUI;

generating a command message based on the determined function; and directing the command message to the remote server.

23. The machine-readable medium of clause 22, wherein the instructions further comprise code for:

receiving a message identifying a type of application running on the remote server; and selecting the local GUI from a plurality of local GUIs based on the received message.

24. The machine-readable medium of clause 22, wherein the instructions further comprise code for directing user inputs within the remote application view to the remote server.

25. The machine-readable medium of clause 24, wherein the user inputs from the remote view module comprise pointer inputs, keyboard inputs, or finger inputs (e.g., touch inputs).

26. The machine-readable medium of clause 22, wherein the display output data includes an image or drawing commands of a display output of the remote application.

27. The machine-readable medium of clause 22, wherein the one or more user inputs to the local GUI include coordinates of a pointer or a user's touch on the local display, and the determining the function based on the one or more user inputs comprises:

determining the function based on a graphical control object of the local GUI corresponding to the coordinates of the pointer or the user's touch on the local display.

28. The machine-readable medium of clause 22, wherein the instructions further comprise code for controlling a size and a location of the local GUI on the local display independently from the remote application view of the remote application.

29. The machine-readable medium of clause 22, wherein directing the command message to the remote server comprises directing the command message to the remote server through a remote access module at the local client side.

30. The machine-readable medium of clause 29, wherein the instructions further comprise code for:

communicating with the remote server over a first connection and a second connection via different socket connections; and sending user inputs over the first connection, wherein the receiving the display output data comprises receiving the display output data of the remote application over the first connection, and the directing the command message to the remote server comprises sending the command message over the second connection.

31. The machine-readable medium of clause 29, wherein the instructions further comprise code for:

communicating with the remote server over a plurality of virtual channels; and sending user inputs over a first one of the plurality of virtual channels, wherein the directing the command message to the remote server comprises sending the command message over a second one of the plurality of virtual channels.

Figure 13B:
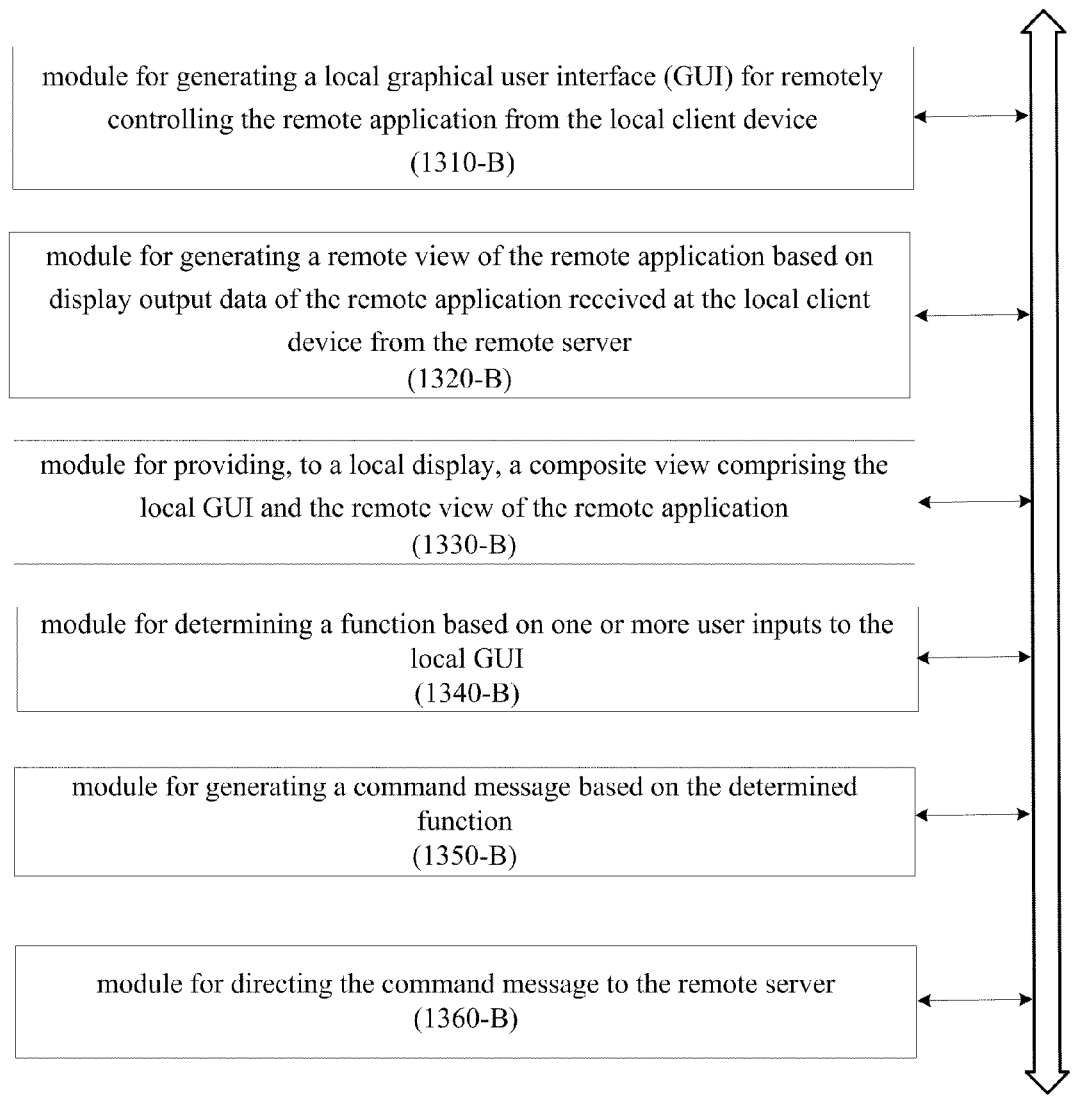
FIG. 13B illustrates an example of a configuration of an apparatus according to one aspect of the present disclosure.

32. An apparatus for rendering at a local client side a composite view including a local graphical user interface and a remote application view associated with a remote application running at a remote server, comprising:

means for generating a local graphical user interface (GUI) for remotely controlling the remote application from the local client device (e.g., 1310-B of FIG. 13B);

means for generating a remote view of the remote application based on display output data of the remote application received at the local client device from the remote server (e.g., 1320-B);

means for providing, to a local display, a composite view comprising the local GUI and the remote view of the remote application (e.g., 1330-B);

means for determining a function based on one or more user inputs to the local GUI (e.g., 1340-B);

means for generating a command message based on the determined function (e.g., 1350-B); and means for directing the command message to the remote server (e.g., 1360-B).

33. The apparatus of clause 32, further comprising:

means for receiving a message identifying a type of application running on the remote server; and means for selecting the local GUI from a plurality of local GUIs based on the received message.

34. The apparatus of clause 32, further comprising means for directing user inputs within the remote application view to the remote server.

35. The apparatus of clause 34, wherein the user inputs from the remote view module comprise pointer inputs or keyboard inputs.

36. The apparatus of clause 32, wherein the display output data includes an image or drawing commands of a display output of the remote application.

37. The apparatus of clause 32, wherein the one or more user inputs to the local GUI include coordinates of a pointer or a user's touch on the local display, and the means for determining the function based on the one or more user inputs comprising:

means for determining the function based on a graphical control object of the local GUI corresponding to the coordinates of the pointer or the user's touch on the local display.

38. The apparatus of clause 32, further comprising means for controlling a size and a location of the local GUI on the local display independently from the remote application view of the remote application.

39. The apparatus of clause 32, wherein the means for directing the command message to the remote server comprises means for directing the command message to the remote server through a remote access module at the local client side.

40. The apparatus of clause 39, further comprising:

means for communicating with the remote server over a first connection and a second connection via different socket connections; and means for sending user inputs over the first connection, wherein the means for receiving the display output data comprises means for receiving the display output data of the remote application over the first connection, and the means for directing the command message to the remote server comprises means for sending the command message over the second connection.

41. The apparatus of clause 39, further comprising:

means for communicating with the remote server over a plurality of virtual channels; and means for sending user inputs over a first one of the plurality of virtual channels, wherein the means for directing the command message to the remote server comprises means for sending the command message over a second one of the plurality of virtual channels.

The subject technology is illustrated, for example, according to various aspects described below. Numbered clauses are provided below for convenience. These are provided as examples, and do not limit the subject technology.

1. A system for communication and for providing, to a remote client device, a message related to an event at a server, in which the event is in response to one or more user inputs received from the remote client device, comprising:

an agent module configured to receive notification of the event at the server, configured to determine an action, based on the event, to be performed by the remote client device on a graphical user interface (GUI) at the remote client device or a remote view at the remote client device, configured to generate the message based on the determined action, and configured to direct the message to the remote client device, wherein the GUI is a GUI for controlling an application running on the server from the remote client device, and the remote view is a view of the application running on the server.

2. The system of clause 1, wherein the event comprises a click on a textbox, the action is to activate a graphical keyboard of the GUI at the remote client device, and the message comprises a command to activate the graphical keyboard.

3. The system of clause 1, wherein the event comprises a window opening at the server, the action is to display the window within the remote view at the remote client device, and the message comprises coordinates and dimensions of the window.

4. The system of clause 1, wherein the event comprises a pointer on an object of the application at the server, the action is to display substantially the entire object within the remote view at the remote client device, and the message comprises coordinates and dimensions of the object.

5. The system of clause 4, wherein the object comprises a picture, an icon, an animation, or video.

6. The system of clause 1, wherein the event comprises a pointer click on a video object, the action is to play a video file associated with the video object at the remote client device, and the message comprises a uniform resource locator (URL) for downloading the video file.

7. The system of clause 1, wherein the event comprises a dialog box opening at the server, the action is to display the dialog box within the remote view at the remote client device, and the message comprises coordinates and dimensions of the dialog box.

8. The system of clause 7, wherein the agent module is configured to receive notification of when the dialog box closes at the server, configured to generate a second message informing the remote client device that the dialog box has closed, and directing the second message to the remote client device.

9. The system of clause 1, wherein the agent module is configured to receive a command message from the remote client device and configured to control the application on the server based on the received command message.

10. The system of clause 9, wherein the agent module is configured to resize, move or maximize a view of the application on the server based on the received command message.

11. The system of clause 1, wherein the agent module comprises:
a plurality of slave agent modules, wherein each of the slave agent modules is configured to control one of a plurality of different applications on the server based on command messages from the remote client device; and
a master agent module configured to direct command messages, from the remote client device, for one of the plurality of different applications to a corresponding one of the plurality of slave agent modules.

12. The system of clause 1, wherein the system is the server comprising a processing system.

Figure 23A:
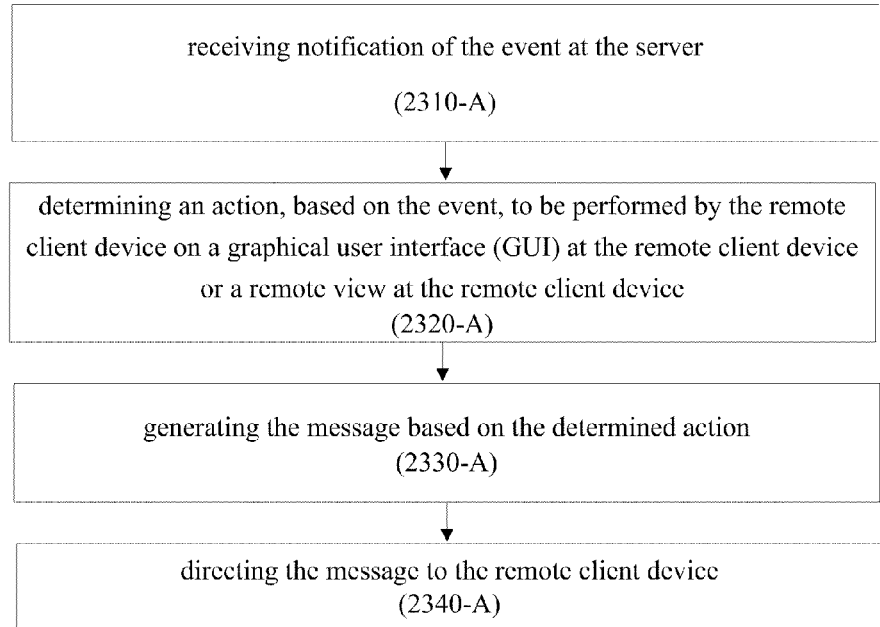
FIG. 23A illustrates an example of an operation of an apparatus according to one aspect of the present disclosure.

13. A method performed at a server for providing, to a remote client device, a message related to an event at the server, in which the event is in response to one or more user inputs received from the remote client device, comprising:
receiving notification of the event at the server (e.g., 2310-A of FIG. 23A);
determining an action, based on the event, to be performed by the remote client device on a graphical user interface (GUI) at the remote client device or a remote view at the remote client device (e.g., 2320-A);
generating the message based on the determined action (e.g., 2330-A); and
directing the message to the remote client device (e.g., 2340-A),
wherein the GUI is a GUI for controlling an application running on the server from the remote client device, and the remote view is a view of the application running on the server.

14. The method of clause 13, wherein the event comprises a click on a textbox, the action is to activate a graphical keyboard of the GUI at the remote client device, and the message comprises a command to activate the graphical keyboard.

15. The method of clause 13, wherein the event comprises a window opening at the server, the action is to display the window within the remote view at the remote client device, and the message comprises coordinates and dimensions of the window.

16. The method of clause 13, wherein the event comprises a pointer on an object of the application at the server, the action is to display substantially the entire object within the remote view at the remote client device, and the message comprises coordinates and dimensions of the object.

17. The method of clause 16, wherein the object comprises a picture, an icon, an animation, or video.

18. The method of clause 13, wherein the event comprises a pointer click on a video object, the action is to play a video file associated with the video object at the remote client device, and the message comprises a uniform resource locator (URL) for downloading the video file.

19. The method of clause 13, wherein the event comprises a dialog box opening at the server, the action is to display the dialog box within the remote view at the remote client device, and the message comprises coordinates and dimensions of the dialog box.

20. The method of clause 19, further comprising:
receiving notification of when the dialog box closes at the server;
generating a second message informing the remote client device that the dialog box has closed; and
directing the second message to the remote client device.

21. The method of clause 13, further comprising:
receiving a command message from the remote client device; and
controlling the application on the server based on the received command message.

22. The method of clause 21, further comprising:
resizing, moving or maximizing a view of the application on the server based on the received command message.

23. The method of clause 13, further comprising:
receiving command messages from the remote client devices;
directing the received command messages to one of a plurality of different applications on the server; and
controlling the one of the plurality of different applications on the server based on the received command messages.

24. A machine-readable medium encoded with instructions for providing, to a remote client device, a message related to an event at a server, in which the event is in response to one or more user inputs received from the remote client device, the instructions comprising code for:
receiving notification of the event at the server;
determining an action, based on the event, to be performed by the remote client device on a graphical user interface (GUI) at the remote client device or a remote view at the remote client device;
generating the message based on the determined action; and
directing the message to the remote client device,
wherein the GUI is a GUI for controlling an application running on the server from the remote client device, and the remote view is a view of the application running on the server.

25. The machine-readable medium of clause 24, wherein the event comprises a click on a textbox, the action is to activate a graphical keyboard of the GUI at the remote client device, and the message comprises a command to activate the graphical keyboard.

26. The machine-readable medium of clause 24, wherein the event comprises a window opening at the server, the action is to display the window within the remote view at the remote client device, and the message comprises coordinates and dimensions of the window.

27. The machine-readable medium of clause 24, wherein the event comprises a pointer on an object of the application at the server, the action is to display substantially the entire object within the remote view at the remote client device, and the message comprises coordinates and dimensions of the object.

28. The machine-readable medium of clause 27, wherein the object comprises a picture, an icon, an animation, or video.

29. The machine-readable medium of clause 24, wherein the event comprises a pointer click on a video object, the action is to play a video file associated with the video object at the remote client device, and the message comprises a uniform resource locator (URL) for downloading the video file.

30. The machine-readable medium of clause 24, wherein the event comprises a dialog box opening at the server, the action is to display the dialog box within the remote view at the remote client device, and the message comprises coordinates and dimensions of the dialog box.

31. The machine-readable medium of clause 30, wherein the instructions further comprises code for:
receiving notification of when the dialog box closes at the server;
generating a second message informing the remote client device that the dialog box has closed; and
directing the second message to the remote client device.

32. The machine-readable medium of clause 24, wherein the instructions further comprise code for:
receiving a command message from the remote client device; and
controlling the application on the server based on the received command message.

33. The machine-readable medium of clause 32, wherein the instructions further comprise code for:
resizing, moving or maximizing a view of the application on the server based on the received command message.

34. The machine-readable medium of clause 24, wherein the instructions further comprise code for:
receiving command messages from the remote client devices;
directing the received command messages to one of a plurality of different applications on the server; and
controlling the one of the plurality of different applications on the server based on received command messages.

Figure 23B:
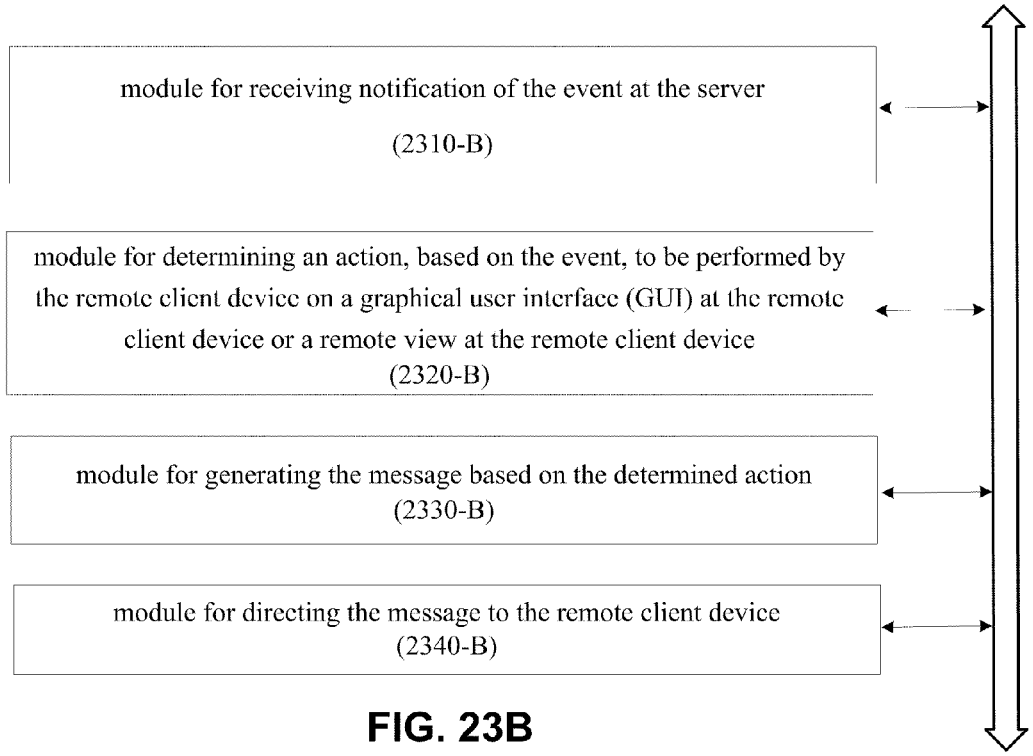
FIG. 23B illustrates an example of a configuration of an apparatus according to one aspect of the present disclosure.

35. An apparatus for providing, to a remote client device, a message related to an event at the server, in which the event is in response to one or more user inputs received from the remote client device, comprising:
means for receiving notification of the event at the server (e.g., 2310-B of FIG. 23B);
means for determining an action, based on the event, to be performed by the remote client device on a graphical user interface (GUI) at the remote client device or a remote view at the remote client device (e.g., 2320-B);
means for generating the message based on the determined action (e.g., 2330-B); and
means for directing the message to the remote client device (e.g., 2340-B),
wherein the GUI is a GUI for controlling an application running on the server from the remote client device, and the remote view is a view of the application running on the server.

36. The apparatus of clause 35, wherein the event comprises a click on a textbox, the action is to activate a graphical keyboard of the GUI at the remote client device, and the message comprises a command to activate the graphical keyboard.

37. The apparatus of clause 35, wherein the event comprises a window opening at the server, the action is to display the window within the remote view at the remote client device, and the message comprises coordinates and dimensions of the window.

38. The apparatus of clause 35, wherein the event comprises a pointer on an object of the application at the server, the action is to display substantially the entire object within the remote view at the remote client device, and the message comprises coordinates and dimensions of the object.

39. The apparatus of clause 38, wherein the object comprises a picture, an icon, an animation, or video.

40. The apparatus of clause 35, wherein the event comprises a pointer click on a video object, the action is to play a video file associated with the video object at the remote client device, and the message comprises a uniform resource locator (URL) for downloading the video file.

41. The apparatus of clause 35, wherein the event comprises a dialog box opening at the server, the action is to display the dialog box within the remote view at the remote client device, and the message comprises coordinates and dimensions of the dialog box.

42. The apparatus of clause 41, further comprising:
means for receiving notification of when the dialog box closes at the server;
means for generating a second message informing the remote client device that the dialog box has closed; and
means for directing the second message to the remote client device.

43. The apparatus of clause 35, further comprising:
means for receiving a command message from the remote client device; and
means for controlling the application on the server based on the received command message.

44. The apparatus of clause 43, further comprising:
means for resizing, moving or maximizing a view of the application on the server based on the received command message.

45. The apparatus of clause 35, further comprising:
means for receiving command messages from the remote client devices;
means for directing the received command messages to one of a plurality of different applications on the server; and
means for controlling the one of the plurality of different applications on the server based on the received command messages.

The subject technology is illustrated, for example, according to various aspects described below. Numbered clauses are provided below for convenience. These are provided as examples, and do not limit the subject technology.

1. A system for communication and for rendering at a local client device a composite view including a local graphical user interface (GUI) and a remote view associated with a remote application running on a remote server, comprising:
a remote view module configured to generate the remote view of the remote application based on display output data of the remote application received at the local client device from the remote server;
a local view module configured to generate the local GUI for controlling the remote application remotely from the local client device, configured to control an area of the display output data of the remote application that is displayed in the remote view, and configured to keep track of coordinates and dimensions of the area; and
a display module configured to provide, to a local display at the local client device, a composite view comprising the local GUI and the remote view of the remote application.

2. The system of clause 1, wherein the local view module is configured to receive a message from the remote server including a command to activate a graphical keyboard of the local GUI at the local client device and configured to active the graphical keyboard in response to the received message.

3. The system of clause 1, wherein the local view module is configured to receive coordinates and dimensions of a window or dialog box at the remote server from the remote server, configured to compare the coordinates and dimensions of the window or dialog box with the coordinates and dimensions of the area of the display output data displayed in the remote view, and configured to adjust the area of the display output data displayed in the remote view based on the comparison.

4. The system of clause 3, wherein the local view module is configured to adjust the area of the display output data displayed in the remote view by scrolling the area.

5. The system of clause 3, wherein the local view module is configured to adjust the area of the display output data displayed in the remote view by zooming in or zooming out the area.

6. The system of clause 3, wherein the local view module is configured to receive a second message from the remote server that the window or dialog box has been closed at the remote server and configured to undo the adjustment of the area of the display output data displayed in the remote view in response to the second message.

7. The system of clause 1, wherein the local view module is configured to receive coordinates and dimensions of an object of the remote application from the remote server, configured to compare the coordinates and dimensions of the object with the coordinates and dimensions of the area of the display output data displayed in the remote view, and configured to adjust the area of the display output data displayed in the remote view based on the comparison.

8. The system of clause 7, wherein the local view module is configured to adjust the area of the display output data displayed in the remote view such that substantially the entire object is displayed in the remote view.

9. The system of clause 8, wherein the local view module is configured to adjust the area of the display output data displayed in the remote view by scrolling the area.

10. The system of clause 8, wherein the local view module is configured to adjust the area of the display output displayed in the remote view by zooming in or zooming out the area.

11. The system of clause 1, wherein the local view module is configured to receive a uniform resource locator (URL) from the remote server, configured to download a video file using the URL, and configured to play the video file using a local media player application.

12. The system of clause 1, wherein the system is the local client device comprising a processing system.

Figure 24A:
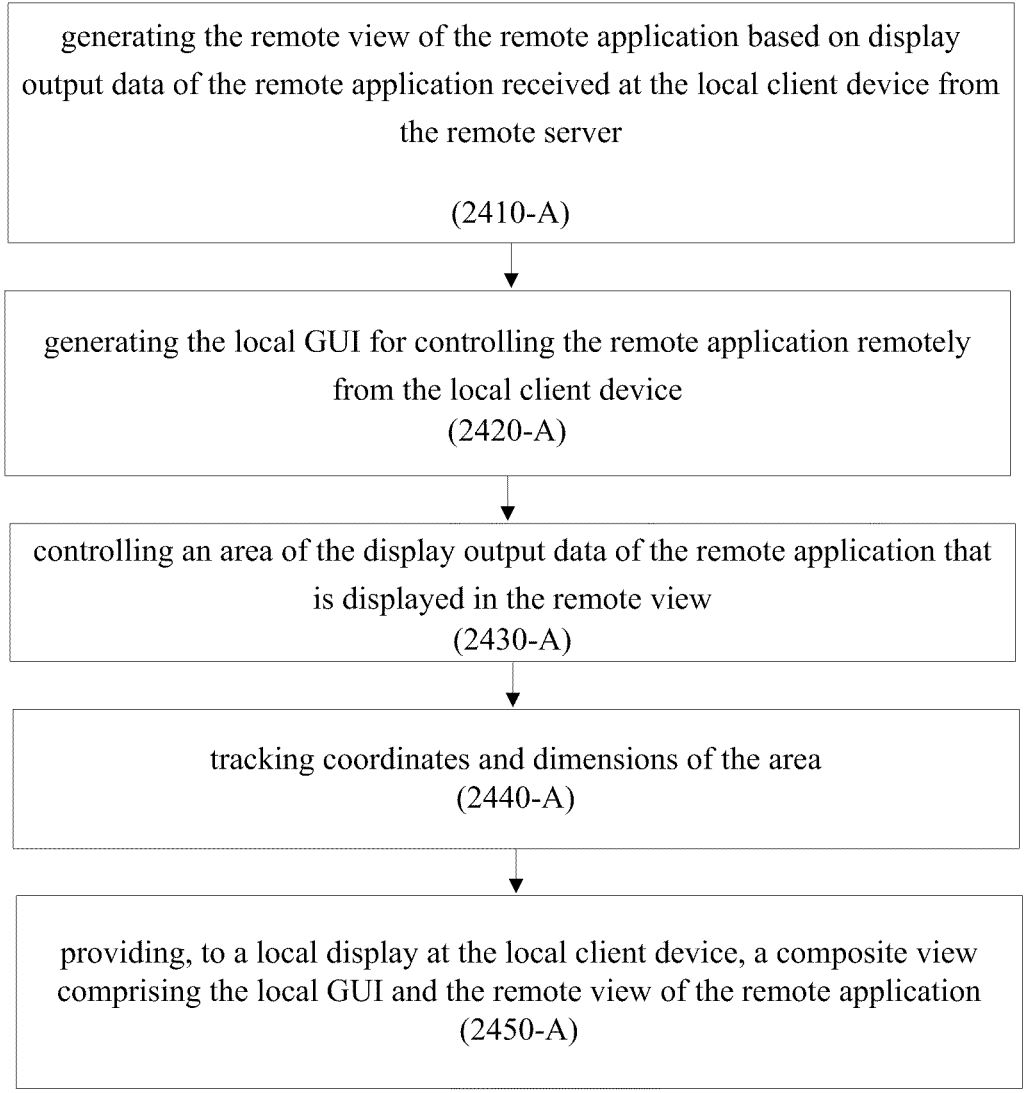
FIG. 24A illustrates an example of an operation of an apparatus according to one aspect of the present disclosure.

13. A method for rendering at a local client device a composite view including a local graphical user interface (GUI) and a remote view associated with a remote application running on a remote server, comprising:
generating the remote view of the remote application based on display output data of the remote application received at the local client device from the remote server (e.g., 2410-A of FIG. 24A);
generating the local GUI for controlling the remote application remotely from the local client device (e.g., 2420-A);
controlling an area of the display output data of the remote application that is displayed in the remote view (e.g., 2430-A);
tracking coordinates and dimensions of the area (e.g., 2440-A); and providing, to a local display at the local client device, a composite view comprising the local GUI and the remote view of the remote application (e.g., 2450-A).

14. The method of clause 13, further comprising:
receiving a message from the remote server including a command to activate a graphical keyboard of the local GUI at the local client device; and
activating the graphical keyboard in response to the received message.

15. The method of clause 13, further comprising:
receiving coordinates and dimensions of a window or dialog box at the remote server from the remote server;
comparing the coordinates and dimensions of the window or dialog box with the coordinates and dimensions of the area of the display output data displayed in the remote view; and
adjusting the area of the display output data displayed in the remote view based on the comparison.

16. The method of clause 15, wherein adjusting the area of the display output data displayed in the remote view comprises scrolling the area.

17. The method of clause 15, wherein adjusting the area of the display output data displayed in the remote view comprises zooming in or zooming out the area.

18. The method of clause 15, further comprising:
receiving a second message from the remote server that the window or dialog box has been closed at the remote server; and
undoing the adjustment of the area of the display output data displayed in the remote view in response to the second message.

19. The method of clause 13, further comprising:
receiving coordinates and dimensions of an object of the remote application from the remote server;
comparing the coordinates and dimensions of the object with the coordinates and dimensions of the area of the display output data displayed in the remote view; and
adjusting the area of the display output data displayed in the remote view based on the comparison.

20. The method of clause 19, wherein the adjusting the area of the display output data comprises adjusting the area of the display output data such that substantially the entire object is displayed in the remote view.

21. The method of clause 19, wherein the adjusting the area of the display output data displayed in the remote view comprises scrolling the area.

22. The method of clause 19, wherein the adjusting the area of the display output data displayed in the remote view comprises zooming in or zooming out the area.

23. The method of clause 13, further comprising:
receiving a uniform resource locator (URL) from the remote server;
downloading a video file using the URL; and
playing the video file using a local media player application.

24. A machine-readable medium encoded with instructions for rendering at a local client device a composite view including a local graphical user interface (GUI) and a remote view associated with a remote application running on a remote server, the instructions comprising code for:
generating the remote view of the remote application based on display output data of the remote application received at the local client device from the remote server;
generating the local GUI for controlling the remote application remotely from the local client device;
controlling an area of the display output data of the remote application that is displayed in the remote view;

tracking coordinates and dimensions of the area; and providing, to a local display at the local client device, a composite view comprising the local GUI and the remote view of the remote application.

25. The machine-readable medium of clause 24, wherein the instructions further comprise code for:

receiving a message from the remote server including a command to activate a graphical keyboard of the local GUI at the local client device; and activating the graphical keyboard in response to the received message.

26. The machine-readable medium of clause 24, wherein the instructions further comprise code for:

receiving coordinates and dimensions of a window or dialog box at the remote server from the remote server;

comparing the coordinates and dimensions of the window or dialog box with the coordinates and dimensions of the area of the display output data displayed in the remote view; and adjusting the area of the display output data displayed in the remote view based on the comparison.

27. The machine-readable medium of clause 26, wherein the adjusting the area of the display output data displayed in the remote view comprises scrolling the area.

28. The machine-readable medium of clause 26, wherein the adjusting the area of the display output data displayed in the remote view comprises zooming in or zooming out the area.

29. The machine-readable medium of clause 26, wherein the instructions further comprise code for:

receiving a second message from the remote server that the window or dialog box has been closed at the remote server; and undoing the adjustment of the area of the display output data displayed in the remote view in response to the second message.

30. The machine-readable medium of clause 24, wherein the instructions further comprise code for:

receiving coordinates and dimensions of an object of the remote application from the remote server;

comparing the coordinates and dimensions of the object with the coordinates and dimensions of the area of the display output data displayed in the remote view; and adjusting the area of the display output data displayed in the remote view based on the comparison.

31. The machine-readable medium of clause 30, wherein the adjusting the area of the display output data comprises adjusting the area of the display output data such that substantially the entire object is displayed in the remote view.

32. The machine-readable medium of clause 30, wherein the adjusting the area of the display output data displayed in the remote view comprises scrolling the area.

33. The machine-readable medium of clause 30, wherein the adjusting the area of the display output displayed in the remote view comprises zooming in or zooming out the area.

34. The machine-readable medium of clause 24, wherein the instructions further comprise code for:

receiving a uniform resource locator (URL) from the remote server;

downloading a video file using the URL; and playing the video file using a local media player application.

Figure 24B:
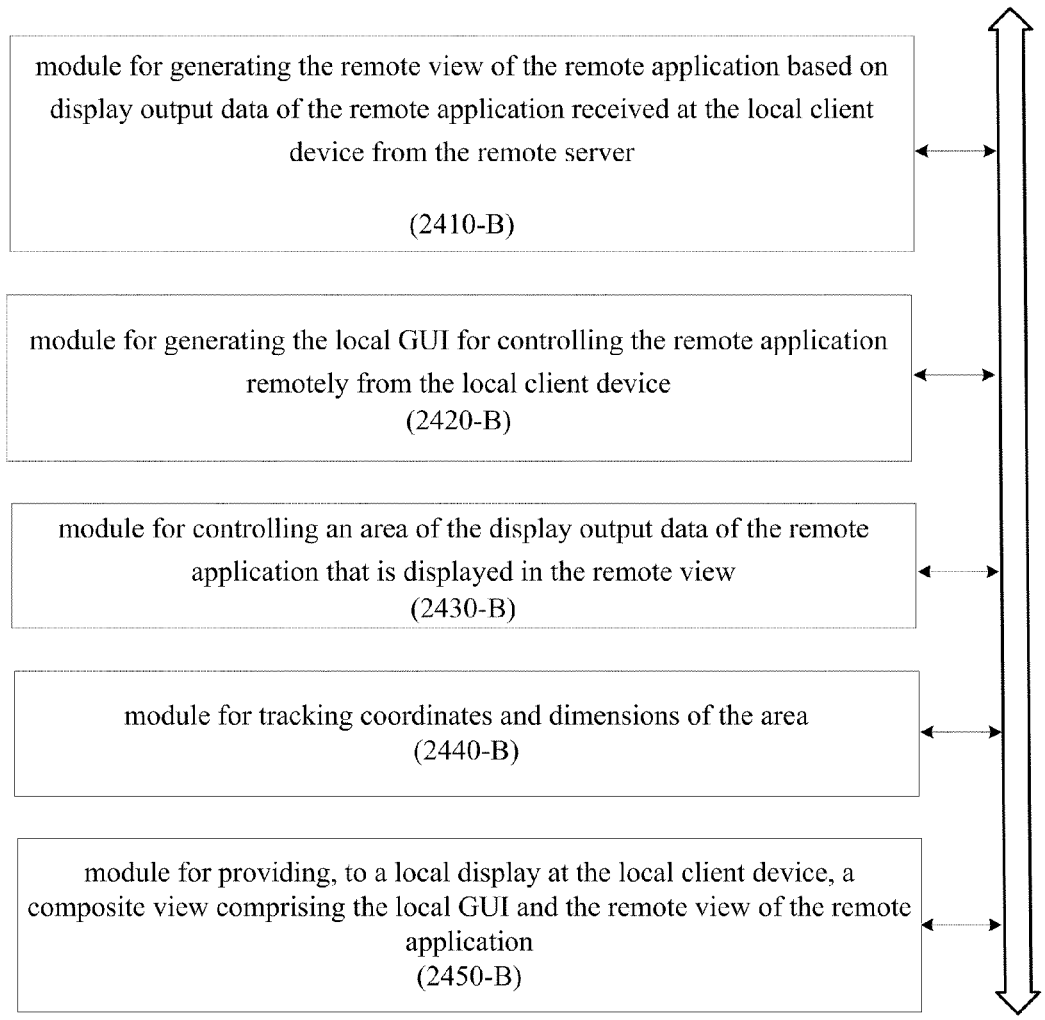
FIG. 24B illustrates an example of a configuration of an apparatus according to one aspect of the present disclosure.

35. An apparatus for rendering at a local client device a composite view including a local graphical user interface (GUI) and a remote view associated with a remote application running on a remote server, comprising:

means for generating the remote view of the remote application based on display output data of the remote application received at the local client device from the remote server (e.g., 2410-B of FIG. 24B);

means for generating the local GUI for controlling the remote application remotely from the local client device (e.g., 2420-B);

means for controlling an area of the display output data of the remote application that is displayed in the remote view (e.g., 2430-B);

means for tracking coordinates and dimensions of the area (e.g., 2440-B); and means for providing, to a local display at the local client device, a composite view comprising the local GUI and the remote view of the remote application (e.g., 2450-B).

36. The apparatus of clause 35, further comprising:

means for receiving a message from the remote server including a command to activate a graphical keyboard of the local GUI at the local client device; and means for activating the graphical keyboard in response to the received message.

37. The apparatus of clause 35, further comprising:

means for receiving coordinates and dimensions of a window or dialog box at the remote server from the remote server;

means for comparing the coordinates and dimensions of the window or dialog box with the coordinates and dimensions of the area of the display output data displayed in the remote view; and means for adjusting the area of the display output data displayed in the remote view based on the comparison.

38. The apparatus of clause 37, wherein the means for adjusting the area of the display output data displayed in the remote view comprises means for scrolling the area.

39. The apparatus of clause 37, wherein the means for adjusting the area of the display output data displayed in the remote view comprises means for zooming in or zooming out the area.

40. The apparatus of clause 37, further comprising:

means for receiving a second message from the remote server that the window or dialog box has been closed at the remote server; and means for undoing the adjustment of the area of the display output data displayed in the remote view in response to the second message.

41. The apparatus of clause 35, further comprising:

means for receiving coordinates and dimensions of an object of the remote application from the remote server;

means for comparing the coordinates and dimensions of the object with the coordinates and dimensions of the area of the display output data displayed in the remote view; and means for adjusting the area of the display output data displayed in the remote view based on the comparison.

42. The apparatus of clause 41, wherein the means for adjusting the area of the display output data comprises means for adjusting the area of the display output data such that substantially the entire object is displayed in the remote view.

43. The apparatus of clause 41, wherein the means for adjusting the area of the display output data displayed in the remote view comprises means for scrolling the area.

44. The apparatus of clause 41, wherein the means for adjusting the area of the display output displayed in the remote view comprises means for zooming in or zooming out the area.

45. The apparatus of clause 35, further comprising:

means for receiving a uniform resource locator (URL) from the remote server;

means for downloading a video file using the URL; and means for playing the video file using a local media player application.

Describing broadly and generally, certain embodiments of the present disclosure provide a system comprising a module, ("agent module") on a remote server in communication with a client device. A user requests execution of an application on the server by communicating with the server using the client device. In response, the agent module sends a configuration file to the client device. The agent module also helps select the correct configuration file to the client device. The client device uses the received configuration file to build and display a composite view at the client device. The composite view includes (a) a local graphical user information (GUI), displaying, for example, toolbars and headers, and (b) a remote application view, presenting, for example, information received from the server in the form display output data. In one aspect, the local GUI is built using the client device's native user interface (UI) building resources, built in accordance with the instructions in the configuration file received. Certain embodiments of the present disclosure provide for server-initiated update of configuration files by the server so as to change the look and functionality of the local GUI rendered by a client device on a local display of the client device. Because certain embodiments of the present disclosure also advantageously allow for a client device local GUI to be built using a client device's local UI resources, the user experience for a given application can be customized to each client device. In other words, the user experience of running a server based application for a user can be customized to the look-and-feel of the client device the user may be accustomed to.

Furthermore, application GUI control objects and other features made available to a user can be updated by controlling from a server in a way that does not require a user to perform any software updates or manual downloads. Such transparent updates further enhance user experience by relieving a user of the tedious download and update tasks. Furthermore, the human interface facilities provided by each client device may differ from other client devices in some aspects. For example, native user input mechanisms such as a pinch or a trackball may be available on certain smartphones, but not others. In accordance with certain embodiments of the present disclosure, a server-based application can use such native user input mechanisms without having to perform resource-expensive task of porting the applications on each client device.

Figure 25:
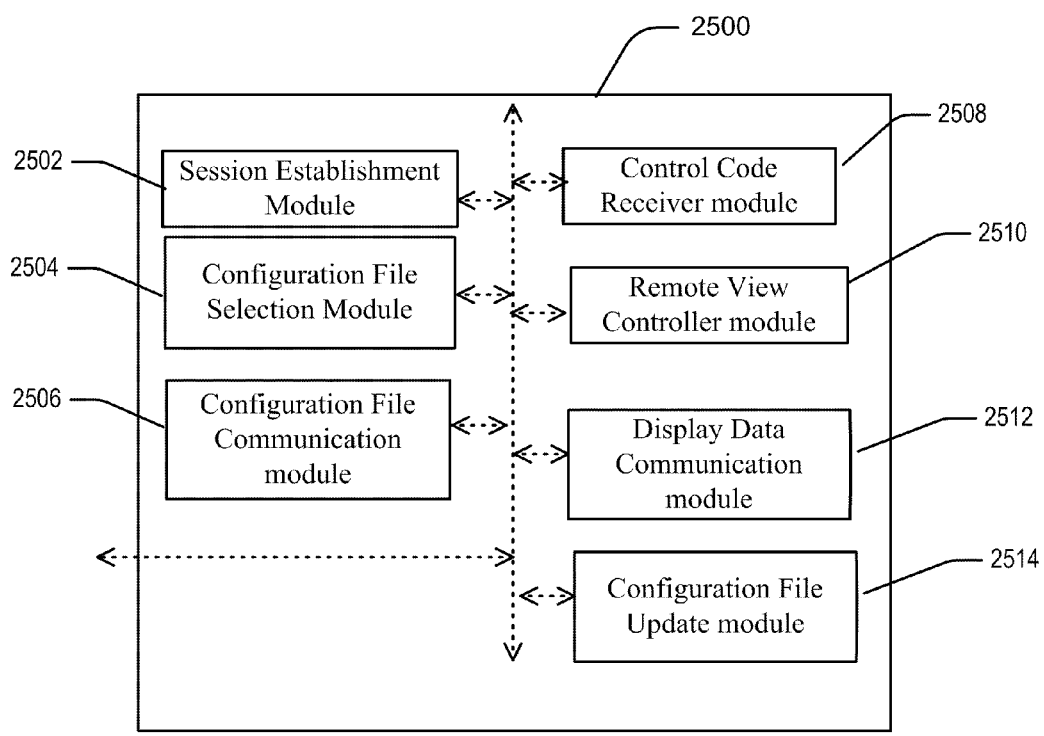
FIG. 25 is a block diagram that illustrates exemplary modules implemented at a server, in accordance with certain embodiments of the present disclosure.

FIG. 25 illustrates exemplary modules implemented at a server 2500 (e.g., server 204 in FIG. 2), in accordance with certain embodiments of the present disclosure. In the illustrated embodiment, the server 2500 comprises (e.g., in an agent module 322) a session establishment module 2502, a configuration file selection module 2504, a configuration file communication module 2506, a control code receiver module 2508, a remote view controller module 2510, a display data communication module 2512 and a configuration file update module 2514. Features and functions of these modules according to certain embodiments of the present disclosure are further described in the disclosure.

Figure 26:
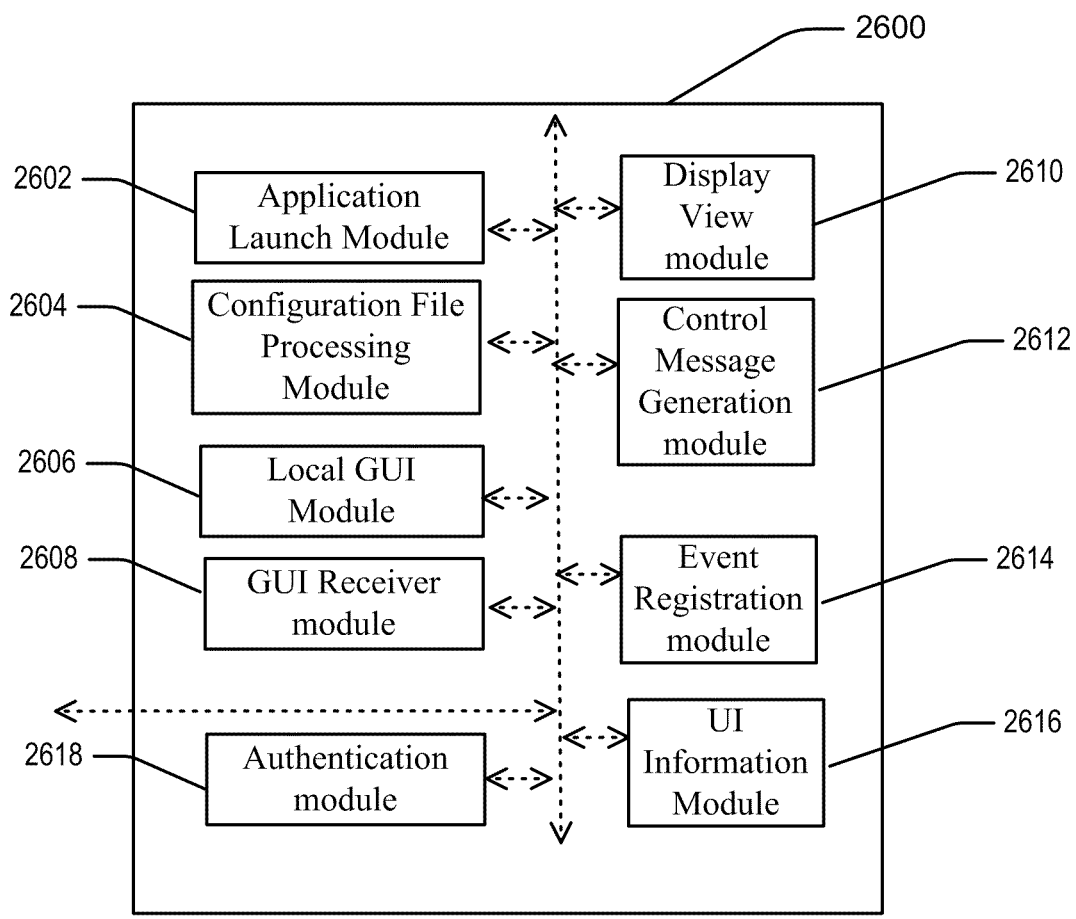
FIG. 26 is a block diagram that illustrates exemplary modules implemented at a client device, in accordance with certain embodiments of the present disclosure

FIG. 26 illustrates exemplary modules implemented at a client device 2600 (e.g., client device 202 in FIG. 2), in accordance with certain embodiments of the present disclosure. In the illustrated embodiment, the client device 2600 comprises (e.g., in a VC module 456) an application launch module 2602, a configuration file processing module 2604, a local GUI module 2606, a GUI receiver module 2608, a display view module 2610, a control message generation module 2612, an event registration module 2614, a user interface (UI) information module 2616 and an authentication module 2618. Features and functions of these modules according to certain embodiments of the present disclosure are further described in the disclosure.

Figure 27A:
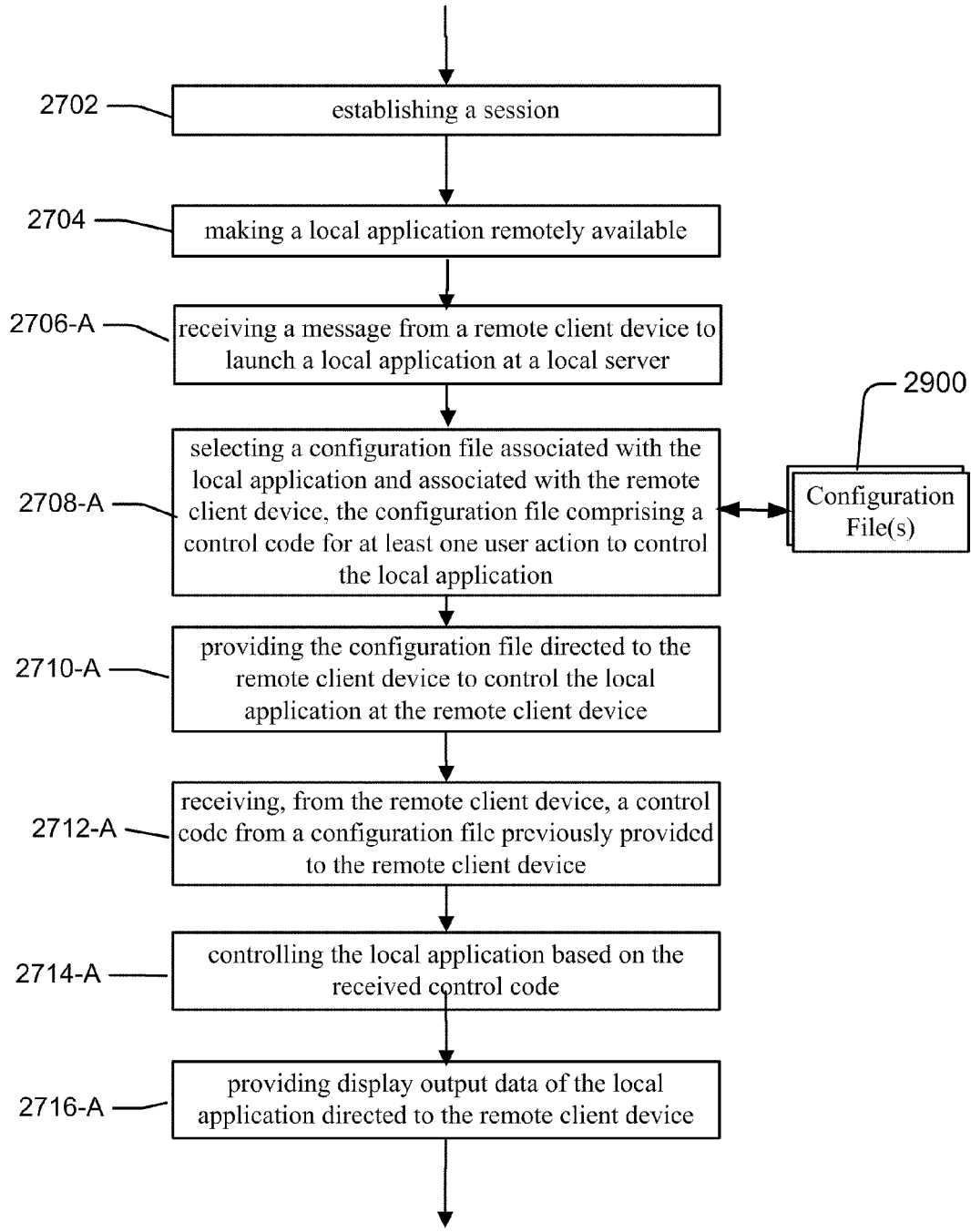
FIG. 27A is a flow chart depicting an exemplary process implemented on a server, in accordance with certain embodiments of the present disclosure.

FIG. 27A shows operations of an exemplary method performed at a server 2500 (e.g., by an agent module 322) to design a remote view of a local application to be displayed at a remote client device 2600, in accordance with embodiments of the present disclosure. At operation 2702, the session establishment module 2502 may establish (e.g., initiate or facilitate an establishment of) a session with a client device 2600. In certain embodiments, the session establishment operation may be initiated by a user operating the client device 2600 or by a server remote access module 334. In certain embodiments, another module at the server 2500 may initiate session establishment. For example, the configuration file update module 2514 of the server 2500 may initiate session establishment when pushing updates for a local GUI associated with an application to the client device 2600. The session establishment module 2502 may be configured to receive a message from a remote client device 2600 requesting to launch a local application at the local server 2500. In certain embodiments, the session establishment module 2502 may maintain a log of identities of client devices 202 and their session and application request activity. The session establishment module 2502 may make this log available to a user for administrative purposes.

The server 2500, in operation 2704, may make one or more local applications remotely available to the client device 2600 with whom the session was established. In certain embodiments, when a session is established, the server 2500 may transmit display output data (e.g., the local desktop) to the remote client device 2600 for display on the remote client device 2600. The server 2500 may control properties of the desktop seen by the remote client device 2600 by issuing commands to an application module 326 for customizing the desktop. For example, the server 2500 may control desktop background color, and selection and placement of various shortcut icons on the desktop. The server 2500 may select shortcut icons based on the identity of the client device 2600 and the user operating the client device 2600. In this way, the server 2500 can choose and make a local application selectively available to a user of a remote client device 2600. When the user of the remote client device 2600 selects the local application, the local application may be executed at the local server 2500. The server 2500 may achieve this by determining if a user of the remote client device 2600 is authorized to launch a local application or receive display output data of the local application. If the user of the remote client device 2600 is authorized to launch the local application or receive display output data of the local application, then the server 2500 may provide an icon for the local application directed to the remote client device 2600 to allow the icon to be displayed at the remote client device 2600 and to allow the remote client device 2600 to generate an application launch request message to launch the local application at the local server 2500.

In operation 2706-A, the configuration file selection module 2504 may receive a message from a remote client device 2600 to launch a local application at the server 2500. The configuration file selection module 2504 may then select, in operation 2708-A, a configuration file 2900 appropriate for the client device 2600 and appropriate for the local application for which a launch request message is received in operation 2706-A. The configuration file selection module 2504 may make the selection of the configuration file 2900 associated with the local application and associated with the remote client device 2600 based on factors such as characteristics of the client device 2600, the application for which the configuration file 2900 is being sent and any other rules provided to it by a developer of the application. The characteristics of the remote client device 2600 may include, for example, a display resolution value, display size and graphics rendering capabilities of the remote client device 2600.

The selection of a configuration file 2900 may also be responsive to the identity of the user operating the client device 2600. For example, for a user with read/write authorization, the corresponding configuration file 2900 contains command control codes for both "read" and "write" operations, whereas for a user authorized only to read but not write, the "write" command control code may not be included. Accordingly, in certain embodiments of the present disclosure, the configuration file selection module 2504 may query the client device 2600 to authenticate identity of the user operating the client device 2600. In certain embodiments, selection of a configuration file 2900 may be accomplished by dynamically generating a configuration file 2900 by the configuration file selection module 2504, instead of selecting from a set of already available configuration files, to include GUI control objects responsive to identity of the user operating the remote control device 2600. In certain embodiments, a configuration file 2900 (further described below in the disclosure with reference to FIG. 29) may comprise a control code of at least one user action to control the local application.

Still referring to FIG. 27A, the configuration file communication module 2506, in operation 2710-A, may provide the selected configuration file 2900 to the remote client device 2600. The configuration file communication module 2506 may provide the configuration file 2900 to enable the remote client device 2600 to control a composite view comprising a local GUI and a remote application view at the remote client device 2600, as further explained hereinafter. The configuration file communication module 2506 may perform the communication by using a communication service from the OS 330. In certain embodiments, the configuration file communication module 2506 may achieve this by interfacing with the OS module 324. The configuration file 2900 may be communicated using a text transfer protocol such as the hypertext transfer protocol (HTTP).

In certain embodiments, the providing operation 2710-A may instruct a remote client device 2600 to use a copy of a configuration file 2900 cached at the client device 2600. For example, in certain embodiments, the configuration file 2900 may be sent before the first launch of an application during a session between the server 2500 and the client device 2600 and subsequent launch requests for the same application may be fulfilled by the server 2500 by instructing the client device 2600 to use a previously sent configuration file 2900 in operation 2710-A. In certain embodiments, the server 2500 may receive information from a client device 2600 in an application launch request that the client device 2600 has a cached copy of the configuration file 2900 for the application. In certain embodiments, the client device 2600 may also indicate a version number for the locally cached configuration file 2900. In certain embodiments, the configuration file communication module 2506 may send a configuration file 2900 to the client device 2600 if a newer version of the configuration file 2900 is available.

In certain embodiments, the configuration file update module 2514 may send a configuration file 2900 corresponding to an application other than the application requested by the client device 2600. Thus, the configuration file update module 2514 may achieve a background download of configuration file 2900 for one or more applications available to the client device 2600. This background download may make configuration files 2900 available to applications prior to a user requesting to launch the applications.

After the configuration file communication module 2506 has communicated a configuration file 2900 to the client device 2600, a control code receiver module 2508 may listen, in operation 2712-A, for any commands to control the application running at the server 2500 from the remote client device 2600. In certain embodiments, the control code receiver module 2508 may receive the communication from the client device 2600 by using communication services of the OS 330. For example, in certain embodiments, the control code receiver module 2508 may communicate with the client device 2600 by establishing a POSIX socket with the OS 330. Other well-known communication techniques are possible. When the control code receiver module 2508 receives a command from the client device 2600, the server 2500 may then perform further actions, in operation 2714-A, to fulfill the command. The actions, for example, may include controlling the application locally running by interacting with the application module 326 for the application. The control code receiver module 2508 may be configured to recognize commands based on the control codes sent previously in the configuration file 2900. For example, if the configuration file 2900 included control codes "10," "20," and "30," the control code receiver module 2508 may be configured to recognize commands received with control codes "10," "20," and "30." In certain embodiments, the control code receiver module 2508 may be configured to ignore control codes received but not included in the configuration file 2900. In other embodiments, the control code receiver module 2508 may generate an error message when an unknown control code (a control code that was not in the configuration file 2900) is received by the control code receiver module 2508.

In operation 2714-A, the remote view controller module 2510 may control the local application based on the received control code. The remote view controller module 2510 may control the application by interfacing with the application through the application module 326 corresponding to the application. When the application is controlled using the received control code, in general, the display output data of the application may change. The remote view controller module 2510, thus may control the display output data corresponding to the view of the application running locally at the server 2500, as would be seen at a local "virtual" display and heard through a "virtual" speaker at the server 2500. The interface between the remote view controller module 2510 and the application module 326 may comprise one of several well-known techniques such as ActiveX. The remote view controller module 2510 may perform the task of controlling the application requested by a client device 2600 using GUI control objects for the application customized for the client device 2600. For example, for a client device 2600 with a relatively smaller display size, the remote view controller module 2510 may execute a requested application by instructing the application module 326 for the application to deactivate certain GUI control objects, such as a scrollbar or a drop-down menu list. In certain embodiments, the functionality of a GUI control object (e.g., scrollbar) deactivated from the remote application view may be provided to a user by including a control code for the corresponding functionality to the GUI control object (e.g., scrollbar) in the configuration file 2900.

When the application is controlled by the remote view controller module 2510, based on a received command, in general the display output data may change in response to the command. In operation 2716-A, the display output data may be communicated to the client device 2600. In general, the data transmission protocol used to transmit the display output data may be different from the data transmission protocol used for transmitting the configuration file 2900 in operation 2710-A described before. In certain embodiments, the communication of the display output data in operation 2716-A may be performed by the server remote access module 334. For example, in certain embodiments wherein the server 2500 comprises a Windows operating system, the operating system may make a remote desktop protocol (RDP) service available for communication with a remote client device 2600. In such embodiments, operation 2716-A may be performed by the RDP service available as a part of the OS 330. In certain other embodiments, a communication protocol not available as a part of the server OS 330 may be used for communication of the display output data. In such embodiments, the display data communication module 2512 is configured to provide the display output data of the local application directed to the remote client device 2600. In certain embodiments, the server 2500 may perform a background task. In certain configurations, based on a background task, the server 2500 may send a message to a remote client device 2600. Some examples of background tasks include, but are not limited to, a keyboard request detection task, an email message alerting task and a new device detection task. The keyboard request detection task may include sending a notification to the remote client device 2600 when a user presses a control that needs a keyboard (e.g., selection of a text entry area). The email message alerting task may include listening for any new email messages and notifying the remote client device 2600 of arrival of a new email message at the server 2500. The new device detection task may include detecting insertion or removal of a device from a peripheral connector (e.g., a universal serial bus port). The server 2500 may also report to the remote client device 2600 any errors occurring during the execution of the background tasks.

Figure 28A:
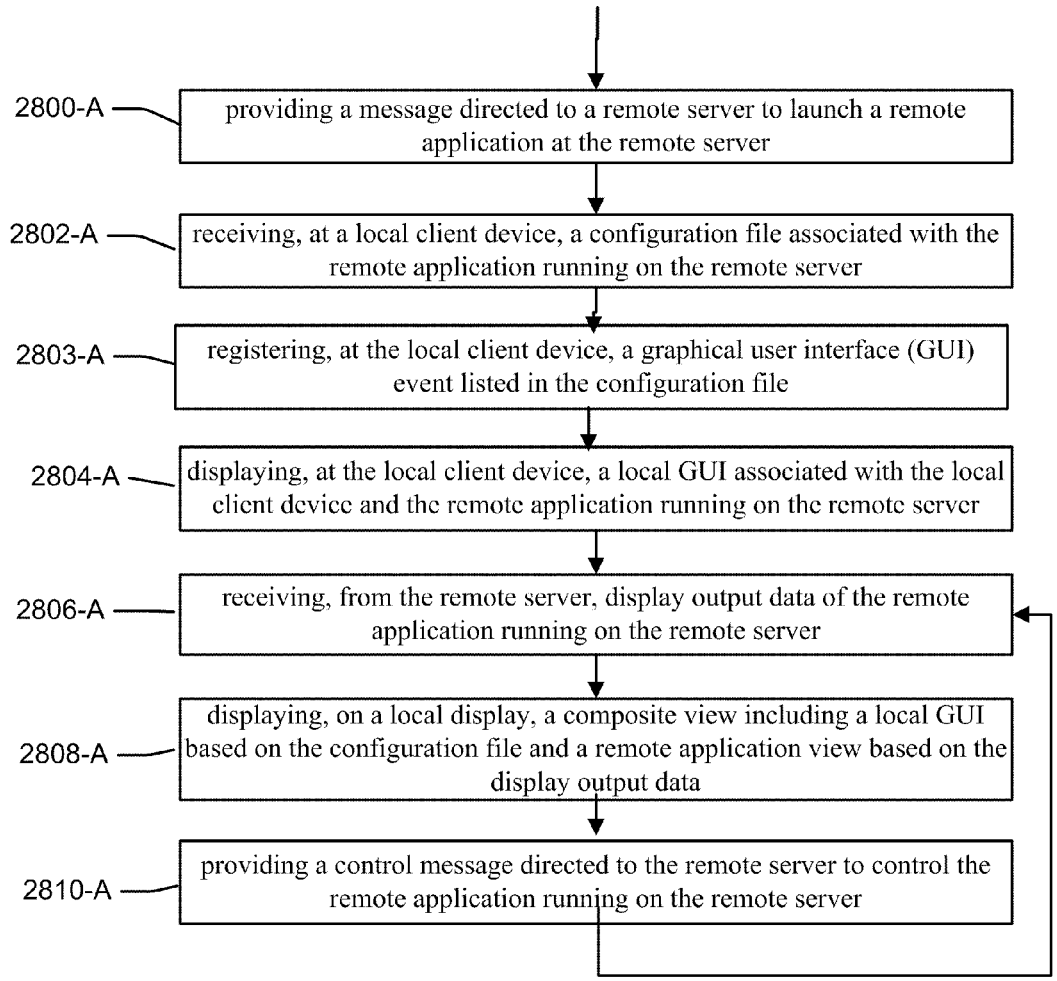
FIG. 28A is a flow chart depicting an exemplary process implemented on a client device, in accordance with certain embodiments of the present disclosure.

FIG. 28A shows operations of an exemplary method performed (e.g., by the viewer controller (VC) module 456) on the client device 2600 to render at the client device 2600 a composite view including a local GUI and a remote application view associated with a remote application running at a remote server 2500, in accordance with embodiments of the present disclosure. The client device 2600 may display a menu of applications available to a user of the client device 2600. For example, when a user of a smartphone device navigates a listing of available applications, the client device 2600 may show applications available on the server 2500 to the user (e.g., a web browser or an e-mail application). When the user selects an application, an application launch module 1102 may provide a message, in operation 2800-A, directed to the remote server 2500 to launch the remote application selected by the user. In certain embodiments, the application launch module 2602 may perform this operation 2800-A by using a communication service of the OS 160. In other embodiments, the application launch module 2602 may send the message in operation 2800-A via the client remote access module 452. In certain embodiments, the application launch module 2602 may include information such as characteristics of the client device 2600 (e.g., display resolution, display size, graphics capabilities), identity of the user operating the client device 2600 and a version number of a configuration file 2900 locally available on client device 2600 for the requested application.

In response to the application launch request, in operation 2802-A, the configuration file processing module 2604 may receive a configuration file 2900 associated with the remote application running on the remote server 2500 from the remote server 2500. In certain embodiments, the client device 2600 may have a cached copy of the configuration file 2900 and may receive an indication from the server 2500 to use the cached configuration file 2900. In accordance with certain embodiments of the present disclosure, a remote server 2500 may respond to the application launch request by requesting authorization information from the client device 2600. The application launch module 2602 may present authorization information to prove that the client device 2600 and/or the user operating the client device 2600 is authorized to launch the requested application. Any of several well-known techniques such as digital certificates and username/password combination may be used by the application launch module 2602 to perform authentication to establish the authorization.

In certain embodiments, the server 2500 may encrypt the configuration file 2900 transmitted to the client device 2600. Accordingly, in certain embodiments, the configuration file processing module 2604 may perform decryption of the configuration file 2900. Any well-known encryption technique, such as the data encryption standard (DES) encryption algorithm, may be employed for encryption/decryption of the configuration file 2900. In certain embodiments, the server 2500 may also perform background download of configuration files 2900 for applications not currently being run but available to the client device 2600. The configuration file processing module 2604 may receive and cache the configuration files 2900 received from the server 2500 to make a configuration files 2900 available next time an application is launched. In certain embodiments, the authentication module 2618 may authenticate a configuration file before using the configuration file. The authentication may be performed using any of several well known techniques such as hashing, digital certificates, etc.

At operation 2803-A, an event registration module 2614 may register GUI events listed in the received configuration file 2900 for the launched application with an event handler running on the client device 2600 as a part of the OS 330. The GUI events may be triggered by user actions such as a tap, a mouse click, a menu selection, and so on.

Based on the configuration file 2900 received for the launched application, in operation 2804-A, the local GUI module 2606 may then construct and display a local GUI (e.g., 702 and 706 in FIG. 7) for the user. The local GUI may be associated with the local client device 2600 and may also be associated with the remote application running on the remote server 2500. In certain embodiments, the local GUI may comprise multiple display areas, e.g., a header area and a toolbar area. Graphical attributes of the local GUI, e.g., color, size and shape, may be specified in the configuration file 2900. In addition, the placement of the local GUI (e.g., a toolbar and a header) may also be specified in the configuration file 2900. The local GUI module 2606 may build the local GUI using the information received from the configuration file 2900, and using graphical application programmers interface (API) natively available on the client device 2600. In operation 2806-A, the GUI receiver module 2608 may receive display output data of the remote application running on the remote server 2500 from the remote server 2500.

Using the display output data received in operation 2806-A, the display view module 2610 in operation 2808-A, may construct and display a composite view including a remote application view for the remote application running on the remote server 2500. In certain embodiments, the display view module 2610 may construct the remote application view by applying local controls or display settings chosen by the user (e.g., zooming factor, pan, tilt etc.). The display view module 2610 may thus build and display a local composite view including a local GUI generated by the local GUI module 2606 and a remote application view generated by the display view module 2610 based on the received display output data. A user may interact with the application via a local toolbar of the local GUI (e.g., 706 in FIG. 7) for the application. When the client device 2600 receives a user input via the connection 458, a control message generation module 2612 may provide, in operation 2810-A, corresponding one or more control messages comprising one or more command codes, directed to the remote server 2500, to control the remote application running on the remote server 2500. In certain embodiments, the control generation module 2612 may communicate the command codes in a virtual channel for communication with the remote server 2500, as specified in the configuration file 2900. In other embodiments, the control code generation module 2612 may communicate virtual channel commands, as specified in the configuration file 2900, to the remote server 2500. In response to the transmitted commands, the client device 2600 may receive updated display output data (operation 2806-A) and may repeat the operations 2806-A, 2808-A and 2810-A, until the user terminates the application. A user operating the client device 2600 thus may get the look-and-feel as if the application is being run and controlled locally, while the application is running at a remote server 2500. An UI information module 2616 may fetch further UI elements such as skins or bitmaps from the server 2500 or use a local copy cached on the client device 2600, if one is available.

Figure 29:
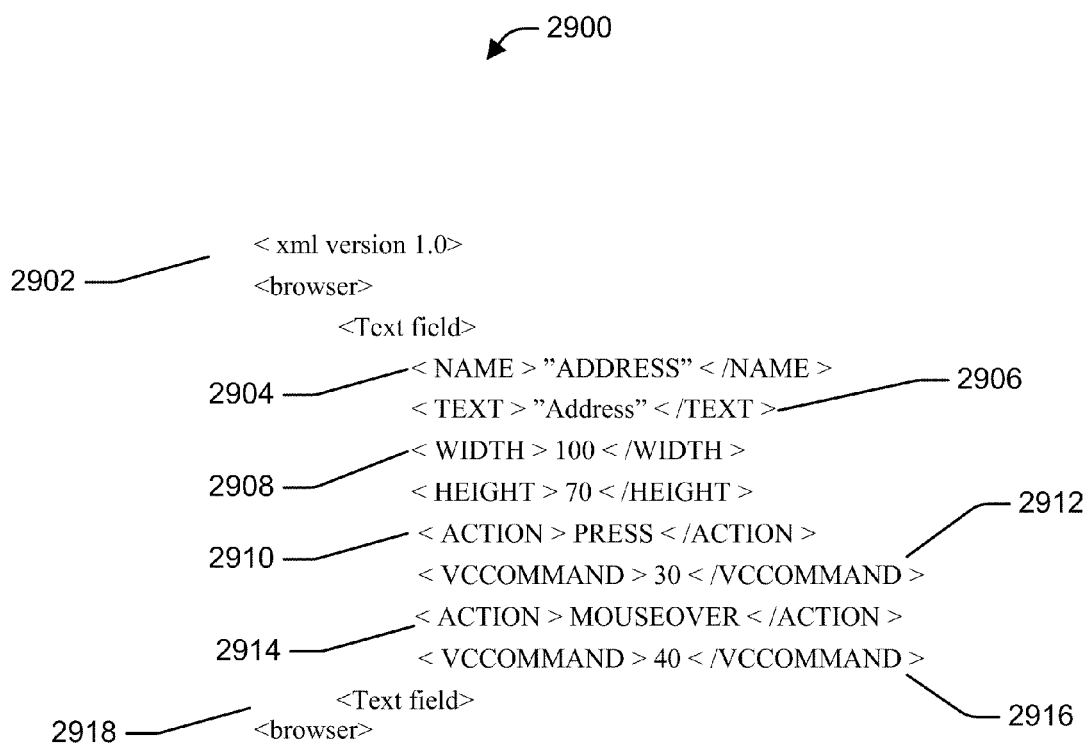
FIG. 29 is an exemplary XML code listing of a configuration file, in accordance with certain embodiments of the present disclosure.

FIG. 29 illustrates an exemplary configuration file 2900 in accordance with embodiments of the present disclosure. The illustrated example in FIG. 29 comprises a listing in the extensible markup language (XML) syntax. The configuration file 2900 has a header field 2902, indicating the protocol used and the application being described in the file ("browser"). The header field 2902 is followed by a text listing comprising a control function description 2904, a control function name tag 2906 to be displayed by a client device 2600 for the function in the description 2904, UI geometry to be used for the control specified as height and width in pixel units (lines 2908). The configuration file 2900 then lists one or more events (e.g., user actions) and corresponding control codes that a client device 2600 sends to the server 2500 when the event occurs. For example, the listing in FIG. 29 shows that for the "press" event (2910) by a user, the client device 2600 sends a control code "30" (line 2910) to the server 2500. Similarly, when a mouseover event occurs (line 2914), then the client device 2600 sends control code "40" to the server 2500. In the XML code shown on lines 2912 and 2916, the control codes are represented as virtual channel commands (VCCOMMAND). The end of the configuration file is indicated by closing syntax lines 2918. In general, a configuration file 2900 may be in any data interchangeable format such as XML, JSON etc.

Still referring to FIG. 29, the user actions listed in a configuration file 2900 corresponding to a client device 2600 include UI controls supported by the client device 2600. Exemplary UI controls include, but are not limited to, a button, a list, a tree etc. A configuration file 2900 may also list a communication protocol to be used by the server 2500 and the client device 2600. A configuration file 2900 may also contain information for each listed GUI component (e.g., GUI control objects) such as size, location, text and events that can occur on the GUI component. A configuration file 2900 may also contain layout size, position, z-orders, and events associated with the listed controls. In certain embodiments, there may be a relation between different GUI components. For example, one GUI component may launch another GUI component when an event occurs (e.g., due to a user action). For example, for a web browsing application, when a user moves a pointer to a text input box field, a keyboard GUI may be displayed to the user. In certain embodiments wherein the communication between the server 2500 and the client device 2600 comprises virtual channels, a configuration file may also contain virtual channel command associated with GUI events. Similarly, an event can be associated with a virtual channel command. With such an association between an event and a virtual channel command, when the event occurs a virtual channel command is sent to the server 2500 by the client device 2600. A configuration file 2900 may also contain a virtual channel identification (id) associated with the command. The client device 2600 (e.g., control message generation module 2612) may send a command over the virtual channel identified by the virtual channel id for the command, as specified in the configuration file 2900.

In one exemplary aspect, certain embodiments of the present disclosure enable a server-side software component (e.g., agent module 322) to design a graphical user interface (GUI) (e.g., a local control GUI 706) and corresponding actions on the remote client devices 2600. In certain embodiments, a server software component (e.g., agent module 322) reads a GUI layout from a configuration file 2900 stored on a server storage medium or another input medium (e.g., data disc or memory dongle) and instruct the remote client device 2600 to create a GUI (e.g., local control GUI 706) using native UI resources and associate virtual channel commands for each GUI component (e.g., GUI control objects). When a user operating a remote client device 2600 initiates an action on the GUI, the remote client device 2600 sends commands (e.g. virtual channel commands) to the server 2500 for processing. Certain embodiments of the present disclosure thus advantageously enable addition or modification of GUI control objects used to control an application and functionality associated with each GUI control object without upgrading client software and adding or changing user input methods without upgrading client software.

In one aspect, a module (e.g., configuration file selection module 2504) at a server 2500 creates a configuration file 2900 which contains information about the desired GUI components. The configuration file 2900 may contain information on GUI components such as size, location, text, and events that can occur on the GUI component. A configuration file 2900 may contain the virtual channel command associated with GUI events. The server 2500 pushes the configuration file 2900 to the client device 2600 (e.g., using configuration file update module 2514). The client device 2600 constructs (e.g., at VC module 456) a composite view as per the configuration file 2900 and adds event notification to the client device's software stack (e.g. using event registration module 2614). A local GUI is constructed using native user interface (UI) builders to get a native look and feel. When a user interacts with a GUI control object, a corresponding virtual channel message is sent (e.g., using control message generation module 2612) to the server 2500. In response to the message, the server 2500 modifies the display output data (e.g., using remote view controller module 2510) or sends another command to the client device 2600.

In one aspect, adding or changing user input methods without upgrading client device software is achieved. A server module (e.g., configuration file selection module 2504) can update configuration file 2900 sent to the client device 2600 specifying what user inputs can be accepted by a GUI component (e.g., user inputs mouse clicks, button presses, finger taps, finger pinches, etc.). In one aspect, a server software component (e.g., configuration file selection module 2504) can create a configuration file 2900 which contains information about the GUI components. The configuration file 2900 can be in any data interchangeable format such as XML, JSON, or another format. The configuration file 2900 may contain all UI controls the client device 2600 can support (e.g., button, list, tree, etc.). A configuration file 2900 may also specify the communication protocol that can be supported by the server 2500 and the client device 2600. A configuration file 2900 may contain information on GUI components such as size, location, text, events that can occur on the GUI component. A configuration file 2900 may contain the layout size, position, z-orders, events associated with the GUI components. In certain embodiments, there can be a relation between different GUI components. Each control can have option to invoke another control when an event occurs. A configuration file 2900 may contain the virtual channel command associated with GUI events. An event can be associated with virtual channel command. When event occurs a virtual channel command is sent to the server 2500 (e.g. using control message generation module 2612). A configuration file 2900 may contain virtual channel id associated with the command.

In certain embodiments, a server 2500 may send a new configuration file 2900 to the client device 2600 to change the local GUI associated with an application. A server 2500 may also do a background task and return an error. This way, a server component (e.g., configuration file selection module 2504) can decide what user inputs can be accepted by GUI component. Each UI control at the remote client device 2600 may be associated with a different type of event. Each event can be associated with a virtual channel command. Each event can trigger changes in another control. A GUI component and action is associated with a virtual channel command. Each event may be associated with a single or multiple virtual channel commands. When the user triggers the control, the client device 2600 performs the local UI update (e.g., using VC module 456). The client device 2600 sends the virtual channel command to the server 2500 when this action by a user occurs.

Figure 8B:
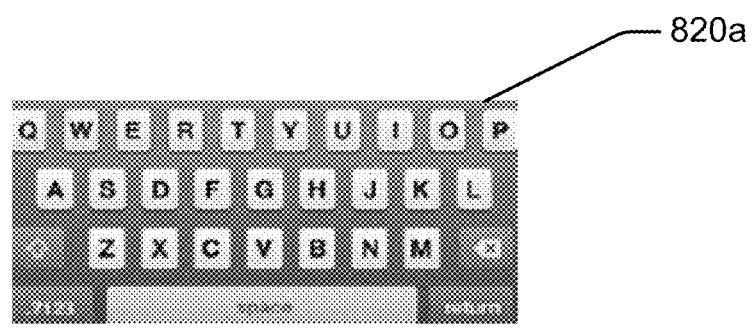
FIG. 8B illustrates an example of a graphical keyboard according to certain aspects of the present disclosure.

Referring to FIGS. 7, 8A and 8B, a configuration file 2900 may specify a local control GUI toolbar 706 for a web browser application. The local control GUI control objects may include a keyboard icon 820, a BACK arrow 822, a FORWARD arrow 824, a pointer icon 826, a MOUSE icon 828 and a TOOLS icon 830. When a user selects the keyboard icon 820 (e.g., by touching or tapping), the client device 2600 may change the local menu display area 706 to display a keyboard for the user. The layout details of a keyboard may be provided in the configuration file 2900, or may be based on the local GUI tools provided by the OS 160 of the client device 2600. When a user selects the BACK icon 822, the web browser application displays a previously displayed web page. In certain embodiments, the client device 2600 may perform this by communicating to the server 2500, a control code corresponding to this event, as specified in the configuration file 2900. In other embodiments, the client device 2600 may include a local cache of previously displayed web page and may use the cached data to render the previously displayed web page. In a manner similar to the BACK icon 822, the FORWARD icon 824 may be used to render a later viewed web page in the web browser. The pointer icon 826 may allow a user to activate a pointer in the display area 804. The MOUSE icon 828 may allow a user to activate mouse movements and the TOOLS icon 830 may open further menus containing additional tools, as provided in the configuration file and as provided by the OS 330 of the client device 2600.

The subject technology is illustrated, for example, according to various aspects described below. Numbered clauses are provided below for convenience. These are provided as examples, and do not limit the subject technology.

1. A machine-implemented method of rendering at a local client device a composite view including a local GUI and a remote application view associated with a remote application running at a remote server, the method comprising:

providing a message directed to a remote server to launch a remote application at the remote server (e.g., 2800-A of FIG. 28A);

receiving, at a local client device, a configuration file associated with the remote application running on the remote server (e.g., 2802-A of FIG. 28A);

registering, at the local client device, a graphical user interface (GUI) event listed in the configuration file (e.g., 2803-A of FIG. 28A);

displaying, at the local client device, a local GUI associated with the local client device and the remote application running on the remote server (e.g., 2804-A of FIG. 28A);

receiving, from the remote server, display output data of the remote application running on the remote server (e.g., 2806-A of FIG. 28A);

displaying, on a local display, a composite view including a local GUI based on the configuration file and a remote application view based on the display output data (e.g., 2808-A of FIG. 28A); and providing a control message directed to the remote server to control the remote application running on the remote server (e.g., 2810-A of FIG. 28A).

2. The method of clause 1, wherein the providing the control message comprises including a control code from the configuration file.

3. The method of clause 1, wherein the displaying comprises constructing a remote application view responsive to a zooming factor.

4. The method of clause 1, wherein the configuration file comprises a data interchangeable format.

5. The method of clause 1, wherein the configuration file comprises a user interface control definition.

6. The method of clause 1, wherein the configuration file comprises information for at least one control GUI component.

7. The method of clause 1, wherein the configuration file comprises a virtual channel command for a GUI event.

8. The method of clause 1, wherein the user action is one or more of touch, scroll, tap, pinch, double-tap and hold.

9. The method of clause 1, further comprising:
authenticating the configuration file.

10. The method of clause 1, further comprising:
decrypting the configuration file.

11. The method of clause 1, wherein the receiving the configuration file comprises receiving the configuration file using a first transmission protocol and the receiving the display output data comprises receiving the display output data using a second transmission protocol.

12. The method of clause 11, wherein the first transmission protocol is a text transfer protocol and the second transmission protocol is a remote desktop protocol (RDP).

13. The method of clause 1, further comprising:
fetching user interface information from the remote server.

14. The method of clause 1, wherein the control message is responsive to a user action.

15. The method of clause 1, wherein the providing the control message includes providing the control message for transmission over a virtual channel to the remote server.

16. The method of clause 1, wherein the providing the control message comprises providing the control message comprising a virtual channel command received in the configuration file.

17. A system for rendering at a local client side a composite view including a local GUI and a remote application view associated with a remote application running at a remote server, the system comprising:

an application launch module configured to provide a message directed to a remote server to launch a remote application at the remote server (e.g., 2602 of FIG. 26);

a configuration file processing module configured to receive a configuration file from the remote server, the configuration file associated with the remote application running on the remote server (e.g., 2604 of FIG. 26);

an event registration module configured to register, at a local client side, a graphical user interface (GUI) event listed in the configuration file (e.g., 2614 of FIG. 26);

a local GUI module configured to display a local GUI based on the configuration file, the local GUI associated with the system and associated with the remote application running on the remote server (e.g., 2606 of FIG. 26);

a GUI receiver module configured to receive, from the remote server, display output data of the remote application running on the remote server (e.g., 2608 of FIG. 26);

a display view module configured to provide, to a local display, a composite view including the local GUI based on the configuration file and a remote application view based on the display output data (e.g., 2610 of FIG. 26); and a control message generation module configured to provide a control message directed to the remote server to control the remote application running on the remote server (e.g., 2612 of FIG. 26).

18. The system of clause 17, wherein the control message generation module is configured to provide a control message comprising a control code from the configuration file.

19. The system of clause 17, wherein the configuration file processing module is configured to process a configuration file comprising a virtual channel command for a GUI event.

20. The system of clause 17, further comprising:
an authentication module configured to authenticate the configuration file (e.g., 2618 of FIG. 26).

21. The system of clause 17, further comprising:
a user interface (UI) information module configured to fetch user interface information from the remote server (e.g., 2616 of FIG. 26).

22. The system of clause 17, further comprising:
the local display;
a processing system; and
a machine-readable medium comprising:
a remote access module (e.g., 452 of FIG. 4);
the application launch module (e.g., 2602 of FIG. 26);
the configuration file processing module (e.g., 2604 of FIG. 26);
the event registration module (e.g., 2614 of FIG. 26);
the local GUI module (e.g., 2606 of FIG. 26);
the GUI receiver module (e.g., 2608 of FIG. 26); and
the control message generation module (e.g., 2612 of FIG. 26).

23. A machine-readable medium encoded with instructions for rendering, at a local client device, a composite view including a local GUI and a remote application view associated with a remote application running at a remote server, the instructions comprising code for:

providing a message directed to a remote server to launch a remote application at the remote server;

receiving, at a local client device, a configuration file associated with the remote application running on the remote server;

registering, at the local client device, a graphical user interface (GUI) event listed in the configuration file;

receiving, from the remote server, display output data of the remote application running on the remote server;

displaying, on a local display, a composite view including a local GUI based on the configuration file and a remote application view based on the display output data, the local GUI associated with the local client device and associated with the remote application running on the remote server; and providing a control message directed to the remote server to control the remote application running on the remote server.

24. The machine-readable medium of clause 23, wherein the providing the control message comprises including a control code from the configuration file.

25. The machine-readable medium of clause 23, wherein the displaying comprises constructing a remote application view responsive to a zooming factor.

26. The machine-readable medium of clause 23, wherein the configuration file comprises a data interchangeable format.

27. The machine-readable medium of clause 23, wherein the configuration file comprises a user interface control definition.

28. The machine-readable medium of clause 23, wherein the configuration file comprises information for at least one control GUI component.

29. The machine-readable medium of clause 23, wherein the configuration file comprises a virtual channel command for a GUI event.

30. The machine-readable medium of clause 23, wherein the user action is one or more of touch, scroll, tap, pinch, double-tap and hold.

31. The machine-readable medium of clause 23, wherein the instructions further comprise code for authenticating the configuration file.

32. The machine-readable medium of clause 23, wherein the instructions further comprise code for decrypting the configuration file.

33. The machine-readable medium of clause 23, wherein the code for receiving the configuration file comprises code for receiving the configuration file using a first transmission protocol and the code for receiving the display output data comprises code for receiving the display output data using a second transmission protocol.

34. The machine-readable medium of clause 33, wherein the first transmission protocol is a text transfer protocol and the second transmission protocol is a remote desktop protocol (RDP).

35. The machine-readable medium of clause 23, wherein the instructions further comprise code for:
fetching user interface information from the remote server.

36. The machine-readable medium of clause 23, wherein the control message is responsive to a user action.

37. The machine-readable medium of clause 23, wherein the code for providing the control message includes code for providing the control message for transmission over a virtual channel to the remote server.

38. The machine-readable medium of clause 23, wherein the code for providing the control message comprises code for providing the control message comprising a virtual channel command received in the configuration file.

Figure 28B:
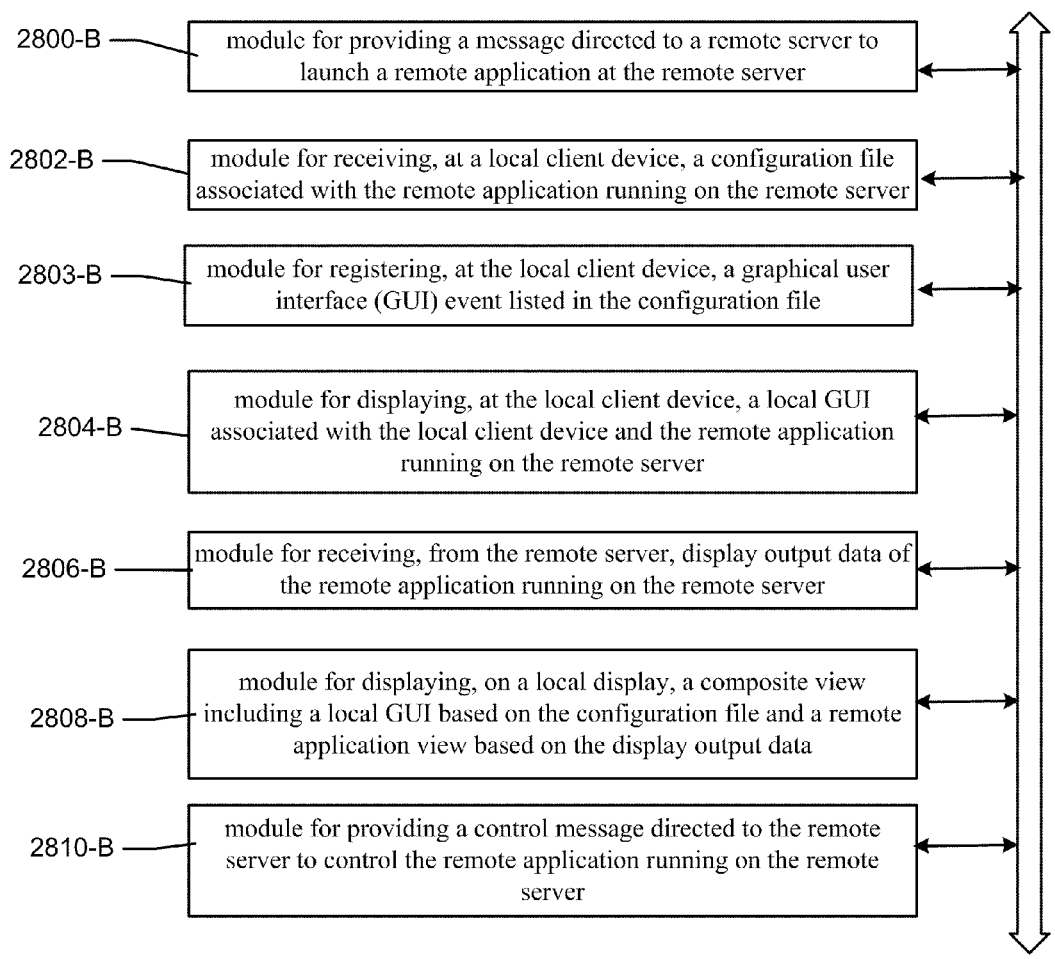
FIG. 28B illustrates an example of a configuration of an apparatus according to one aspect of the present disclosure.

39. An apparatus for rendering, at a local client device, a composite view including a local GUI and a remote application view associated with a remote application running at a remote server, comprising:

means for providing a message directed to a remote server to launch a remote application at the remote server (e.g., 2800-B of FIG. 28B);

means for receiving, at a local client device, a configuration file associated with the remote application running on the remote server (e.g., 2802-B of FIG. 28B);

means for registering, at the local client device, a graphical user interface (GUI) event listed in the configuration file (e.g., 2803-B of FIG. 28B);

means for displaying, at the local client device, a local GUI associated with the local client device and the remote application running on the remote server (e.g., 2804-B of FIG. 28B);

means for receiving, from the remote server, display output data of the remote application running on the remote server (e.g., 2806-B of FIG. 28B);

means for displaying, on a local display, a composite view including a local GUI based on the configuration file and a remote application view based on the display output data (e.g., 2808-B of FIG. 28B); and means for providing a control message directed to the remote server to control the remote application running on the remote server (e.g., 2810-B of FIG. 28B).

40. The apparatus of clause 39, wherein the means for providing the control message comprises means for including a control code from the configuration file.

41. The apparatus of clause 39, wherein the displaying comprises constructing a remote application view responsive to a zooming factor.

42. The apparatus of clause 39, wherein the configuration file comprises a data interchangeable format.

43. The apparatus of clause 39, wherein the configuration file comprises a user interface control definition.

44. The apparatus of clause 39, wherein the configuration file comprises information for at least one control GUI component.

45. The apparatus of clause 39, wherein the configuration file comprises a virtual channel command for a GUI event.

46. The apparatus of clause 39, wherein the user action is one or more of touch, scroll, tap, pinch, double-tap and hold.

47. The apparatus of clause 39, further comprising:
means for authenticating the configuration file.

48. The apparatus of clause 39, further comprising:
means for decrypting the configuration file.

49. The apparatus of clause 39, wherein the receiving the configuration file comprises receiving the configuration file using a first transmission protocol and the receiving the display output data comprises receiving the display output data using a second transmission protocol.

50. The apparatus of clause 49, wherein the first transmission protocol is a text transfer protocol and the second transmission protocol is a remote desktop protocol (RDP).

51. The apparatus of clause 39, further comprising:
means for fetching user interface information from the remote server.

52. The apparatus of clause 39, wherein the control message is responsive to a user action.

53. The apparatus of clause 39, wherein the providing the control message includes providing the control message for transmission over a virtual channel to the remote server.

54. The apparatus of clause 39, wherein the providing the control message comprises providing the control message comprising a virtual channel command received in the configuration file.

The subject technology is illustrated, for example, according to various aspects described below. Numbered clauses are provided below for convenience. These are provided as examples, and do not limit the subject technology.

1. A machine-implemented method of designing a remote view of a local application, to be displayed at a remote client device, the method comprising:

receiving a message from a remote client device to launch a local application at a local server (e.g., 2706-A of FIG. 27A);

selecting a configuration file associated with the local application and associated with the remote client device, the configuration file comprising a control code for at least one user action to control the local application (e.g., 2708-A of FIG. 27A);

providing the configuration file directed to the remote client device to control the local application at the remote client device (e.g., 2710-A of FIG. 27A);

receiving, from the remote client device, a control code from a configuration file previously provided to the remote client device (e.g., 2712-A of FIG. 27A);

controlling the local application based on the received control code (e.g., 2714-A of FIG. 27A); and providing display output data of the local application directed to the remote client device (e.g., 2716-A of FIG. 27A).

2. The method of clause 1, wherein the providing the display output data comprises communicating the display output data using a first protocol and the providing the configuration file comprises providing the configuration file using a second protocol.

3. The method of clause 2, wherein the first protocol comprises a remote desktop protocol (RDP).

4. The method of clause 2, wherein the second protocol comprises a hypertext transfer protocol (HTTP).

5. The method of clause 1, wherein the providing the configuration file comprises providing the configuration file in an extensible markup language (XML) format.

6. The method of clause 1, wherein the selecting the configuration file comprises selecting the configuration file based on a display characteristic of the remote client device.

7. The method of clause 6, wherein the display characteristic comprises a display resolution value of the remote client device.

8. The method of clause 1, further comprising:
authenticating identity of a user operating the remote client device.

9. The method of clause 8, wherein the selecting the configuration file is responsive to the identity of the user.

10. The method of clause 1, further comprising
deactivating at least one graphical user interface (GUI) control object of the local application.

11. The method of clause 10, wherein the GUI control object is a scrollbar.

12. The method of clause 1, further comprising:
providing an icon for the local application directed to the remote client device to allow the remote client device to generate the message to launch the local application at the local server.

13. A machine-readable medium encoded with instructions executable by a processing system to perform a method for designing a remote view of a local application, to be displayed at a remote client device, the instructions comprising code for:

receiving a message from a remote client device to launch a local application at a local server;

selecting a configuration file associated with the local application and associated with the remote client device, the configuration file comprising a control code for at least one user action to control the local application;

providing the configuration file directed to the remote client device to control the local application at the remote client device;

receiving, from the remote client device, a control code from a configuration file previously provided to the remote client device;

controlling the local application based on the received control code; and providing display output data of the local application directed to the remote client device.

14. The machine-readable medium of clause 13, wherein the code for communicating the display output data comprises code for communicating the display output data using a first protocol and the code for providing the configuration file comprises code for providing the configuration file using a second protocol.

15. The machine-readable medium of clause 14, wherein the first protocol comprises a remote desktop protocol (RDP).

16. The machine-readable medium of clause 14, wherein the second protocol comprises a hypertext transfer protocol (HTTP).

17. The machine-readable medium of clause 13, wherein the code for providing the configuration file comprises code for providing the configuration file in an extensible markup language (XML) format.

18. The machine-readable medium of clause 13, wherein the code for selecting the configuration file comprises code for selecting the configuration file based on a display characteristic of the remote client device.

19. The machine-readable medium of clause 18, wherein the display characteristic comprises a display resolution value of the remote client device.

20. The machine-readable medium of clause 13, wherein the instructions further comprise code for:

authenticating identity of a user operating the remote client device.

21. The machine-readable medium of clause 20, wherein the selecting the configuration file is responsive to the identity of the user.

22. The machine-readable medium of clause 13, wherein the instructions further comprise code for:

deactivating at least one graphical user interface (GUI) control object of the local application.

23. The machine-readable medium of clause 22, wherein the GUI control object is a scrollbar.

24. The machine-readable medium of clause 13, wherein the instructions further comprise code for:

providing an icon for the local application directed to the remote client device to allow the remote client device to generate the message to launch the local application at the local server.

Figure 27B:
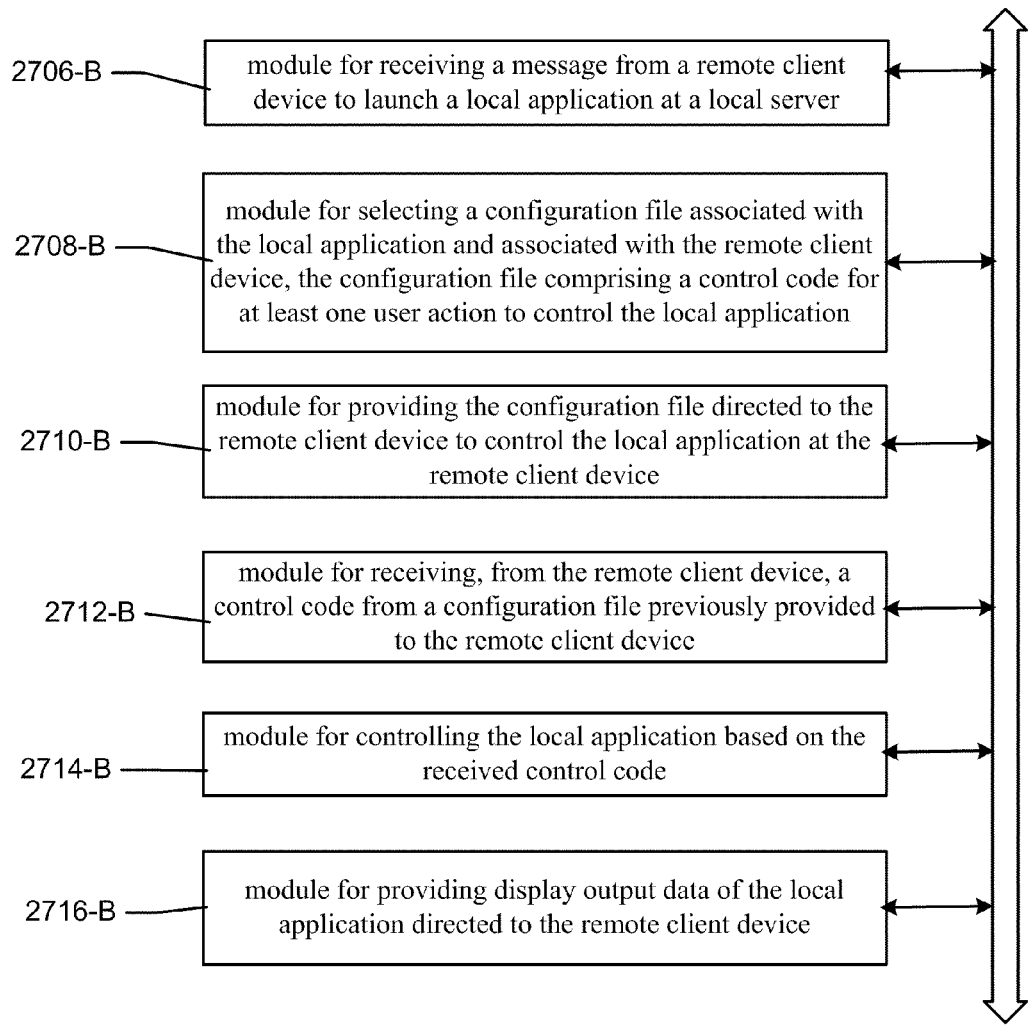
FIG. 27B illustrates an example of a configuration of an apparatus according to one aspect of the present disclosure.

25. An apparatus for designing a remote view of a local application, to be displayed at a remote client device, comprising:

means for receiving a message from a remote client device to launch a local application at a local server (e.g., 2706-B of FIG. 27B);

means for selecting a configuration file associated with the local application and associated with the remote client device, the configuration file comprising a control code for at least one user action to control the local application (e.g., 2708-B of FIG. 27B);

means for providing the configuration file directed to the remote client device to control the local application at the remote client device (e.g., 2710-B of FIG. 27B);

means for receiving, from the remote client device, a control code from a configuration file previously provided to the remote client device (e.g., 2712-B of FIG. 27B);

means for controlling the local application based on the received control code (e.g., 2714-B of FIG. 27B); and means for providing display output data of the local application directed to the remote client device (e.g., 2716-B of FIG. 27B).

26. The apparatus of clause 25, wherein the means for providing the display output data comprises means for communicating the display output data using a first protocol and the means for providing the configuration file comprises means for providing the configuration file using a second protocol.

27. The apparatus of clause 26, wherein the first protocol comprises a remote desktop protocol (RDP).

28. The apparatus of clause 26, wherein the second protocol comprises a hypertext transfer protocol (HTTP).

29. The apparatus of clause 25, wherein the means for providing the configuration file comprises means for providing the configuration file in an extensible markup language (XML) format.

30. The apparatus of clause 25, wherein the means for selecting the configuration file comprises means for selecting the configuration file based on a display characteristic of the remote client device.

31. The apparatus of clause 30, wherein the display characteristic comprises a display resolution value of the remote client device.

32. The apparatus of clause 25, further comprising:

means for authenticating identity of a user operating the remote client device.

33. The apparatus of clause 32, wherein the means for selecting the configuration file is responsive to the identity of the user.

34. The apparatus of clause 25, further comprising means for deactivating at least one graphical user interface (GUI) control object of the local application.

35. The apparatus of clause 34, wherein the GUI control object is a scrollbar.

36. The apparatus of clause 25, further comprising:

means for providing an icon for the local application directed to the remote client device to allow the remote client device to generate the message to launch the local application at the local server.

37. A system for designing a remote view of a local application for viewing at a remote client device, the system comprising:

a remote access module configured to receive a message from a remote client device to launch a local application at a local server side (e.g., 134 of FIG. 3);

a configuration file selection module configured to select a configuration file associated with the local application and associated with the remote client device, the configuration file comprising a control code for at least one user action to control the local application (e.g., 2504 of FIG. 25);

a configuration file communication module configured to provide the configuration file directed to the remote client device to control the local application at the remote client device (e.g., 2506 of FIG. 25);

a control code receiver module configured to receive, from the remote client device, a control code from a configuration file previously provided to the remote client device (e.g., 2508 of FIG. 25);

a remote view controller module configured to control the local application based on the received control code (e.g., 2510 of FIG. 25); and a display data communication module configured to provide display output data of the local application directed to the remote client device (e.g., 2512 of FIG. 25).

38. The system of clause 37, wherein the display data communication module is configured to communicate the display output data using a first protocol and the configuration file communication module is configured to provide the configuration file using a second protocol.

39. The system of clause 38, wherein the first protocol comprises a remote desktop protocol (RDP).

40. The system of clause 38, wherein the second protocol comprises a hypertext transfer protocol (HTTP).

41. The system of clause 37, wherein the configuration file communication module is configured to communicate the configuration file in an extensible markup language (XML) format.

42. The system of clause 37, wherein the configuration file selection module is configured to select the configuration file based on a display characteristic of the remote client device.

43. The system of clause 42, wherein the display characteristic comprises a display resolution value of the remote client device.

44. The system of clause 37, wherein the configuration file selection module is further configured to authenticate identity of a user operating the remote client device.

45. The system of clause 44, wherein the configuration file selection module is configured to select the configuration file responsive to the identity of the user.

46. The system of clause 37, wherein the remote view controller module is configured to deactivate at least one graphical user interface (GUI) control object of the local application.

47. The system of clause 46, wherein the GUI control object is a scrollbar.

48. The system of clause 37, wherein the remote view controller module is configured to provide an icon for the local application directed to the remote client device to allow the remote client device to generate the message to launch the local application at the local server side.

It will be appreciated by one skilled in the art that, according to one aspect of the disclosure, because these control GUI objects are rendered locally (e.g., in the local control GUI display area 706), these objects can be advantageously rendered at the resolution of the local display and can be rendered to have dimensions that can be easily navigated or handled by a user using a finger or a stylus. Furthermore, the available display area (e.g., 704) for a remote application view of a remote application can be fully dedicated to a remote application GUI by deactivating GUI control objects from the remote application view display area 704. For example, a web browser executed at a remote server 2500 may be displayed in the remote application view display area 704 after deactivating scrollbars and menu header of the web browser. The toolbar and the menu header controls can be provided by local control GUI 706 by specifying via a configuration file 2900.

Those of skill in the art would appreciate that the various illustrative blocks, modules, elements, components, methods, and algorithms described herein may be implemented as electronic hardware, computer software, or combinations of both.

For example, a module (e.g., an agent module 322, a viewer controller module 456, a local view module 540, a remote view module 535, or any other modules) may be implemented as electronic hardware, computer software, or combinations of both. In one aspect, a module(s) may be an apparatus since a module(s) may include instructions encoded or stored on a machine-readable medium, on another device, or on a portion thereof. In one aspect, a module(s) may be software (e.g., an application, a subroutine) stored in a machine-readable medium and executable by a processing system or a processor. In another aspect, a module(s) may be hardware (e.g., machine-readable medium encoded with instructions, a pre-programmed general-purpose computer, or a special purpose electronic or optical device).

Various modules may reside in one machine or in multiple machines. In one example, modules for the server side (e.g., an agent module, an application module, a server remote access module, etc.) may be located in one server or spread over multiple servers. In another example, modules for the client side (e.g., a client remote access module, a viewer controller module, a local view module, a remote view module, a display module, etc.) may be located in one client device or spread over multiple client devices.

In one aspect of the disclosure, when actions or functions are described as being performed by a module or a component (e.g., establishing, sending, receiving, providing, building, displaying, registering, encrypting, decrypting, authenticating, notifying, accepting, selecting, controlling, issuing, transmitting, reporting, pushing, or any other action or function), it is understood that such actions or functions are performed by the module or the component directly or indirectly. As an example, when a module is described as performing an action, it is understood that the module may perform the action directly or may perform the action indirectly, for example, by facilitating such an action. For instance, when a session is described as being established by a module, it is understood that the module may establish the session indirectly by facilitating an establishment of the session. As yet another example, when a view of an application is described as being displayed or rendered by a module, it is understood that the view may be displayed or rendered by the module either directly or indirectly.

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

Various components and blocks may be arranged differently (e.g., arranged in a different order, or partitioned in a different way) all without departing from the scope of the subject technology. In one aspect of the disclosure, the modules (or elements) recited in the accompanying claims may be performed by one module or by a smaller number of modules, and this arrangement is within the scope of the claims. In another aspect, the modules (or elements) recited in the accompanying claims may be performed by a larger number of modules, and this arrangement is within the scope of the claims. In yet another aspect, a module (or an element) recited in the accompanying claims may be performed by multiple modules, and this arrangement is within the scope of the claims. For example, a local view module and a remote view module may be combined into one module. A client remote access module, a local view module and a remote view module may be combined into one module. An agent module and a server remote access module may be combined into one module. In another example, these modules may be divided into a larger number of modules.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A machine-implemented method of designing a remote view of a local application, to be displayed at a remote client device, the method comprising:

receiving a message to launch a local application at a local server;

selecting a configuration file associated with the local application and associated with a remote client device, the configuration file comprising one or more control codes for one or more user actions to control the local application, the one or more control codes specifying operations available to a user of the remote client device to control the local application;

providing, to the remote client device, a display output data of the local application of the local server, a local graphics user interface (GUI) of the local application being deactivated in the display output data;

providing, to the remote client device, the configuration file comprising the one or more control codes directed to and associated with the remote client device, to allow at least one of the one or more control codes to be selected by the remote client device, and to allow the local application to be controlled from the remote client device through a remote GUI generated by the remote client device based on the control codes;

providing for display, on the remote display associated with the remote client device, a composite view including the remote GUI for controlling the local application, the remote GUI generated by the remote client device based on the configuration file, and the composite view further including a local application view based on the display output data, the remote GUI further being associated with the remote client device and associated with the local application of the local server;

receiving, from the remote client device, the at least one of the one or more control codes of the configuration file previously provided to the remote client device;

controlling the local application based on the received at least one of the one or more control codes; and providing display output data of the local application directed to the remote client device.

2. The method of claim 1, further comprising
deactivating at least one control code of the local application.

3. The method of claim 1, further comprising
providing an icon for the local application directed to the remote client device to allow the remote client device to generate the message to launch the local application at the local server.

4. A non-transitory machine-readable medium encoded with instructions executable by a processing system to perform a method for designing a remote view of a local application, to be displayed at a remote client device, the instructions comprising code for:

receiving a message to launch a local application at a local server;

selecting a configuration file associated with the local application and associated with a remote client device, the configuration file comprising one or more control codes for one or more user actions to control the local application, the one or more control codes specifying operations available to a user of the remote client device to control the local application;

providing, to the remote client device, a display output data of the local application of the local server, a local graphics user interface (GUI) of the local application being deactivated in the display output data;

providing the configuration file comprising the one or more control codes associated with the remote client device to allow at least one of the one or more control codes to be selected by the remote client device, and to allow the local application to be controlled from the remote client device through a remote GUI generated by the remote client device based on the control codes;

providing for display, on the remote display associated with the remote client device, a composite view including the remote GUI for controlling the local application, the remote GUI generated by the remote client device based on the configuration file, and the composite view further including a local application view based on the display output data, the remote GUI further being associated with the remote client device and associated with the local application of the local server;

receiving the at least one of the one or more control codes of the configuration file previously provided to the remote client device;

controlling the local application based on the received at least one of the one or more control codes; and providing display output data of the local application.

5. The non-transitory machine-readable medium of claim 4, wherein the code for providing the display output data comprises code for providing the display output data using a first protocol and the code for providing the configuration file comprises code for providing the configuration file using a second protocol.

6. The non-transitory machine-readable medium of claim 5, wherein the first protocol comprises a remote desktop protocol (RDP).

7. The non-transitory machine-readable medium of claim 5, wherein the second protocol comprises a hypertext transfer protocol (HTTP).

8. The non-transitory machine-readable medium of claim 4, wherein the code for providing the configuration file comprises code for providing the configuration file in an extensible markup language (XML) format.

9. The non-transitory machine-readable medium of claim 4, wherein the code for selecting the configuration file comprises code for selecting the configuration file based on a display characteristic of the remote client device.

10. The non-transitory machine-readable medium of claim 9, wherein the display characteristic comprises one of a display resolution value, a display size, and graphics rendering capabilities of the remote client device.

11. The non-transitory machine-readable medium of claim 4, wherein the instructions further comprise code for:
authenticating an identity of a user operating the remote client device.

12. The non-transitory machine-readable medium of claim 11, wherein the selecting the configuration file is responsive to the identity of the user.

13. The non-transitory machine-readable medium of claim 4, wherein the instructions further comprise code for:
deactivating at least one control code of the local application.

14. The non-transitory machine-readable medium of claim 13, wherein the GUI control object is a scrollbar.

15. The non-transitory machine-readable medium of claim 4, wherein the instructions further comprise code for:
providing an icon for the local application directed to the remote client device to allow the remote client device to generate the message to launch the local application at the local server.

16. An apparatus for designing a remote view of a local application, to be displayed at a remote client device, comprising:
means for receiving a message from a remote client device to launch a local application at a local server;
means for selecting a configuration file associated with the local application and associated with the remote client device, the configuration file comprising one or more control codes for one or more user actions to control the local application, the one or more control codes specifying operations available to a user of the remote client device to control the local application;
means for providing, to the remote client device, a display output data of the local application of the local server, a local graphics user interface (GUI) of the local application being deactivated in the display output data;
means for providing the configuration file comprising the one or more control codes directed to and associated with the remote client device to allow at least one of the one or more control codes to be selected by the remote client device, and to allow the local application to be controlled from the remote client device through a remote GUI generated by the remote client device based on the control codes;
means for providing for display, on the remote display associated with the remote client device, a composite view including the remote GUI for controlling the local application, the remote GUI generated by the remote client device based on the configuration file, and the composite view further including a local application view based on the display output data, the remote GUI further being associated with the remote client device and associated with the local application of the local server;
means for receiving, from the remote client device, the at least one of the one or more control codes of the configuration file previously provided to the remote client device;
means for controlling the local application based on the received at least one of the one or more control codes; and
means for providing display output data of the local application directed to the remote client device.

17. The apparatus of claim 16, wherein the means for providing the display output data comprises means for communicating the display output data using a first protocol and the means for providing the configuration file comprises means for providing the configuration file using a second protocol.

18. A hardware system for designing a remote view of a local application for viewing at a remote client device, the hardware system comprising:
at least one processor; and
a non-transitory computer-readable medium comprising:
a remote access module configured to receive a message to launch a local application at a local server side;
a configuration file selection module configured to select a configuration file associated with the local application and associated with a remote client device, the configuration file comprising one or more control codes for one or more user actions to control the local application, the one or more control codes specifying operations available to a user of the remote client device to control the local application;

a configuration file communication module configured to:

provide, to the remote client device, a display output data of the local application of the local server, a local graphics user interface (GUI) of the local application being deactivated in the display output data;

provide the configuration file comprising the one or more control codes directed to and associated with the remote client device to allow at least one of the one or more control codes be selected by the remote client device, and to allow the local application to be controlled from the remote client device through a remote GUI generated by the remote client device based on the control codes; and provide for display, on the remote display associated with the remote client device, a composite view including the remote GUI for controlling the local application, the remote GUI generated by the remote client device based on the configuration file, and the composite view further including a local application view based on the display output data, the remote GUI further being associated with the remote client device and associated with the local application of the local server;

a control code receiver module configured to receive, from the remote client device, the at least one of the one or more control codes of the configuration file previously provided to the remote client device;

a remote view controller module configured to control the local application based on the received control code; and a display data communication module configured to provide display output data of the local application directed to the remote client device.

19. The hardware system of claim 18, wherein the display data communication module is configured to providing the display output data using a first protocol and the configuration file communication module is configured to providing the configuration file using a second protocol.

20. The hardware system of claim 19, wherein the first protocol comprises a remote desktop protocol (RDP).

* * * * *